United States Patent [19]

Derby et al.

[11] Patent Number: 5,555,190
[45] Date of Patent: Sep. 10, 1996

[54] METHOD AND APPARATUS FOR ADAPTIVE LINE ENHANCEMENT IN CORIOLIS MASS FLOW METER MEASUREMENT

[75] Inventors: Howard V. Derby, Boulder; Tamal Bose, Denver, both of Colo.; Seeraman Rajan, Bombay, Ind.

[73] Assignee: Micro Motion, Inc., Boulder, Colo.

[21] Appl. No.: 501,411

[22] Filed: Jul. 12, 1995

[51] Int. Cl.$^6$ ............................................. G01F 1/84
[52] U.S. Cl. ............................... 364/510; 73/861.356
[58] Field of Search ............................. 364/509, 510, 364/572; 73/861.38, 861.37, 861.03, 861; 324/76, 77–85, 601

[56] References Cited

U.S. PATENT DOCUMENTS

| | | | |
|---|---|---|---|
| Re. 31,450 | 1/1983 | Smith | 73/861.38 |
| 4,109,524 | 8/1978 | Smith | 73/861.37 |
| 4,491,025 | 1/1985 | Smith et al. | 73/861.38 |
| 4,879,911 | 11/1989 | Zolock | 73/861.38 |
| 4,934,196 | 6/1990 | Romano | 73/861.38 |
| 5,009,109 | 4/1991 | Kalotay | 73/861.38 |
| 5,052,231 | 10/1991 | Christ et al. | 73/861.38 |
| 5,331,859 | 7/1994 | Zolock | 73/861.38 |
| 5,429,002 | 7/1995 | Colman | 73/861.38 |
| 5,469,748 | 11/1995 | Kalotay | 73/861.38 |

*Primary Examiner*—James P. Trammell
*Attorney, Agent, or Firm*—Duft, Graziano & Forest, P.C.

[57] ABSTRACT

An apparatus and method for determining frequency and phase relationships of vibrating flow tubes in a Coriolis mass flow meter. Adaptive line enhancement (ALE) techniques and apparatus are used in a digital signal processing (DSP) device to accurately determine frequency and phase relationships of the vibrating flow tube and to thereby more accurately determine mass flow rate of a material flowing through the mass flow meter. In a first embodiment, an adaptive notch filter is used to enhance the signal from each corresponding sensor signal on the vibrating flow tubes. In a second embodiment, a plurality of adaptive notch filters are cascaded to enhance the signal from each corresponding sensor signal. In both embodiments an anti-aliasing decimation filter associated with each sensor signal reduces the computational complexity by reducing the number of samples from a fixed frequency A/D sampling device associated with each sensor signal. Computational adjustments are performed to compensate for spectral leakage between the fixed sampling frequency and the variable fundamental frequency of the vibrating flow tubes. Despite this added computational complexity, the present invention is simpler than prior designs and provides better noise immunity due to the adaptive notch filtration. Heuristics are applied to the weight adaptation algorithms of the notch filters to improve convergence of the digital filters and to reduce the possibility of instability of the filters interfering with mass flow measurements.

35 Claims, 20 Drawing Sheets

METHOD AND APPARATUS FOR ADAPTIVE LINE ENHANCEMENT IN CORIOLIS MASS FLOW METER MEASUREMENT

FIELD OF THE INVENTION

The present invention relates to mass flow rate measurement and in particular to the use of digital signal processing adaptive filtration methods and apparatus in Coriolis mass flow meters.

PROBLEM

It is known to use Coriolis mass flowmeters to measure mass flow and other information for materials flowing through a conduit. Such flowmeters are disclosed in U.S. Pat. Nos. 4,109,524 of Aug. 29, 1978, U.S. Pat. No. 4,491,025 of Jan. 1, 1985, and Re. 31,450 of Feb. 11, 1982, all to J. E. Smith et al. These flowmeters have one or more flow tubes of straight or curved configuration. Each flow tube configuration in a Coriolis mass flowmeter has a set of natural vibration modes, which may be of a simple bending, torsional or coupled type. Each flow tube is driven to oscillate at resonance in one of these natural modes. Material flows into the flowmeter from a connected conduit on the inlet side of the flowmeter, is directed through the flow tube or tubes, and exits the flowmeter through the outlet side. The natural vibration modes of the vibrating, fluid filled system are defined in part by the combined mass of the flow tubes and the material within the flow tubes.

When there is no flow through the flowmeter, all points along the flow tube oscillate about a pivot point with identical phase due to an applied driver force. As material begins to flow, Coriolis accelerations cause each point along the flow tube to have a different phase. The phase on the inlet side of the flow tube lags the driver, while the phase on the outlet side leads the driver. Sensors are placed on the flow tube to produce sinusoidal signals representative of the motion of the flow tube. The phase difference between two sensor signals is proportional to the mass flow rate of material through the flow tube.

A complicating factor in this measurement is that the density of typical process material varies. Changes in density cause the frequencies of the natural modes to vary. Since the flowmeter's control system maintains resonance, the oscillation frequency varies in response to changes in density. Mass flow rate in this situation is proportional to the ratio of phase difference and oscillation frequency.

The above-mentioned U.S. Pat. No. Re. 31,450 to Smith discloses a Coriolis flowmeter that avoids the need for measuring both phase difference and oscillation frequency. Phase difference is determined by measuring the time delay between level crossings of the two sinusoidal sensor output signals of the flowmeter. When this method is used, the variations in the oscillation frequency cancel, and mass flow rate is proportional to the measured time delay. This measurement method is hereinafter referred to as a time delay or $\Delta t$ measurement.

Measurements in a Coriolis mass flowmeter must be made with great accuracy since it is often a requirement that the derived flow rate information have an accuracy of at least 0.15% of reading. The signal processing circuitry which receives the sensor output signals measures this phase difference with precision and generates the desired characteristics of the flowing process material to the required accuracy of at least 0.15% of reading.

In order to achieve these accuracies, it is necessary that the signal processing circuitry operate with precision in measuring the phase shift of the two signals it receives from the flowmeter. Since the phase shift between the two output signals of the meter is the information used by the processing circuitry to derive the material characteristics, it is necessary that the processing circuitry not introduce any phase shift which would mask the phase shift information provided by the sensor output signals. In practice, it is necessary that this processing circuitry have an extremely low inherent phase shift so that the phase of each input signal is shifted by less than 0.001° and, in some cases, less than a few parts per million. Phase accuracy of this magnitude is required if the derived information regarding the process material is to have an accuracy of less than 0.15%.

The frequencies of the Coriolis flowmeter output signals fall in the frequency range of many industrially generated noises. Also, the amplitude of the sensor output signals is often small and, in many cases, is not significantly above the amplitude of the noise signals. This limits the sensitivity of the flowmeter and makes the extraction of the useful information quite difficult.

There is not much a designer can do either to move the meter output signals frequency out of the noise band or to increase the amplitude of the output signals. Practical Coriolis sensor and flowmeter design requires compromises that result in the generation of output signals having a less than optimum signal to noise ratio and dynamic range. This limitation determines the flowmeter characteristics and specifications including the minimum and maximum flow rates which may be reliably derived from the flowmeter's output signals.

The magnitude of the minimum time delay that can be measured between the two Coriolis flowmeter output signals at a given drive frequency is limited by various factors including the signal to noise ratio, the complexity of associated circuitry and hardware, and economic considerations that limit the cost and complexity of the associated circuitry and hardware. Also, in order to achieve a flowmeter that is economically attractive, the low limit of time delay measurement must be as low as possible. The processing circuitry that receives the two output signals must be able to reliably measure the time delay between the two signals in order to provide a meter having the high sensitivity needed to measure the flowing characteristics of materials having a low density and mass such as, for example, gases.

There are limitations regarding the extent to which conventional analog circuit design can, by itself, permit accurate time delay measurements under all possible operating conditions of a Coriolis flowmeter. These limitations are due to the inherent noise present in any electronic equipment including the imperfections of semi-conductor devices and noise generated by other circuit elements. These limitations are also due to ambient noise which similarly limits the measurement can be reduced to some extent by techniques such as shielding, guarding, grounding, etc. Another limitation is the signal to noise ratio of the sensor output signals themselves.

Good analog circuit design can overcome some of the problems regarding noise in the electronic equipment as well as the ambient noise in the environment. However, an improvement in the signal to noise ratio of the output signals cannot be achieved without the use of analog filters. But analog filters alter the amplitude and phase of the signals to be processed. This is undesirable, since the time delay between the two signals is the base information used to derive characteristics of the process fluid. The use of filters having unknown or varying amplitude and/or phase characteristics can unacceptably alter the phase difference between the two sensor output signals and preclude the derivation of accurate information of the flowing material.

The flowmeter's drive signal is typically derived from one of the sensor output signals after it is conditioned, phase shifted and used to produce the sinusoidal drive voltage for the drive coil of the meter. This has the disadvantage that harmonics and noise components present in the sensor signal are amplified and applied to the drive coil to vibrate the flow tubes at their resonant frequency. However, an undesirable drive signal can also be generated by unwanted mechanical vibrations and electrical interferences that are fed back to the meter drive circuit and reinforced in a closed loop so that they create relatively high amplitude self-perpetuating disturbing signals which further degrade the precision and accuracy of the time delay measurement.

There are several well known methods and circuit designs which seek to reduce the above problems. One such successful technique to reduce some of the above problems is described in U.S. Pat. No. 5,231,884 to M. Zolock and U.S. Pat. No. 5,228,327 to Bruck. These patents describe Coriolis flowmeter signal processing circuitry that uses three identical channels having precision integrators as filters. A first one of these channels is permanently connected to one sensor signal, say, for example, the left. The other two channels (second and third) are alternately connected, one at a time, to the right sensor signal. When one of these, say the second channel, is connected to the right sensor signal, the third channel is connected, along with the first channel, to the left sensor signal. The inherent phase delay between the first and third channel is measured by comparing the time difference between the outputs of the two channels now both connected to the left signal. Once this characteristic delay is determined, the role of this third channel and the second channel connected to the right sensor signal is switched. In this new configuration, the second channel undergoes a calibration of its delay characteristics while the third calibrated channel is connected to the right sensor signal. The roles of second and third channels are alternately switched by a control circuit approximately once every minute. During this one-minute interval (about 30 to 60 seconds), aging, temperature, and other effects have no meaningful influence on the phase-shift of the filters and therefore their phase relationship is known and considered defined.

The precisely calibrated integrators used by Zolock provide a signal to noise ratio improvement amounting to about 6 db/octave roll-off in the amplitude transfer function of the integrator. Unfortunately, this 6 db/octave improvement is not enough under many circumstances in which Coriolis flowmeters are operated (such as light material or excessively noisy environments). The reason for this is that a single-pole filter, such as the Zolock integrator, has a relatively wide band width. As a result, noise signals generated by unwanted flow tube vibration modes, noisy environment, material flow noise, electromagnetic or radio frequency interference and disturbances are not removed to the extent necessary for high meter sensitivity required for precision. Depending on their frequency, their amplitude is reduced somewhat, but they can still interfere with the precision time delay measurement between the two sensor output signals when measuring low mass materials such as gases.

There is another source for errors in the Zolock and Bruck systems. The integrator time delay measurements are made at three (3) certain well defined points of the sinusoidal sensor signals. The two sensor signals are ideal only when their shape is the same and is symmetrical around their peak values. However, when the two magnetic circuits (sensors) that generate the sensor signals are not identical, the resulting non-ideal wave forms contain different amounts of harmonics with possibly undefined phase conditions which can alter their shape and potentially change their symmetrical character. The result of such variations is such that when, during normal operations, a Zolock integrator is calibrated with one wave form and is subsequently used to measure another wave form, the difference in wave forms may produce an undefined and unknown amount of error due to its harmonic content and its undefined and varying phase of its harmonics.

Other analog circuit design techniques suffer from similar problems of complexity, insufficient noise immunity, or insufficient harmonic rejection.

There are techniques currently available, such as digital signal processing (hereinafter referred to as DSP) and associated digital filtering, to overcome the above-discussed problems and simultaneously improve the signal to noise ratio of the signals being processed. However, these alternatives have been more complicated and expensive than conventional analog circuit designs. In addition, these prior DSP designs have shown only modest improvement over conventional analog circuit designs with respect to noise immunity and harmonic rejection. U.S. Pat. No. 4,934,196, issued Jun. 19, 1990 to Romano, teaches a DSP design for computing the phase difference, $\Delta t$, and correlated mass flow rate. Romano's design alters the sampling frequency of an A/D converter in an attempt to maintain an integral number of sample times within each periodic cycle of the vibrating flow tubes. This need for variable frequency sampling complicates Romano's DSP design. Although this DSP design is structurally quite distinct from prior discrete analog circuit designs, it has proven to provide only modest improvements over analog designs in measurement accuracy because it provides significant improvement in filtration only at integer multiples of the fundamental frequency. However, many signal components result from mechanical vibration modes of the flow tubes whose resonant frequencies are not integer multiples of the fundamental frequency and are therefore poorly rejected by the prior DSP designs.

Neither prior approach (analog nor prior DSP) effectively rejects non-harmonic or broadband noise. From the above discussion, it can be seen that there is a need for an improved method and apparatus for measuring mass flow rate in a Coriolis mass flow meter.

SOLUTION

The present invention solves the above identified problems and achieves an advance in the art by applying digital filtering and digital signal processing (DSP) methods and apparatus to improve the accuracy of mass flow measurements in a Coriolis mass flow meter. The present invention comprises a DSP design which includes adaptive notch filters to improve the accuracy of frequency and phase measurements used in the computation of mass flow rate. The use of adaptive notch filtration in the present invention is one application of the technology commonly referred to as Adaptive Line Enhancement (ALE).

In the present invention, the signal from each vibrating flow tube sensor is sampled, digitized, and then processed by a digital adaptive notch filter which passes all noise signals outside a narrow frequency band (a notch) around the fundamental frequency. This digitized filtered signal is then subtracted from the original digitized signal to produce an enhanced signal representing the sensor output signal waveform at the fundamental frequency with virtually all noise signals eliminated. This method and apparatus eliminates harmonic as well as non-harmonic noise signals. Initially the width of the notch filter's "notch" is wide and is adapted over time to narrow as it converges on the fundamental frequency. Adaptation algorithms rapidly adapt the notch frequency of the adaptive filter to track changes over time in the fundamental frequency of the vibrating flow tubes.

The DSP design of the present invention uses a fixed sampling frequency as distinct from Romano's variable frequency design. This fixed sampling frequency approach permits rapid convergence of the adaptive notch filters on the fundamental frequency of the vibrating flow tubes and simplifies the total circuit design. The fixed sampling rate eliminates the need exhibited in Romano to provide additional circuitry to vary the sampling rate. The present design performs computational adjustments to compensate for spectral leakage between the fixed sampling frequency and the variable fundamental frequency of the vibrating flow tubes. Despite this added computational complexity, the present invention is simpler than prior designs exemplified by Romano and provides better noise immunity due to the use of adaptive notch filtration.

The present invention provides superior noise immunity and harmonic rejection as compared to all known designs and simplifies aspects of the DSP design disclosed by Romano. This permits improved accuracy of the flow rate measurements even in particularly noisy environments as well as applications with low density flow materials (such as gas).

Since the flow tubes vibrate at the same fundamental frequency, adaptation of the notch filters is determined by samples from only one of the two notch filters. The adaptation weights so determined are applied to both notch filters. Heuristics applied to the computations by the present invention prevent the notch filters from diverging from the fundamental frequency due to instability in the computations. Other heuristics restart convergence computations for the adaptation when the signal to noise ratio measured by the notch filter is too small. A small signal to noise ratio indicates that the adaptive notch filter is not converged on the fundamental frequency. This may be due to a shift in the fundamental frequency of the vibrating flow tubes.

In a first embodiment of the present invention, the output signal from each vibrating flow tube sensor is sampled at a fixed frequency by a corresponding A/D converter. The sampled value generated by each A/D converter is then applied to a corresponding decimation filter to reduce computational complexity by reducing the number of samples used in subsequent computations. The decimation filters also provide a degree of anti-aliasing filtration to smooth the sampled analog signals. The decimated signals are then each applied to a corresponding adaptive notch filter to further enhance the signal from each sensor. The enhanced output signal from each sensor, after being filtered of most noise and harmonics, is then applied to a corresponding phase computation element to determine the phase difference between the two enhanced signals. The output of each phase computation element is applied to a computation element to determine the time difference between the enhanced sensor signals and hence the proportional mass flow rate.

In a second embodiment of the methods of the present invention, four adaptive notch filters are utilized, two in series on each of the left and right channel signals. The two filters on each of the left and right channels are "cascaded" in that the first filter utilizes a low-Q (wide notch) filter to supply limited signal enhancement but the ability to rapidly converge on changes in the fundamental frequency of the vibrating flow tubes. The signal output from the first cascaded notch filter is then applied to a second cascaded notch filter. The second notch filter utilizes a high-Q (narrow notch) filter to provide superior noise and harmonic rejection over that of previous solutions or over that of the first embodiment described above. Despite the narrow notch (high-Q) of the second notch filter, it can still rapidly adapt to changes in the fundamental frequency of the vibrating flow tubes due to the limited enhancement (filtration) performed by the first notch filter. The reduced noise and harmonic levels in the signal applied to the second notch filter allow it to also rapidly converge on changes in the fundamental frequency of the vibrating flow tubes.

An additional notch filter (fifth filter) having a notch shape even wider than that of the first cascaded notch filter is used to provide an estimate of the fundamental frequency of the vibrating flow tubes. This estimate is used by weight adaptation computations to set the frequency parameter of the first cascaded notch filters for both the left and right channels. The output from the second cascaded notch filters is used by weight adaptation computations to adjust the frequency parameter of the second cascaded notch filters.

This combination of two (or more) cascaded adaptive notch filters to enhance the output signal from each sensor further enhances both the rejection characteristics of the filtration and the speed with which the adaptive filters converge on changes in the fundamental frequency of the vibrating flow tubes.

The term "adaptive notch filter" as used herein refers broadly to a filter with variable parameters. This definition contrasts with a more widely accepted definition which combines a variable parameter filter with a mechanism for automatically tuning the parameters of the filter based on the filter's own inputs and outputs. As used herein, the adaptation of some notch filters is computed based on the operation of other filters rather than each filters own inputs and outputs. In other words, some notch filters in the present invention are slaved to the operation of other notch filter computations. For this reason, the detailed discussions of the filters and the adaptation mechanisms are separated. One adaptation computation may adjust the parameters for multiple notch filters based on inputs from a single filter.

The above and other aspects of the present invention will become apparent from the following description and the attached drawing.

DETAILED DESCRIPTION OF THE PREFERRED EMBODIMENT

Figure 1:
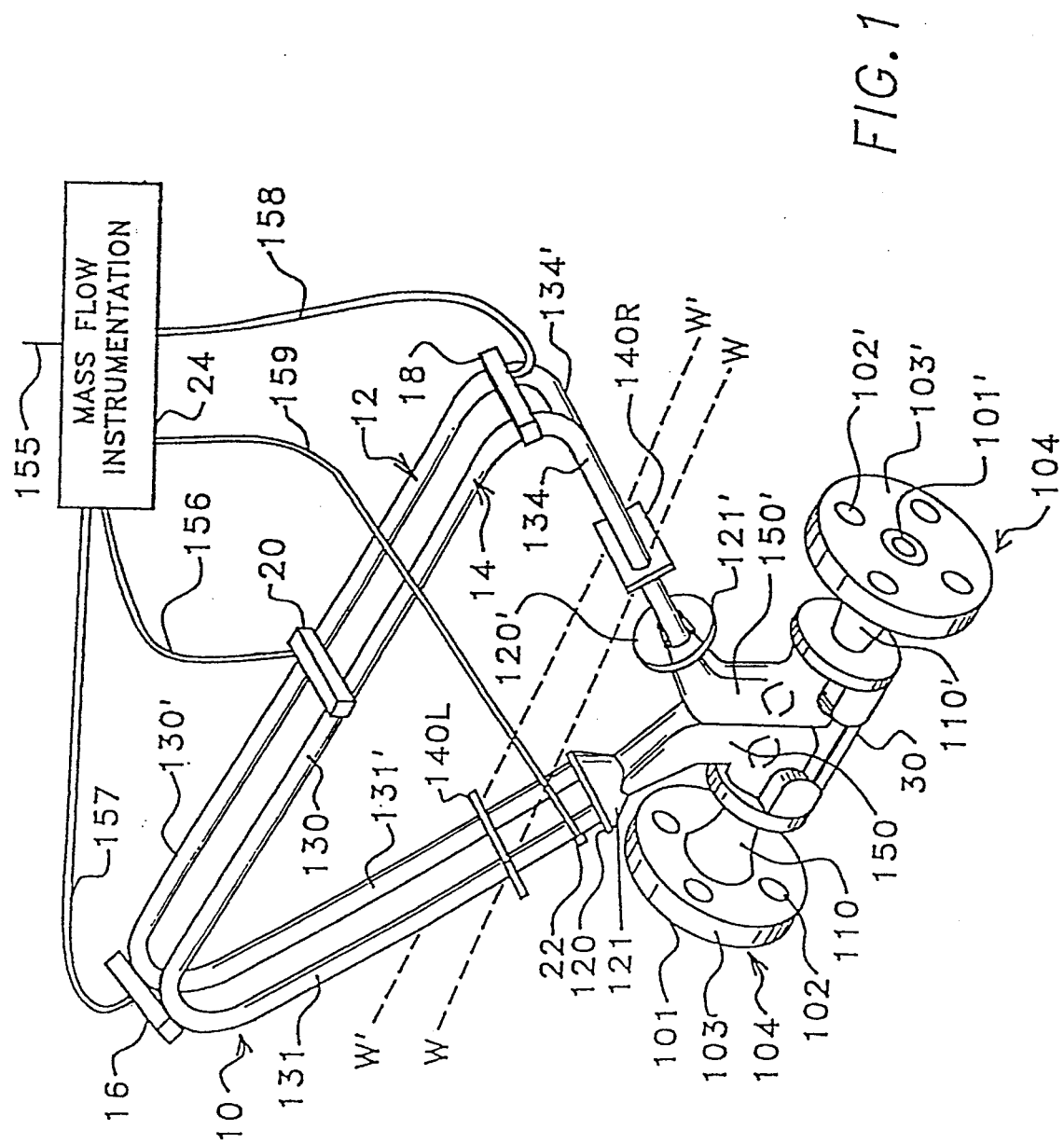
FIG. 1 shows a typical Coriolis mass flow meter attached to meter electronics which embody the apparatus and methods of the present invention.

A typical Coriolis mass flowmeter 10 is illustrated in FIG. 1 as having two cantilever mounted flow tubes 12, 14 affixed to a manifold body 30 so as to have substantially identical spring constants and moments of inertia about their respective out-of-phase bending axes W—W and W'—W'.

A drive coil and magnet 20 are mounted at a midpoint region between the top portion 130 and 130' of flow tubes 12, 14 to oscillate flow tubes 12, 14 out of phase about axes W—W and W'—W'. Left sensor 16 and right sensor 18 are mounted near the respective ends of the top portions of flow tubes 12, 14 to sense the relative movement of flow tubes 12, 14. This sensing may be done in many ways including by measuring the movement of the top ends of the flow tubes 12, 14 through their zero crossings or some other pre-defined point. Flow tubes 12 and 14 have left side legs 131 and 131' and right side legs 134 and 134'. The side legs converge downwardly toward each other and are affixed to surfaces 120 and 120' of manifold elements 121 and 121'. Brace bars 140R and 140L are brazed to the legs of flow tubes 12, 14 and serve to define the axes W—W and W'—W' about which the flow tubes oscillate out of phase when driver 20 is energized over path 156. The position of axes W—W and W'—W' is determined by the placement of brace bars 140R and 140L on flow tube side legs 131, 131' and 134, 134'.

Temperature detector 22 is mounted on side leg 131 of flow tube 14 to measure the flow tube's temperature and the approximate temperature of the material flowing therein. This temperature information is used to determine changes in the spring constant of the flow tubes. Driver 20, sensors 16 and 18 and temperature detector 22 are connected to mass flow instrumentation 24 by paths 156, 157, 158 and 159, respectively. Mass flow instrumentation 24 includes at least one microprocessor which processes the signals received from sensors 16, 18, and 22 to determine the mass flow rate of the material flowing through flowmeter 10 as well as other measurements, such as material density and temperature. Mass flow instrumentation 24 also applies a drive signal over path 156 to driver 20 to oscillate tubes 12 and 14 out-of-phase about axes W—W and W'—W'.

Manifold body 30 is formed of casting 150, 150'. Casting elements 150, 150' are attachable to a supply conduit and exit conduit (not shown), by flanges 103, 103'. Manifold body 30 diverts the material flow from the supply conduit into flow tubes 12, 14 and then back into an exit conduit. When manifold flanges 103 and 103' are connected via inlet end 104 and outlet end 104' to a conduit system (not shown), carrying the process material to be measured, the material enters manifold body 30 and manifold element 110 through inlet orifice 101 in flange 103 and is connected by a channel (not shown) having a gradually changing cross-section in casting element 150 to flow tubes 12, 14. The material is divided and routed by manifold element 121 to the left legs 131 and 131' of flow tubes 14 and 12, respectively. The material then flows through the top tubes elements 130, 130' and through the right side legs 134 and 134' and is recombined into a single stream within flow tube manifold element 121'. The fluid is thereafter routed to a channel (not shown) in exit casting element 150' and then to exit manifold element 110'. Exit end 104' is connected by flange 103' having bolt holes 102' to the conduit system (not shown). The material exits through outlet orifice 101' to return to the flow in the conduit system (not shown).

Mass flow instrumentation 24 analyzes signals received on paths 157, 158, and 159 and generates standard output signals on path 155 to indicate mass flow rates utilized by a control system or operator for monitoring and control of the mass flow rate through the associated conduit system (not shown).

OVERVIEW

The present invention comprises digital signal processing methods operable within a digital signal processor (DSP) chip to perform the computational functions within mass flow instrumentation 24. Discrete samples are taken of the analog signals generated as output from each of the flow tube sensors. The discrete samples from the left and right sensors are digitized by use of standard analog to digital conversion (A/D) devices. Once digitized, further processing of the samples is performed by digital signal processing methods within the DSP chip. The processing of the digitized signal samples is expressed herein in two forms. In one form of expression, the DSP software flowcharts and equations used for the various filtering and processing functions are presented. To aid in the explanation of the methods of the present invention, a second form of expression is utilized which depicts the computation of the various equations as pseudo-circuits (e.g. block diagrams representing summing junctions, multiplication junctions, delay circuits, registers, multiplexors, etc.). Certain more complex mathematical operations are left as high level elements in the pseudo-circuit diagrams and are typically referred to herein as "computational elements". The two forms of explanation of the present invention are intended as equivalent descriptions, either of which fully specifies the methods and function of the present invention.

OVERVIEW- PSEUDO CIRCUITS

Figure 2:
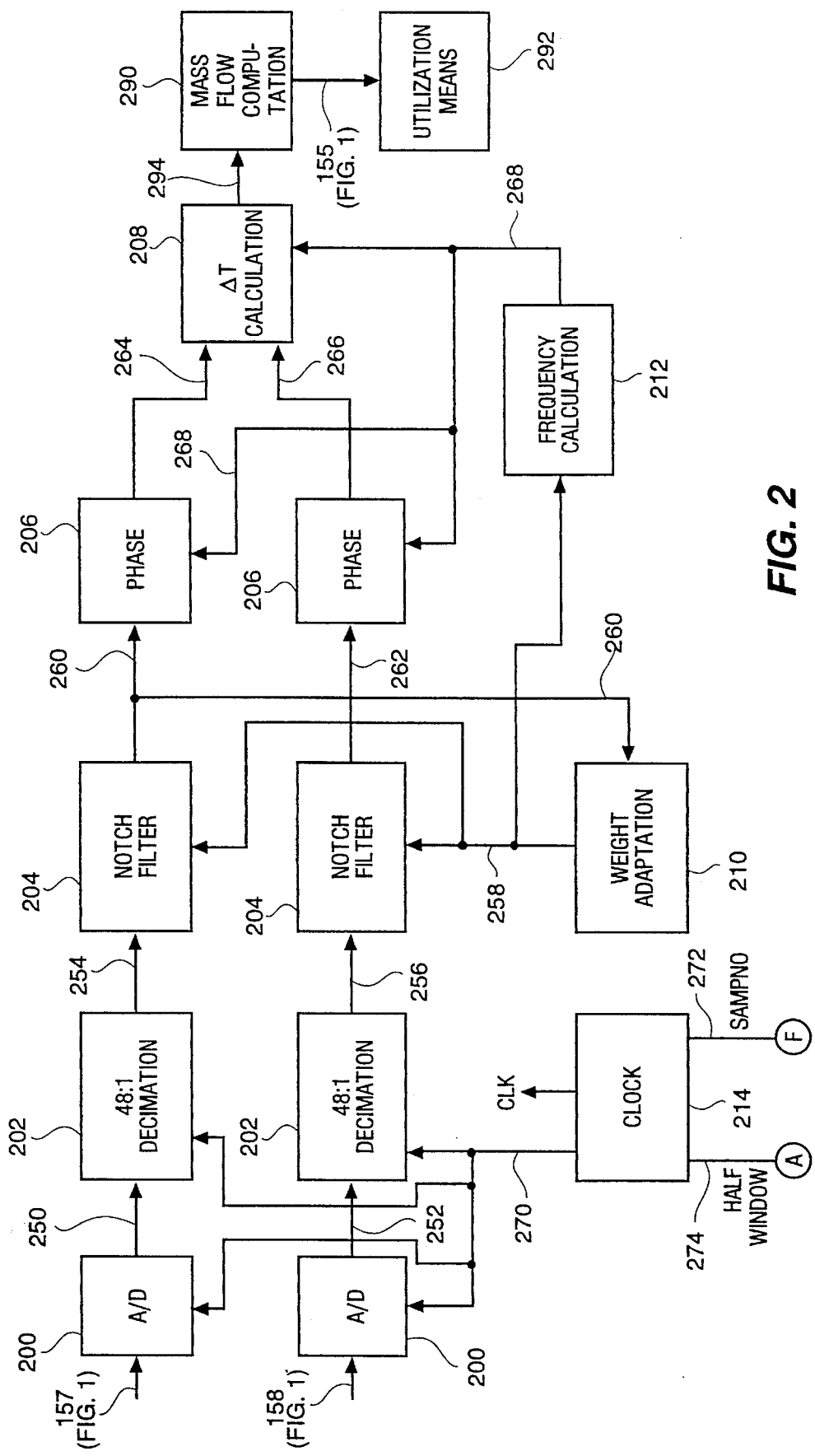
FIG. 2 shows a block diagram of the computational elements within the meter electronics which determine mass flow rate through the flow meter in accordance with the present invention.

FIG. 2 depicts the general structure of, and associated flow of information in, the flow meter electronics of the present invention. The meter electronics of the present invention is comprised of two essentially identical "channels": a first channel for processing the left flow tube sensor output signal and a second channel for processing the right flow tube sensor output signal. The two "channels" are identical except with respect to the weight adaptation of the notch filters as discussed below.

The description presented below is discussed in terms of a typical Coriolis flowmeter application in which the fundamental frequency of the vibrating flow tubes is approximately 100 Hz. It will be readily recognized that the apparatus and methods of the present invention may be applied to any common flowmeter fundamental vibrating frequency.

Many of the computational elements discussed below operate synchronously with clock signals associated with various samplings of the flow tube sensor output signals. CLOCK 214 of FIG. 2 provides clocking signals associated with the various sampling rates of the computational elements discussed below. First, CLOCK 214 supplies a periodic pulsed signal clock to A/D converters 200 over path 270 to determine the sampling rate of the raw (unprocessed) signals generated by the flow tube sensors. Each A/D converter 200 samples its corresponding analog signal and converts the sampled value to digital form once for each signal pulse applied to path 270 by CLOCK 214. This clock signal applied to A/D converters 200 over path 270 must have a highly accurate frequency to permit sampling of the flow tube sensor output signals at a fixed sampling rate as required for the processing of the present invention. This clock pulse accuracy is preferably achieved by use of a crystal controlled clock. This same clock signal is also applied to 48:1 decimation filter elements 202 via path 270. The decimation filter elements 202 reduce the number of samples by a factor of 48 while providing significant anti-aliasing filtration of the sampled signal values. One of ordinary skill in the art will recognize that the particular decimation ratio of 48:1 is a matter of engineering design choice depending upon the particular application environment.

CLOCK 214 also provides a signal CLK to other computational elements discussed below. The frequency of the CLK signal corresponds to the frequency of sample values output by the decimation filter elements 202. In other words, the frequency of the CLK clock signal is 1/48th the frequency of the clock signal generated and applied to path 270. In the preferred embodiment of the present invention, the computational elements "clocked" by the CLK signal are implemented as software functions operable on a digital signal processing (DSP) chip. As such, these functions perform their computations on the decimated discrete sampled sensor output signal values. The "clocking" of these functions corresponds to the availability of discrete sampled values. These values are preferably buffered in software implemented queues or FIFOs so that the functions may actually operate asynchronously with respect to the fixed rate, crystal controlled, sampling frequency of the A/D converters 200. In the description of the figures which follow, the CLK signal is representative of the frequency at which decimated, discrete, sampled sensor output signal values are made available for further processing by the computational elements. The actual computation processing in software within the DSP chip proceeds generally asynchronously with respect to the A/D sampling frequency of the clock signal on path 270.

The output signal from the right flow tube sensor 18 of FIG. 1 is applied to A/D converter 200 over path 158 of FIG. 1. The output signal from the left flow tube sensor 16 of FIG. 1 is applied to a second A/D converter 200 over path 157 of FIG. 1. A/D converter 200 samples and converts the analog signal from the right flow tube sensor to a digital value. A second A/D converter 200 samples and converts the analog signal from the left flow tube sensor to a digital value. A/D converters 200 operates responsive to the fixed frequency periodic clock signal received on path 270 supplied by a system wide clock 214.

The converted digital value is applied over path 252 to 48:1 decimation filter element 202. The 48:1 decimation filter element 202 is done in two stages, an 8:1 stage followed by a 6:1 stage. Both stages of decimation filter element 202 are preferably implemented as finite impulse response (FIR) anti-aliasing filters. One skilled in the art will recognize that an IIR filter may be used for the decimation stages. Use of FIR versus IIR filtration is a matter of design choice based on computational complexity and the relative power of the computational elements used in a particular design.

The first stage of decimation filter element 202 performs an 8:1 reduction in the sample rate from 38.4 kHz to 4.8 kHz. The transfer function of the filter is:

$$G(z)=(1-z^{-8})^5/(1-z^{-1})^5$$

Pole-zero cancellation yields an FIR filter of 36 taps. The filter has 5 zeros at each multiple of the subsampling frequency. This provides strong rejection of those frequencies which alias into the passband of the second stage filter. This first stage filter has small integer coefficients which may be represented in single precision computer arithmetic to thereby simplify computational complexities of the convolution and improve execution speed.

The second stage filter of the decimation filter element 202 performs a 6:1 reduction in sample rate from 4.8 kHz to 800 Hz. The second stage filter is a 131 tap FIR filter designed using the well known Remez exchange algorithm. The passband is DC through 250 Hz and the stopband begins at 400 Hz. The passband has weight $10^{-5}$ and the stopband has weight 1.

A high degree of anti-aliasing is provided by the two stage decimation filters. All aliasing components are reduced by over 120 dB, while ripple from DC through 230 Hz is less than 1.5 dB.

The left channel, comprising A/D converter 200 and decimation filter element 202 connected via path 250, operates identically to the above-discussed right channel. The output of decimation filter element 202 for the left channel applies its output signal to path 254.

The sample values from A/D converters 200 and the computations of the decimation stages preferably utilize 32-bit fixed point arithmetic to maintain the computational accuracy and performance required. Subsequent computations for the notch filtration, phase computations, Δt computations, and mass flow rate computations are preferable performed using floating point arithmetic due to the wider range of computational scaling involved with the more complex functions.

The anti-aliased, decimated, digitized signal values are applied over path 256 to adaptive notch filter 204. Adaptive notch filter 204, discussed in detail below, enhances the signal values by effectively filtering all frequencies outside a band centered about the fundamental frequency of the vibrating flow tubes. The adaptive notch filter 204 eliminates a band of frequencies (a notch) centered about the fundamental frequency. The resultant signal is all noise outside the notch centered about the fundamental frequency of the vibrating flowtubes. This noise signal is then subtracted from the signal applied as input to the notch filter 204 over path 256 which is the sum of the fundamental frequency and all noise not filtered by decimation filter element 202. The result of the subtraction, which represents the fundamental frequency of the vibrating flowtubes filtered of most noise signals, is then applied to path 262 as the output of the notch filter 204.

The parameters (weighting factors or coefficients and the debiasing parameter) of the notch filter 204 determine the characteristics of the notch, namely the shape of the notch (bandwidth of frequencies rejected) and the fundamental frequency. The parameters are computed by weight adaptation element 210 and applied to notch filter 204 over path 258.

The left channel adaptive notch filter 204 accepts its input over path 254 and applies its output to path 260. As discussed below, signals generated as outputs from left channel adaptive notch filter 204 are used by weight adaptation element 210 as feedback in determining the coefficients of both notch filters (left and right channel adaptive notch filters).

The weighting factors (coefficients) of both notch filters 204 (left and right signal channels) are determined by operation of weight adaptation element 210. Weight adaptation element 210 receives the filtered signal, the noise portion of the unfiltered signal, and a gradient of the filtered signal from the output of left channel adaptive notch filter 204. These signal values are used in the time-dependent (iterative) computations to determine the appropriate coefficients of the notch filters. The coefficients so determined control the characteristics of the notch. Both the shape of the notch and the fundamental frequency are adapted to track changes in the fundamental frequency. The shape of the notch determines the speed with which the adaptive notch filters can converge on changes to the fundamental frequency. A wider notch provides less filtration but may be more rapidly adjusted to changes in the fundamental frequency. A narrower notch converges more slowly to changes in the fundamental frequency but provides superior filtration of the input sensor signals.

It will be recognized that either the left or right channel output signals may be used as feedback to the weight adaptation element 210. Though it would be possible to utilize both the left and right channel output signals in weight adaptation element 210, there is no clear benefit in so doing to outweigh the added computational complexities. Regardless of the source of inputs to weight adaptation element 210, the weight adaptation parameters computed therein are applied to both the left and right channel adaptive notch filters 204 so that both sensor signal output channels are processed identically. Using a single set of parameters applied to both the left and right channels serves to maintain the critical phase relationship between the two channels, the fundamental value used to compute the Δt value proportional to mass flow rate.

The values computed by the weight adaptation element 210 are also used, as discussed below, in the phase and Δt computations.

Element 212 receives coefficients from weight adaptation element 210 and determines the fundamental frequency element of the vibrating flow tubes. Frequency and Goertzel weight information are generated by frequency calculation element 212 and applied to path 268.

The filtered signal values generated by adaptive notch filter 204 are applied to phase computation element 206 over path 262. Phase computation element 206 receives Goertzel weight and frequency information over path 268 from frequency calculation element 212. Phase computation element 206 uses Fourier analysis techniques with two Hanning windows to determine the phase of the filtered signal. The length of a window is a function of the nominal or expected flow tube fundamental frequency. The length of a window determines a number of oscillatory cycles of the flow tubes over which samples are gathered and weighted to determine the phase of the flow tubes. The expected flow tube frequency may be programmed into the electronics of the present invention at time of manufacture, or may be entered as a parameter at a particular installation/application site, or may be determined by operation of the flowmeter and appropriate measurements. The length of a window represents a tradeoff between response time and rejection of signal noise and leakage. A larger number of cycles accumulated to determine the phase provides for additional rejection of noise but requires additional delay to achieve causality and therefore slows response to changes in the flow tube vibration phase relationship. Fewer samples reduces the delay and therefore improves the speed of response to flow tube vibration phase changes, but provides inferior noise rejection. Eight flow tube cycles is selected as the preferred window length as measured in cycles. Assuming a given expected frequency, the preferred window size (2N) is determined as:

$$\text{window\_length} = 2 \cdot \text{floor}(3200/\text{expected\_tube\_frequency})$$

where floor(x) is the largest integer less than or equal to x.

The Hanning window is represented as a vector of weights to be applied to the discrete samples over the period of one Hanning window. Where 2N is the number of discrete samples within one period of the Hanning window, the weight for the k'th discrete sample where k ranges from 0 to 2N-1 is determined as:

$$h(k) = (\tfrac{1}{2})(1 - \cos(2\pi k/(2N-1)))$$

A half window signal pulse is generated by CLOCK 214 of FIG. 2 and applied to path 274 of FIG. 2. every N discrete samples (where a complete Hanning window of the sampled sensor output signal has 2N discrete samples in a single period) for purposes discussed in detail below relating to parallel computations of overlapping Hanning windows. In addition, CLOCK 214 of FIG. 2 applies SAMPNO, a counter value, on path 272. SAMPNO on path 272 counts (as a modulo N function of the CLK signal) from 0 to N-1. The SAMPNO counter on path 272 increments with each pulse of the CLK signal. When SAMPNO reaches N-1 the next pulse of the CLK signal from CLOCK 214 resets SAMPNO to 0. The half window signal corresponds to the SAMPNO counter being equal to zero. In the preferred embodiment of the present invention, the SAMPNO counter is implemented in software which counts the number of discrete decimated sampled sensor output signal values processed during a Hanning window. The software implementation of the SAMPNO counter increments asynchronously with respect to the fixed frequency, crystal controlled clock provided by CLOCK 214 of FIG. 2 on path 270.

The signal samples at the edges of each window are given lower weights than those toward the middle of the window. To more fully utilize the available data, two Fourier calculations are done simultaneously such that the windows overlap by one half of a window length. New Fourier phase measurements are produced every half window of samples.

The use of a constant window size in the present invention allows the Hanning window weights to be pre-computed before flow measurements begin. When used in conjunction with a discrete-time Fourier transform (DTFT), as in the present invention, the window size determines the sharpness of the frequency discrimination characteristic of the DTFT filter output. It also increases the rejection of noise and pseudo-harmonics. Unfortunately, a longer window size provides slower response of the filter to changes in phase. The window size as determined above therefore represents the best known approximation suited to balancing these competing goals (improved frequency discrimination and noise rejection versus rapid response to phase changes). The preferred window size may be changed for different flow meter applications to optimize for certain environmental conditions.

Phase computation elements 206 sum the filtered discrete sampled values to generate a complex number indicative of the phase of the sampled, filtered sensor output signal. This complex number is applied to path 266 to be used in subsequent $\Delta t$ computations. Specifically, a Goertzel filter Fourier transform is applied to each Hanning window of filtered, discrete sampled sensor output signal values of both the right and left channels. The coefficients of the Goertzel filter are determined by the frequency computation element 212 and supplied to phase computation elements 206 over path 268. The complex number output of phase computation element 206 is applied to path 266 and is used by the $\Delta t$ computation.

The phase computation element 206 for the left channel operates identically to the above-discussed right channel. The output of adaptive notch filter 204 for the left channel applies its output signals to path 260. Phase computation element 206 receives these signals and applies values indicative of the phase of the left channel signal to path 264.

Phase information for both the left and right channels is determined by operation of phase calculation elements 206 and received by $\Delta t$ calculation element 208 over path 264 for the left channel and path 266 for the right channel. Frequency information determined by operation of frequency calculation element 210 is received by $\Delta t$ calculation element 208 over path 268. $\Delta t$ calculation element 208 determines the time delay resultant from the phase difference between the left and right sensor output signals, which in turn is approximately proportional to the mass flow rate of the material flowing through the flow tubes of the Coriolis flowmeter.

The Fourier transform of the left channel is multiplied by the conjugate of the Fourier transform of the right channel. The angle of the complex result is then computed. This phase difference angle is divided by the tube frequency of the vibrating flow tubes (converted to appropriate units to match the phase measurements) to produce a $\Delta t$ value.

OVERVIEW - SOFTWARE

Figure 17:
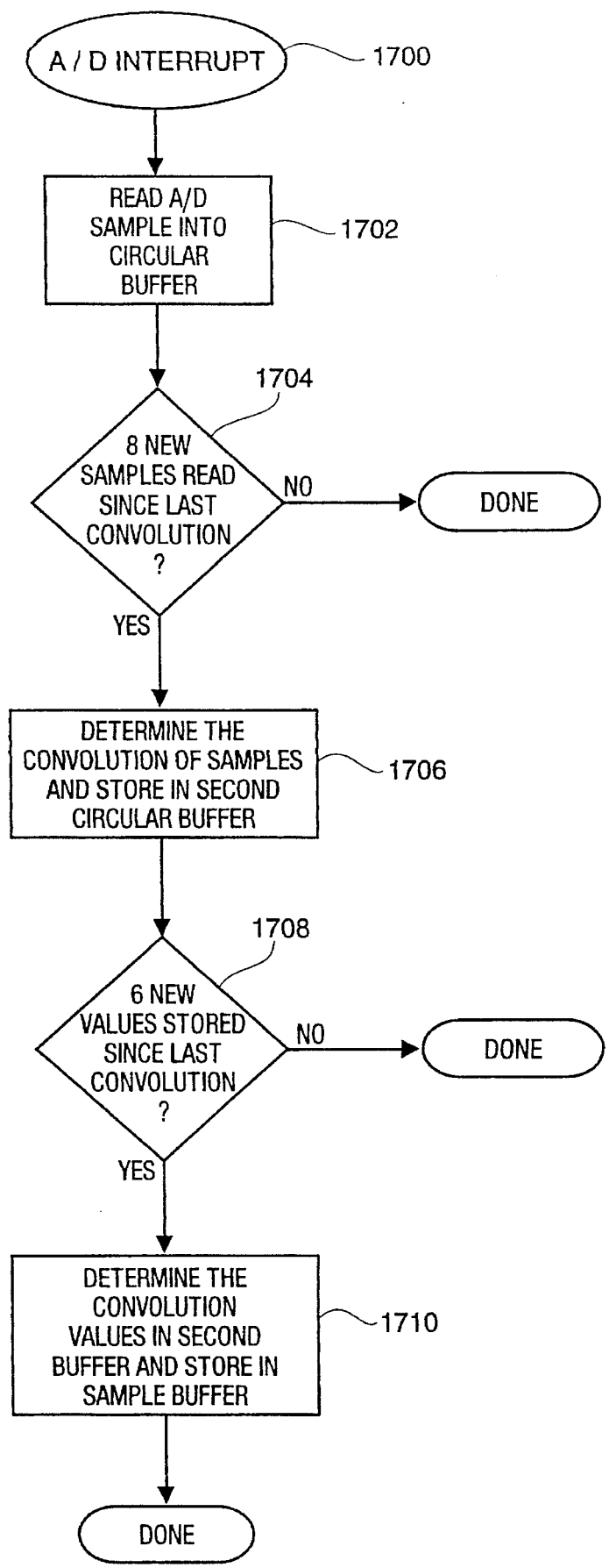
FIG. 17 is a flowchart of a software implementation of the first embodiment of the present invention and depicts interrupt processing for servicing of an A/D converter and associated decimation of the samples.
Figure 18:
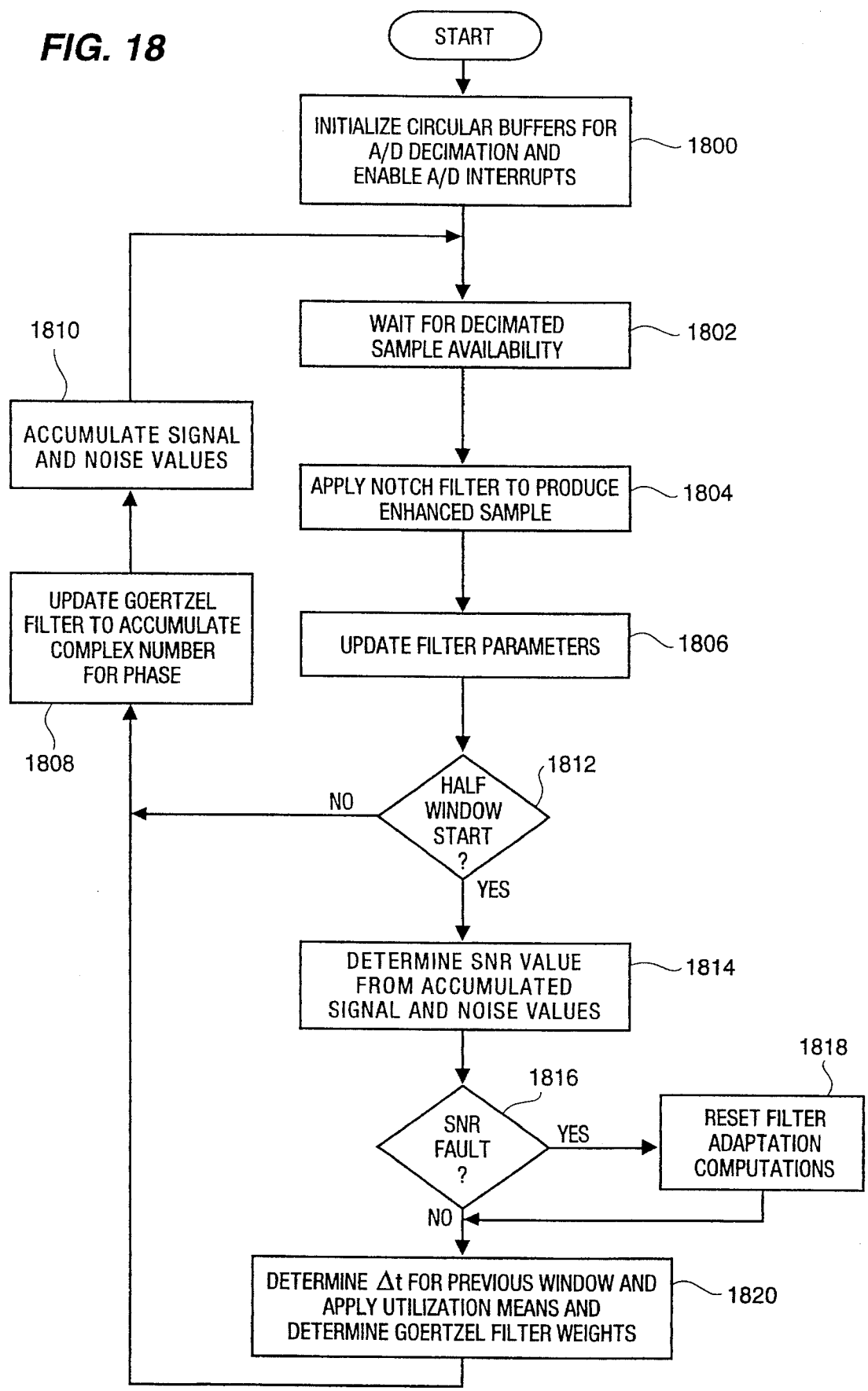
FIG. 18 is a flowchart of a software implementation of the first embodiment of the present invention and depicts processing of decimated samples for purposes of filtering and determination of $\Delta t$ phase difference.
Figure 19:
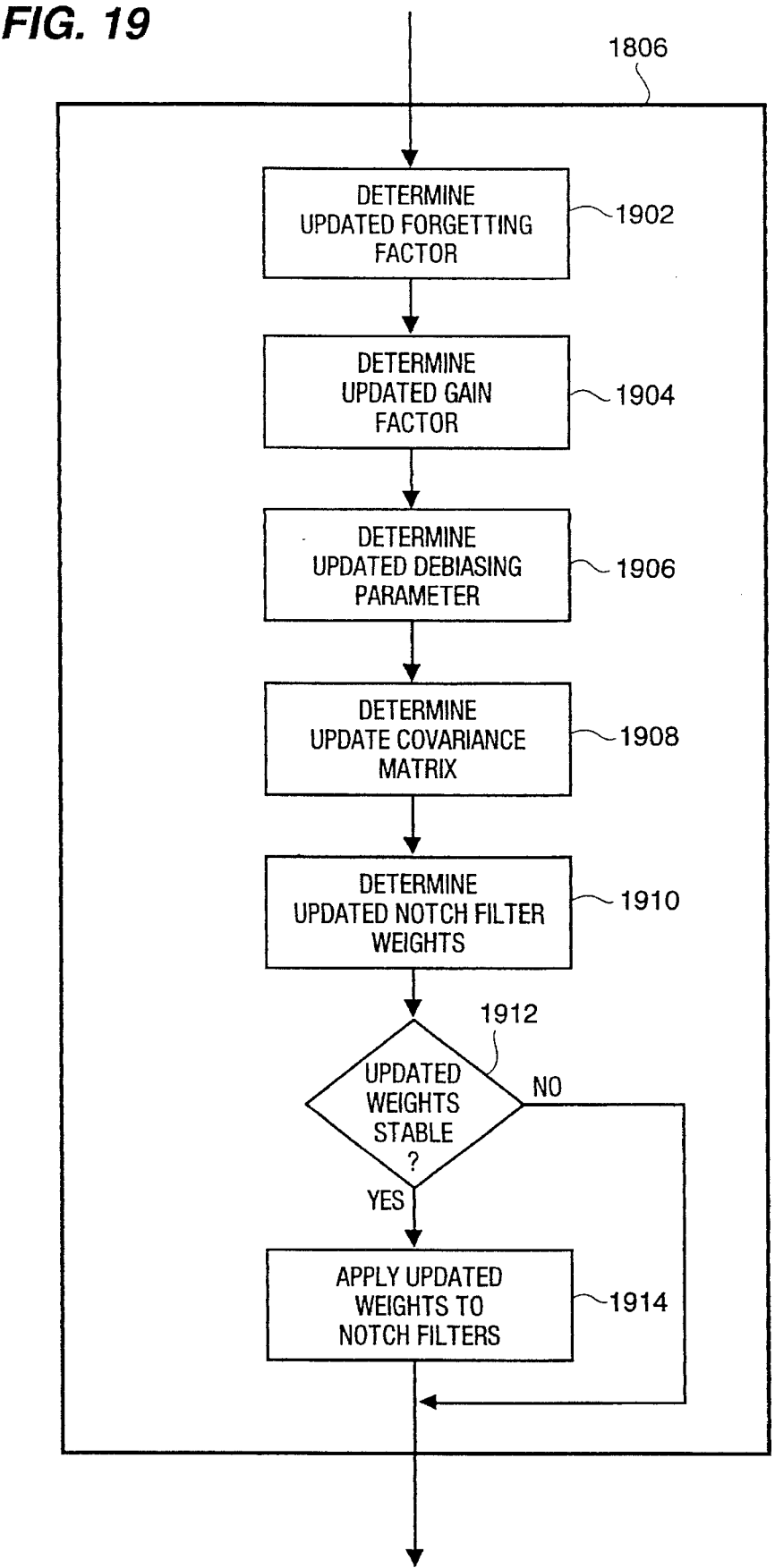
FIG. 19 is a flowchart depicting additional detail of an element of FIG. 18 which determines updated filter parameters after each decimated sample is processed.

The flowcharts of FIGS. 17–19 provide an overview of the operation of a software implementation of the methods of the present invention. FIG. 17 depicts the operation of a portion of the software which operates in real time in response to an interrupt from the A/D converters 200 (of FIG. 2). FIG. 18 depicts the operation of a portion of the software implementation which performs further filtration and processing on the decimated samples produced by operation of the software depicted in FIG. 17. Decimated samples produced by operation of the software depicted in FIG. 17 are buffered so that the software of FIG. 18 may operate asynchronously with respect to the accurately timed samples from the A/D converters 200. FIG. 19 provides additional detail of an element in FIG. 18 which includes heuristic methods to help assure stability and accuracy of the resultant measurements of mass flow rate.

Figure 20:
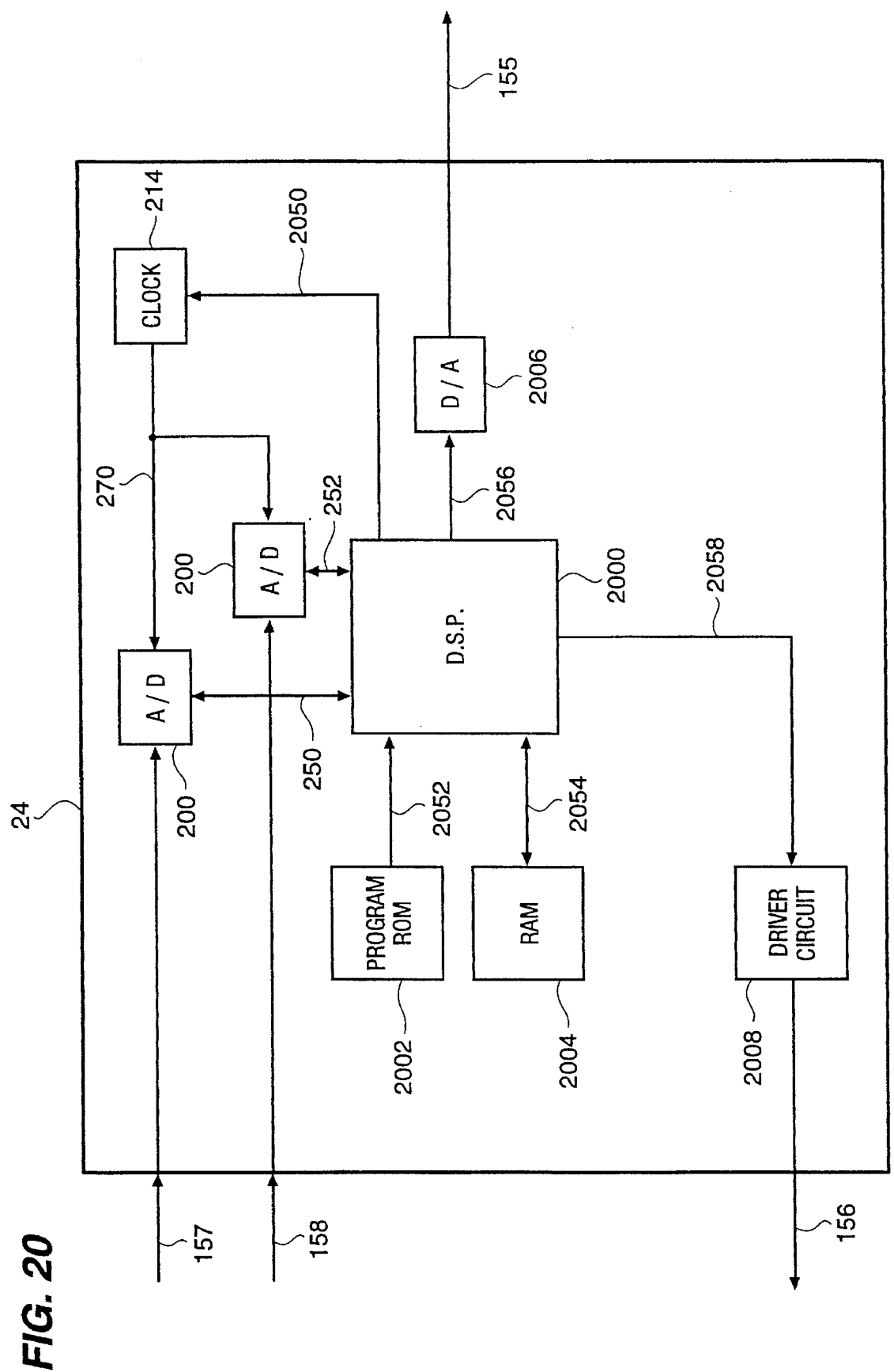
FIG. 20 is a block diagram of digital signal processing electronics suitable to perform the software methods of the present invention.

The software of FIGS. 17–19 is operable on mass flow instrumentation 24 shown in greater detail in FIG. 20. Digital signal processor 2000 of FIG. 20 is a computing device much like any common microprocessor but with special purpose functions tuned for application to signal processing tasks. Many such DSP processor devices are known to those skilled in the art. One example of such a device is the Texas Instruments TMS 320C50-57. This device is a fixed point arithmetic signal processor. Software emulation libraries are provided for precision floating point computations. This exemplary device provides 32-bit precision required for the sampling and decimation operations. The floating point emulation software provides adequate performance for most flow meter applications though other processor devices may be used if additional floating point computational performance is required for a particular flow meter application.

Processor 2000 reads program instructions from program ROM 2002 over bus 2052 and manipulates data and buffers in RAM 2004 over bus 2054. One of ordinary skill will recognize that, depending upon several cost and performance factors, it may be preferable under certain circumstances to copy the program instructions from ROM 2002 to RAM 2004 to improve the performance of processor 2000 in fetching instructions.

A/D converters 200 each receive an analog signal from their respective flow tube sensor output signals applied to paths 157 and 158, respectively. Processor 2000 applies control signals to A/D converters 200 over paths 250 and 252, respectively, and receives digitized sample values from the A/D converters 200 over paths 250 and 252, respectively. Processor 2000 applies control signals over path 2050 to clock 214 to determine the sampling frequency of A/D converters 200. In response, clock 214 applies a sample frequency clock signal to A/D converters 200 over path 270. In this manner, processor 200 initially sets the sample frequency of A/D converters 200 to the desired rate.

In the preferred embodiment, A/D converters 200 are embodied within a single integrated circuit with multiple converters and a single communication bus connection to the DSP processor. This helps assure that the phase relationship between the two sampled signals is due to the Coriolis effects of the vibrating flow tubes rather than effects of imbalances between physically separate A/D converter circuits. Many such stereo A/D converter chips are known to those skilled in the art. One example of such a chip is the Crystal Semiconductors CS5329, a 2-channel stereo A/D converter device.

Processor 2000 determines the appropriate fundamental frequency at which the flow tubes are vibrated and applies a proportional signal to path 2058. Driver circuit 2008 converts the signal applied to path 2058 into a signal appropriate to drive the flow tubes to vibrate and applies the signal to path 156. Many methods and apparatus to drive the flow tubes to vibrate are well known in the art and need not be discussed here in further detail.

Processor 2000 also determines a $\Delta t$ value from the phase difference between the sampled channels and applies a signal proportional to $\Delta t$ to path 2056. D/A converter 2006 converts the signal value applied to path 2056 into an analog signal applied to path 155 proportional to mass flow rate. The signal on path 155 is applied to utilization means (not shown) appropriate to the particular flow meter measurement application.

OVERVIEW - SOFTWARE (REAL TIME INTERRUPT PROCESSING)

As noted above, the A/D converters 200 operate at a fixed frequency to provide accurately timed sample values of the sensor output signals from the left and right flow tubes. As shown in FIG. 17, the raw sample values are decimated by a two-stage, 48:1 decimation filter. The decimation filtration provides some smoothing (anti-aliasing) of the sampled data while reducing the sample rate and thus the computational power required to apply the notch filters and to determine phase differences and the resulting Δt measurement. Well known software techniques may be applied to permit the nesting of interrupts during certain less critical computational processing to thereby avoid any possible loss of data due to complex computations while an A/D converter 200 sample interrupt is being processed. For example, circular buffering as in the use of FIFO memory techniques can be applied to retain additional data while previous samples are being processed. These buffering techniques and others are well known to those of ordinary skill in the art and need not be addressed further.

Element 1700 of FIG. 17 represents the occurrence of an interrupt generated by the A/D converters 200 to signify the availability of a digitized sample for both each of the left and right flow tube sensor signal outputs. Elements 1702 then operates in response to the interrupt to read the sampled, digitized values from the A/D converters 200 for each of the left and right flow tube sensor signals (also referred to herein as the left and right channels). The sampled, digitized values read from the A/D converters 200 are stored in a first stage circular buffer associated with each of the left and right channels. Each channel's first stage circular buffer is of sufficient size to store the sampled values of the FIR filter. The first stage filter is preferably a 36 tap filter and therefore requires at least 36 entries in the circular buffer for each channel.

Element 1704 is operable to determine if eight new samples have been stored in the first stage circular buffer since the last convolution of the sample values read from the A/D converters 200 by operation of element 1702. If eight new samples have not yet been so read, then processing of this A/D converter 200 interrupt is complete. If eight new samples have been stored in the first stage circular buffer since the last filter convolution, then element 1706 is operable to determine the convolution of the 36 sampled values currently stored in the first stage circular buffer for each channel. The convolved value for each channel is then stored in a second stage circular buffer associated with each channel. Each channel's second stage circular buffer is of sufficient size to store the sampled values of the FIR filter. The second stage filter is preferably a 131 tap filter and therefore requires at least 131 entries in the circular buffer for each channel.

Element 1708 is operable to determine if six new values have been stored in the second stage circular buffer by operation of element 1706. If six new values from the first stage convolution have not yet been stored in the second stage circular buffer, then processing of this A/D converter 200 interrupt is complete. If six new values have been stored in the second stage circular buffer, then element 1710 is operable to determine the convolution of the 131 values stored in the second stage circular buffer for each channel. The second stage filter sum (convolution) of the second stage circular buffer values for each channel is then stored in a decimated sample circular buffer associated with each channel. Each channel's decimated sample circular buffer holds decimated values for its associated left or right channel samples. The buffers are used to hold the decimated values until the asynchronous processing described below with respect to FIG. 18 can retrieve the values for further filtering and processing. The decimation computations are simple enough that they can be processed within the interrupt processing software of this FIG. 17. Further processing to apply the notch filter, to determine phase difference and Δt values, and to adapt the notch filter parameters, is more complex and therefore operates asynchronously with respect to the real time processing required for reading sample values from the A/D converters 200. One of ordinary skill in the art will recognize that the division of tasks between the interrupt processing of FIG. 17 and the asynchronous processing of FIG. 18 is a matter of design choice depending upon the performance characteristics of the selected DSP chip and desired performance goals as measured by A/D converter sampling frequency. A number of equivalent software and associated data structures are within the spirit and scope of the present invention.

The software structure summarized herein with reference to FIGS. 17–19 are described below in "pseudo-circuits" to aid in understanding of the present invention. In these pseudo-circuit descriptions, a signal referred to as CLK is pulsed for each decimated sample generated by the operations described above in FIG. 17. In other-words, the CLK signal is ⅛th the sample frequency. As can be seen in the software description depicted in FIGS. 17–19 the CLK signal indicates simply that a decimated sample value is available in the decimated sample circular buffers (more precisely a pair of decimated values, one for the left channel and one for the right). The computationally more complex notch filtration and Δt determinations are performed asynchronously with respect to the accurately timed sample frequency clocked A/D conversions and associated two-stage decimations. In other words the CLK signal discussed below is preferably no more than an indication that a decimated sample is available in the decimated sample circular buffer.

OVERVIEW - SOFTWARE (ASYNCHRONOUS DIGITAL SIGNAL PROCESSING)

FIG. 18 is a flowchart depicting the asynchronous portion of the software which is operable in response to the real time sampling and decimation operations discussed above with respect to FIG. 17. Element 1800 of FIG. 18 represents all processing required to initialize the circular buffers (first stage, second stage, and decimated sample) used to pre-process the sampled data for both channels. In addition, element 1800 initializes any required hardware associated with the A/D converters 200 of FIG. 2 to setup the fixed sampling frequency of the converters (i.e. clock 214) and to enable the A/D converters 200 to interrupt the DSP operation when a sampled value is available from the A/D converters 200.

Element 1802 is operable to wait until a pair of decimated sample values is available in each of the decimated sample circular buffers (one for the left channel and one for the right). When a pair of decimated sample values is available element 1804 is operable to apply the notch filter function to the decimated, sampled value to thereby enhance the signal. The signal is enhanced by removing unwanted noise and harmonics of the signals frequency.

Element 1806 is next operable to update the parameters of the notch filters. The adaptation methods of the present invention adapt the notch filter parameters to account for changes in the fundamental frequency of the vibrating flow tubes. In the process of the notch filter adaptations, heuristics are utilized to help assure stability of the flow measurements made by meter instrumentation 24. These heuristics are discussed in further detail below. The updated filter parameters are applied to the notch filters.

Element 1812 of FIG. 18 is next operable to determine if the sample is the first sample at the start of a new half window period (i.e. SAMPNO=0 indicating that all samples in the previous half window have been processed). If the sample is not the first sample at the start of a half window period, then processing continues with elements 1808 and 1810 to update the Goertzel filter parameters and to accumulate the signal and noise energy values. If the sample is the first sample in a new half window period, then processing which relates to completion of the previous half window is performed by operation of element 1814 discussed below.

Element 1814 is operable at the end of a half window period (the start of a new half window period) to determine the signal to noise ratio (SNR) given the accumulated enhanced sample energies and accumulated enhanced noise component energies generated by operation of element 1810 discussed below. The accumulated energy sums generated by operation of element 1810 are also reset by operation of element 1814 to prepare the accumulation for the start of the next Hanning half window period of samples. Element 1816 then tests whether the SNR is above an acceptable threshold. In the present invention, a preferred SNR threshold for many common applications is five. One of ordinary skill in the art will recognize that the preferred SNR threshold may vary according to the needs of each particular flow measuring environment and application. If the SNR value drops below the predetermined threshold value then an SNR fault condition is said to exist for the previous half window period (the just completed half window). If element 1816 determines that there was an SNR fault in the previous half window, then processing continues with element 1818. Otherwise, processing continues with element 1820. Element 1818 is operable to reset the computations involved in the weight adaptation of the notch filters. Specifically, the debiasing parameter ($\alpha$), the forgetting factor ($\lambda$), and the covariance matrix (P) are all reset to states which restart the computations to converge the notch filter on the fundamental frequency of the vibrating flow tubes.

Element 1820 is next operable to determine $\Delta t$ from the complex numbers indicative of phase of the signal on each channel during the period of the immediately preceding sample values. In other words, after each Hanning window of sample values (which occurs every half window as discussed below), a $\Delta t$ value is computed from the immediately preceding Hanning window samples reduced to a complex number indicative of phase for each channel. Element 1820 is further operable to determine the Goertzel filter coefficients for the next period from the accumulated parameters generated by element 1808. The parameter accumulation of element 1808 is also reset to begin a new period. Processing then continue with elements 1808 and 1810 to update the Goertzel filter parameters and accumulate the signal and noise energies.

Element 1808 is operable to update the Goertzel filter by accumulating the average notch filter weights over a half window period. At boundaries of the half window periods, the Goertzel filter weights are updated in preparation for processing of the samples during the next half window period. Element 1808 is also responsive to the generation of the enhanced sampled values and applies the enhanced sample values to a complex Goertzel filter. The Goertzel filter, as discussed above, produces a complex number, accumulated over a series of waveform sample values, representative of the phase of the waveform. This phase value is accumulated for both the left and right channels.

As discussed above, the Goertzel filters are used to accumulate a complex number indicative of the phase of the enhanced sampled signal of each channel. The accumulation continues through a number of samples equal to the length of a Hanning window (said length denoted 2N). The samples in a Hanning window approximately span eight full vibration cycles of the associated flow tube sensor signal. To maximize the utilization of the sampled data, two Goertzel filter computations are performed in parallel on the samples of a channel (totalling four computations, 2 each on the left and right channel). The two parallel computations on a channel are performed on the same enhanced sample values of the channel but one computation begins one half Hanning window length after the other (i.e. delayed by N samples). In other words, the two parallel Goertzel filter computations applied to samples of a channel are separated from one another in time by the one half the Hanning window period of the vibrating flow tube sensor signal samples.

Element 1810 is operable to accumulate the enhanced signal energy and to accumulate the noise energy of the sampled values. The accumulated values are checked at the end of a half window (as discussed above with respect to element 1814) to determine if the signal to noise ratio is within desired limits.

Processing of the method then continues by looping back to element 1802 to await the receipt of another decimated sample value.

FIG. 19 provides additional detail of the operation of element 1806 which updates the filter parameters in preparation for processing another decimated sample value. In addition to the SNR testing discussed above with respect to FIG. 18, another heuristic test is applied in the methods of the present invention to help prevent any instability in the notch filter calculations.

A heuristic test depicted in FIG. 19 checks the computed notch filter weights for stability within a predetermined acceptable range. The newly computed filter weights will not be used for the next sample if they fall outside the acceptable range. In such a case, the previous values of the weights, computed from the previous sample values, will be used until a subsequent computation results in acceptable filter weights.

Elements 1902–1908 are operable to determine the updated forgetting factor, the updated gain vector, the updated debiasing parameter, and the updated covariance matrix from the current sample values, Element 1910 is next operable to determine the updated notch filter weights given the previous weights (computed from the previous sample processing), the gain vector, and debiasing parameter values determined by operation of elements 1902–1908. As discussed above with respect to FIG. 18, when an error is sensed by testing the enhanced signal to noise ratio, the computations associated with the updated coefficients are reset to restart the convergence of the notch on the shifted fundamental frequency of the flow tubes.

Element 1912 is operable to evaluate the stability of the newly computed weights against a predetermined range of acceptable values. If the newly computed weights are in the acceptable range, element 1914 operates to apply the new weights to the notch filters in preparation for the processing of the next decimated samples. If the newly computed weights are outside the acceptable range, the new weights are not applied to the filters, but rather, the previous weights (computed from the processing of the previous sample) are used again for the next decimated sample.

A FIRST PREFERRED EMBODIMENT

In a first exemplary preferred embodiment of the present invention, two adaptive notch filters are utilized, one for filtering discrete digitized samples from the left channel and a second for the right channel. The weight adaptation computations adjust the notch parameters for both adaptive notch filters by sampling the signals associated with the left channel processing.

Figure 3:
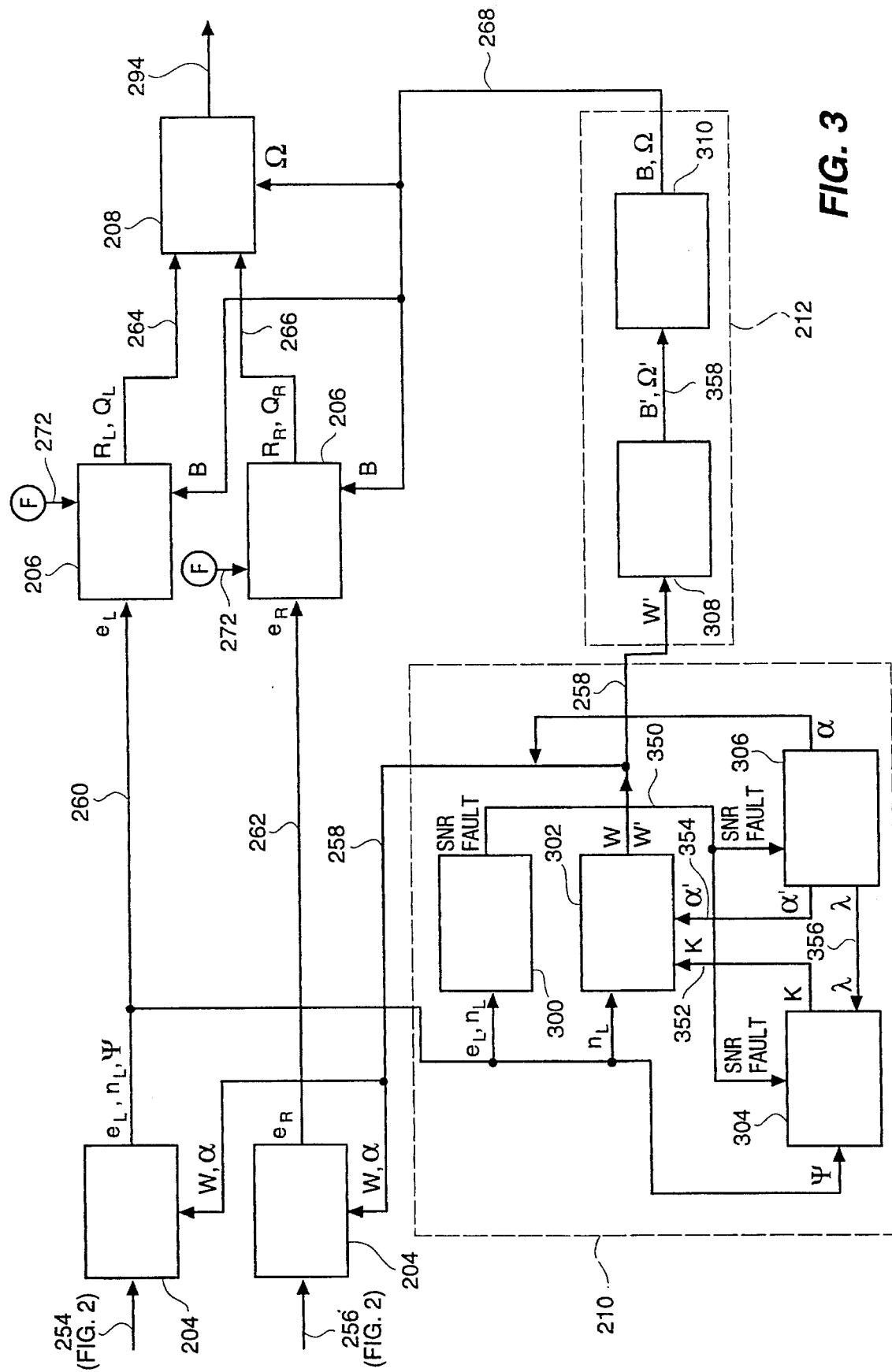
FIG. 3 shows additional detail of a first embodiment of the present invention shown in FIG. 2 wherein a single adaptive notch filter is used in conjunction with each sensor signal.

FIG. 3 decomposes elements of FIG. 2 to show additional detail regarding the flow of information between computational elements of FIG. 2. Computational elements 204 are the adaptive notch filters first depicted in FIG. 2. Left channel adaptive notch filter 204 receives decimated sensor output signal samples ($x_L$) from path 254 (of FIG. 2). Weight coefficients (W) of the notch filter transfer function are received from weight adaptation element 210 over path 258. Debiasing parameter ($\alpha$), which determines the shape of the notch, is also received from weight adaptation element 210 over path 258. Right channel adaptive notch filter 204 receives decimated sensor output signal samples ($x_R$) from path 256 (of FIG. 2) but otherwise operates identically to left channel adaptive notch filter 204. Both the left and right channel adaptive notch filters receive the same adaptation parameters (W and $\alpha$) over path 258 from weight adaptation element 210.

Both the left and right channel adaptive notch filters 204 generate an enhanced signal represented by discrete sample values applied to their respective output paths 260 and 262 respectively. The enhanced signal, denoted $e_L$ and $e_R$ for the left and right channels respectively, represents the associated input signal samples filtered of all noise signals but for a narrow band of frequencies near the fundamental frequency of the vibrating flow tubes.

Left channel adaptive notch filter 204 applies a signal representing the noise portion of the input signal samples ($n_L$) and a value indicating the gradient vector of the input signal sample values ($\Psi$) to its output path 260. These signal values ($e_L$, $n_L$, and $\Psi$) are used by weight adaptation element 210 to determine the weight adaptation parameters for the next adjustment of the notch filter. Both left and right channel adaptive notch filters 204 compute the same functions, however, the noise and gradient values from the right channel adaptive notch filter are not used in the methods and apparatus of the present invention. In practice, the unused signals for the right channel adaptive notch filter 204 are not computed by the DSP software of the preferred embodiment. The functions computed by adaptive notch filters 204 are discussed in detail below.

The enhanced signal values from the left and right channel adaptive notch filters 204 are received over paths 260 and 262, respectively, by phase computation elements 206. Phase computation elements 206 determine the phase of the sinusoidal signals represented by the enhanced discrete sample signals applied to their respective inputs on paths 260 and 262.

The Fourier transform phase computation elements 206 utilize a Hanning window weighting method to sum 2N discrete weighted samples on each channel which represent eight cycles of the corresponding sinusoidal input signals. As discussed below, various computational elements in the present invention apply their respective computations to data received during half of the Hanning window period (samples 0 ... N-1). The value SAMPNO indicative of the particular sample of the present half window cycle (sample 0 ... N-1) is received as an input over path 272 to phase computation elements 206. The SAMPNO value is used as an index to a vector of weights applied to the enhanced sampled signal values for the first and seconds halves of the Hanning window. These weighting methods are employed by the phase computation elements 206 discussed below.

Phase computation elements 206 apply a Goertzel filter Fourier transform to the filtered discrete sampled signal values to determine the phase of the sinusoidal signal on each channel of the system. The coefficients of the Goertzel filter (B—a complex number) are supplied to phase computation elements 206 by frequency computation element 212 over path 268. The Goertzel filter processes the samples in each Hanning window to generate a complex number representing the phase of the sampled sinusoidal sensor output signals.

The complex number values generated by the phase computation elements 206 are applied to paths 264 and 266 for the left and right channels, respectively. At computation element 208 receives the complex numbers indicative of the phase of the sampled signals on paths 264 and 266 corresponding to the left and right channel signals, respectively. At computation element 208 receives a number ($\Omega$) indicating the current the fundamental frequency of the vibrating flow tubes from frequency computation element 212 over path 268.

To more fully utilize the data available from each channel, the phase, frequency, and $\Delta t$ computations are performed every half window (half the Hanning window length as determined above). Two parallel phase computations are performed on the filtered discrete sampled input values on each channel. Each of the two parallel computations completes once for every full window of filtered discrete sample values. The parallel computations are offset from one another in time by the period corresponding to a number of samples equal to half the length of the Hanning window. Since the two computational elements are offset from one another by one half of the length of the Hanning window, one of the two parallel computations completes its computation every half window period on each channel. Therefore, every half window period of time, a new phase, frequency, and $\Delta t$ computation is completed and utilized for mass flow rate measurements.

Weight adaptation element 210 of FIG. 2 is shown decomposed into four sub-elements, namely SNR fault detection element 300, notch filter weight computation element 302, gain vector computation element 304, and debiasing parameter computation element 306.

SNR fault detection element 300 receives the enhanced signal values ($e_L$) and the noise component of the unfiltered sample values ($n_L$), both generated by the left channel notch filter 204 and applied to path 260. SNR fault detection element 300 determines whether the energy ratio of the enhanced signal values ($e_L$) to the noise component of the unfiltered sample values ($n_L$) is below a threshold level. When the signal to noise ratio drops below a pre-determined lower limit, it typically indicates that the notch filter 204 is not converged on the fundamental frequency of the vibrating flow tubes. When the signal to noise ratio is found to be deficient, an SNR FAULT signal is generated and applied to the output of SNR fault detection element 300 on path 350 of FIG. 3. As discussed below, the SNR FAULT signal applied to path 350 is used by other computational elements within weight adaptation element 210 to restart the computations used to adapt the notch filter and to converge the notch on the fundamental frequency of the vibrating flow tubes. The precise computation and details of SNR fault detection element 300 are presented below with respect to FIG. 7.

Notch filter weight computation element 302 receives the noise component of the unfiltered sample values ($n_L$) generated by the left channel notch filter 204 and applied to path 260. Element 302 also receives the gain vector values (K—a two element vector) generated by gain vector computation element 304 and applied to path 352. In addition, element 302 receives the updated debiasing parameter ($\alpha'$) generated by debiasing parameter computation element 306 and applied to path 354. Notch filter weight computation element then computes the updated values of the notch filter weights (W) and applies them to path 258 for use by notch filters 204 and frequency calculation element 212. The precise computation and details of notch filter computation element 302 are presented below with respect to FIG. 6.

Gain vector computation element 304 receives the gradient ($\Psi$) generated by left channel notch filter 204 and applied to path 260. Element 304 also receives the SNR FAULT signal generated by SNR fault detection element 300 and applied to path 350. In addition, element 304 receives forgetting factor ($\pi$) generated by debiasing parameter computation element 306 and applied to path 356. Gain vector computation element 304 then computes the updated values of the gain vector (K) and applies them to path 352 for use by notch filter weight computation element 302. The precise computation and details of gain vector computation element 304 are presented below with respect to FIG. 5.

Debiasing parameter computation element 306 receives the SNR FAULT signal generated by SNR fault detection element 300 and applied to path 350. Debiasing parameter computation element 306 then computes the updated values of the debiasing parameter ($\alpha$) and applies it to path 258 for use by notch filters 204. Debiasing parameter computation element 306 also computes an updated debiasing parameter ($\alpha'$) and applies it to path 354 for use by notch filter weight computation element 302. In addition, debiasing computation element 306 computes an updated forgetting factor ($\pi$) and applies it to path 356 for use by gain vector computation element 304. The precise computation and details of debiasing parameter computation element 306 are presented below with respect to FIG. 8.

Frequency calculation element 212 of FIG. 2 is shown decomposed into two sub-elements, namely Goertzel filter weights computation element 308 and half window coefficient pipeline 310.

Goertzel filter weights computation element 308 accepts the notch filter weights determined by operation of weight adaptation element 210 and applied to path 258. Goertzel filter weights computation element 308 then determines the Goertzel filter weights (B') as a complex number and also determines the frequency ($\Omega'$) of the sinusoidal flow tube sensor output signal represented by the discrete sampled signal values and as contained in the weights of the notch filter. Both values so determined are computed at the end of each half window period as indicated by the haft window signal applied to path 274 by CLOCK 214 of FIG. 2. The Goertzel weights and frequency so determined are applied to path 358 for use by half window coefficient pipeline 310. The precise computation and details of Goertzel filter weights computation element 308 are presented below with respect to FIG. 9.

Haft window coefficient pipeline 310 receives the Goertzel filter weights (B') and the frequency ($\Omega'$) both computed as above by Goertzel filter weights computation element 308. Half window coefficient pipeline 310 then adjusts the timing of the computed values (B' and $\Omega'$) to associate them with one of the two parallel computations for the overlapping half windows. The precise computation and details of half window coefficient pipeline 310 are presented below with respect to FIG. 10.

As noted previously, the computations performed by the elements depicted in FIG. 3 (and other detailed figures discussed below) are preferably performed using floating point arithmetic to maintain accuracy over a broad scale of numeric precision. Floating point computation functions may be performed by hardware within the signal processor 2000 of FIG. 20 or may be emulated by processor 2000 using software library functions. Performance and cost factors will determine the choice between floating point hardware and software as appropriate for each application of the present invention.

A FIRST EXEMPLARY EMBODIMENT- NOTCH FILTER

Figure 4:
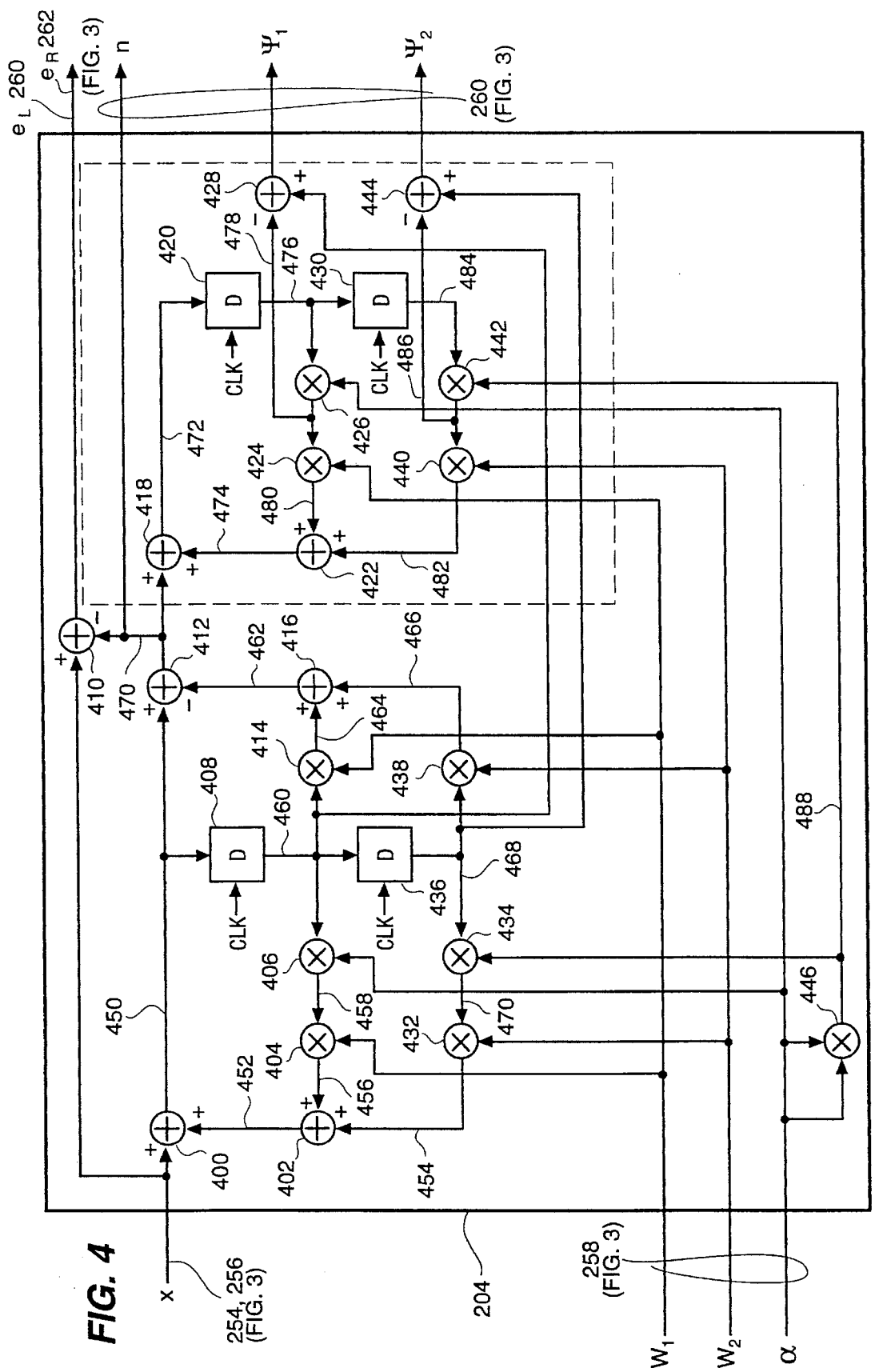
FIGS. 4–12 show additional detail of the computational elements of the first embodiment of the present invention shown in FIG. 3.

FIG. 4 shows additional detail regarding the function and computations performed within adaptive notch filters 204 of FIG. 3. Both adaptive notch filters 204, one associated with the left channel and the other with the right channel, are identical in structure and the computations performed. The left channel adaptive notch filter 204 receives decimated discrete time sample sensor values as input from path 254 and applies its filtered output to path 260. The right channel adaptive notch filter 204 receives decimated discrete time sample sensor values as input from path 256 and applies its filtered output to path 262.

Adaptive notch filter 204 also receives current weights (W a two element vector represented as $W_1$, $W_2$) and the debiasing parameter ($\alpha$) from weight adaptation element 210 of FIG. 3 over path 258. Adaptive notch filter 204 generates the square of the debiasing parameter ($\alpha^2$) by applying it from path 258 to both inputs of multiplication junction 446 the output of which is applied to path 488.

A portion of the elements within adaptive notch filter 204 of FIG. 4, denoted by the dashed line box within the adaptive notch filter 204, are used to compute the gradient of the input signal samples ($\Psi$a two element vector represented as $\Psi_1$, $\Psi_2$). The gradient value so computed is applied to path 260 in the adaptive notch filter 204 of the left channel. The gradient is used by the weight adaptation element 210 of FIG. 3 to compute updated notch filter weights for the next sample received on path 254. The elements in the dashed box of FIG. 4 used to compute the gradient are not used in the adaptive notch filter 204 of the right channel.

The adaptive notch filter 204 of FIG. 4 determines the noise present in the discrete sample input values. Subtracting the noise signal values from the input sample values yields the enhanced filtered value for output on path 260. The adaptive notch filter 204 determines the enhanced signal value e by a second order filter polynomial and matrix arithmetic as follows (where variable(t) as used in the equations below indicates the value of variable corresponding to sample period "t"):

| | |
|---|---|
| $x(t)$ | the input signal value received on path 254 (256 for the right channel) |
| $A(t) = \text{diag}(\alpha(t), \alpha(t)^2)$ | the debiasing diagonal matrix |
| $W(t) = [W_1(t), W_2(t)]$ | the weights vector |
| $Y(t) = [y(t-1), y(t-2)]$ | the recursive filter state vector |
| $y(t) = x(t) + W(t)A(t)Y(t)$ | intermediate computation |
| $n(t) = y(t) - W(t)Y(t)$ | the noise signals isolated from the input signal x |
| $e(t) = x(t) - n(t)$ | the enhanced signal, input signal x − noise signals n |

The pseudo-circuits of FIG. 4 describe these equations in the form of circuit and computational elements. Summing junction 400 sums the input signal value x on path 254 (256 for the right channel) and the intermediate computation value on path 452 (representing WAY as above) to generate y=x+WAY as above which is applied to path 450. The value of y on path 450 is applied as input to delay circuit 408 to delay it one sample clock period (CLK) then apply it to output path 460. The once delayed value of y on path 460 is input to delay circuit 436 to delay it a second sample clock period (CLK) then apply it to output path 468. The once delayed value of y on path 460 and the twice delayed value of y on path 468 represent the vector Y as above.

The debiasing diagonal matrix A is comprised of the debiasing parameter and its square ($\alpha$ and $\alpha^2$) on paths 258 and 488, respectively. The vector Y on paths 460 and 468 is multiplied by the debiasing diagonal matrix A applied to paths 258 and 488 through multiplication junctions 406 and 434, respectively, to produce AY on paths 458 and 470, respectively. This product is in turn multiplied by the weights vector W applied to path 258 through multiplication junctions 404 and 432, respectively, to produce intermediate computational values on paths 456 and 454, respectively. The two intermediate values on paths 456 and 454, respectively, are applied to summing junction 402 to produce the scalar value WAY on path 452 as described above.

The vector Y on paths 460 and 468 is also multiplied by the weights vector W on path 258 through multiplication junctions 414 and 438, respectively, to produce intermediate values on paths 464 and 466. The two intermediate values on paths 464 and 466 are summed through summing junction 416 to produce the value WY on path 462.

Summing junction 412 subtracts the value WY on path 462 from the value y on path 450 to produce the noise value n=y−WY on path 470. In the adaptive notch filter 204 of the left channel, this value representing the noise portion n of the input sample values x is applied to path 260 for use in the weight adaptation element 210 of FIG. 3.

Summing junction 410 subtracts the noise value n on path 470 from the input sample value x on path 254 (256 for the right channel) to produce the enhanced signal value e=x−n on path 260 (262 for the right channel). The enhanced signal value is used in subsequent phase computation elements 206 and in weight adaptation element 210 as discussed below.

In addition to the noise value, n, and the enhanced signal value, e, the adaptive notch filter 204 computes the gradient vector $\Psi$ as $\Psi_1$, and $\Psi_2$ on path 260. The adaptive notch filter 204 determines the gradient vector $\Psi$ a second order filter polynomial and matrix arithmetic as follows:

| | |
|---|---|
| $F(t) = [f(t-1),f(t-2)]^T$ | recursive filter state vector |
| $f(t) = n(t) + W(t)A(t)F(t)$ | intermediate computation |
| $\psi(t) = Y(t) - A(t)F(t)$ | gradient vector |

Summing junction 418 adds the noise value n on its input path 470 to the intermediate computation value WAF on its input path 474 to produce f=n+WAF on path 472. The value f on path 472 is applied as input to delay circuit 420 to delay it one sample clock period (CLK) then apply it to output path 476. The once delayed value of f on path 476 is input to delay circuit 430 to delay it a second sample clock period (CLK) then apply it to output path 484. The once delayed value of f on path 476 and the twice delayed value of f on path 484 represent the vector F as above.

The vector F on paths 476 and 484 is multiplied by the debiasing diagonal matrix A applied to paths 258 and 488 through multiplication junctions 426 and 442, respectively, to produce AF on paths 478 and 486 respectively. This product is in turn multiplied by the weights vector W applied to path 258 through multiplication junctions 424 and 440, respectively, to produce intermediate computational values on paths 480 and 482, respectively. The two intermediate values on paths 480 and 482, respectively, are applied to summing junction 422 to produce the scalar value WAF on path 474 as described above.

The intermediate product AF on paths 478 and 486 is subtracted from the Y vector on paths 460 and 468 through summing junctions 428 and 444 to produce the gradient vector $\Psi$ ($\Psi_1$, $\Psi_2$)=Y−AF and apply it path 260. The gradient vector on path 260 is used by weight adaptation element 210 of FIG. 3 to compute the updated notch filter weights.

Both the left and right channel adaptive notch filters 204 operate as described above. The computation of the gradient vector $\Psi$ and the noise value n on path 260 is unnecessary in the right channel and so may be skipped as a computational step in the right channel. The weight adaptation element 210 utilizes only the values from the left channel applied to path 260 to adjust the weights for both adaptive notch filters 204. Only the enhanced signal value e is used from the right channel and is applied to path 262 for use by the phase computation elements 206.

A FIRST EXEMPLARY EMBODIMENT- WEIGHT ADAPTATION

The weight adaptation element 210 of FIG. 3 receives the enhanced signal value $e_L$, the noise portion of the unfiltered input signal $n_L$, and the gradient $\Psi$ all generated by the adaptive notch filter 204 of the left channel and applied to path 260. Weight adaptation element 210 then determines the weights vector W and the debiasing parameter $\alpha$ and applies them to path 258 to adjust notch filters of both channels for the next discrete sampled value to be processed in adaptive notch filter 204. To simplify this description of the weight adaptation functions, weight adaptation element 210 is decomposed into four sub-elements each performing portions of the total computation, namely SNR fault detection element 300, notch filter weight computation element 302, gain vector computation element 304, and debiasing parameter computation element 306.

Figure 7:
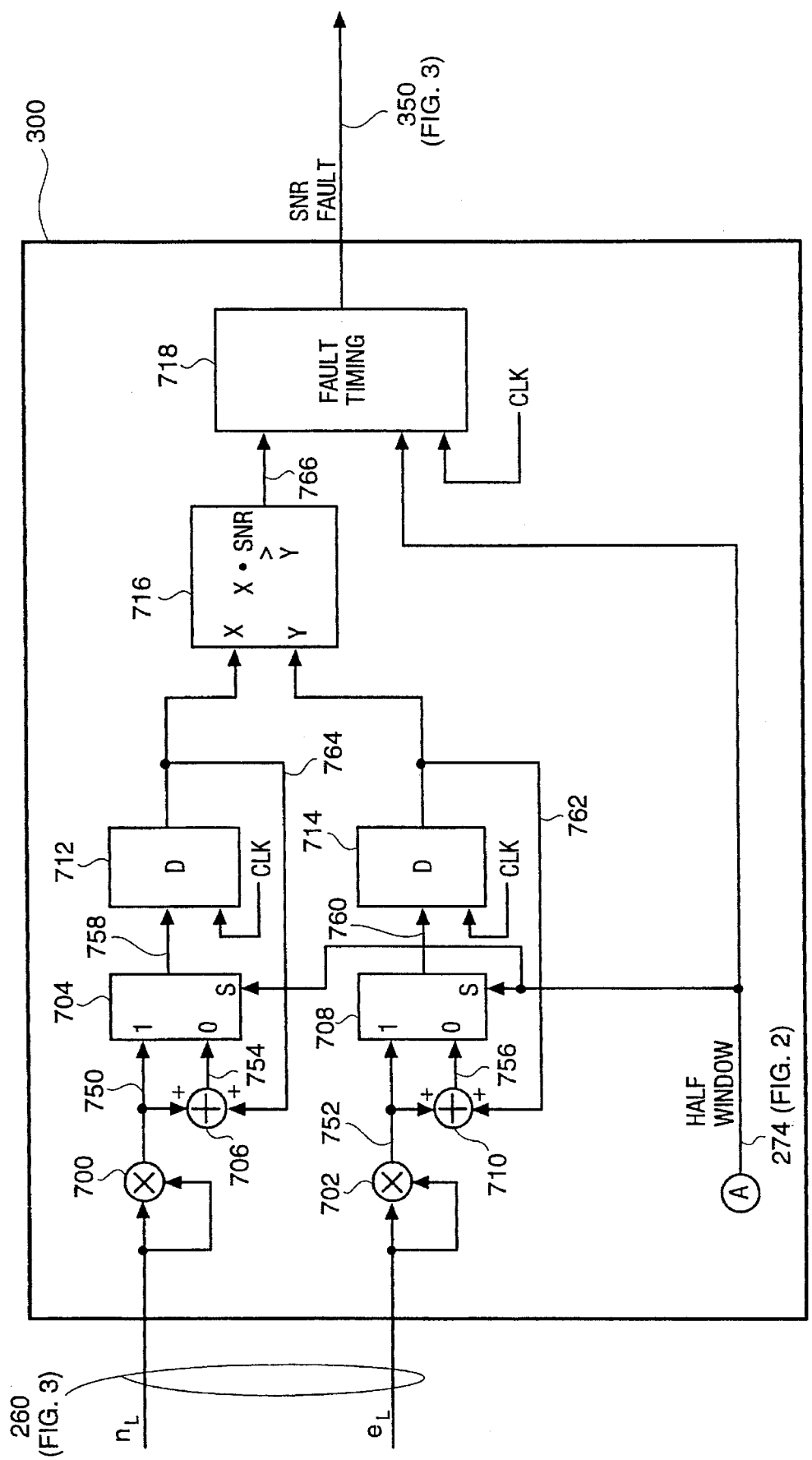

SNR fault detection element 300, depicted in additional detail in FIG. 7, receives the enhanced signal values ($e_L$) and the noise component of the unfiltered sample values ($n_L$), both generated by the left channel notch filter 204 and applied to path 260. SNR fault detection element 300 determines whether the energy ratio of the enhanced signal values ($e_L$) to the noise component of the unfiltered sample values ($n_L$) is below a threshold level as discussed above. SNR fault detection element 300 is depicted in additional detail in FIG. 7.

The SNR fault detection element 300 of FIG. 7 determines the signal to noise ratio by summing the noise energy and summing the noise cancelled energy, then comparing the ratio of the two values against a pre-determined threshold values. SNR fault detection element receives the enhanced signal value $e_L$ and the noise signal $n_L$ from the left channel over path 260.

The noise signal value is applied to both inputs of multiplication junction 700 to produce the square of the noise signal $n^2$ and apply it to path 750. The $n^2$ value on path 750 is applied to one input of a 2:1 mux 704 and to one input of summing junction 706. The output of mux 704 is applied to the input of register 712 via path 758. Register 712 stores the value on its input when clocked by the CLK sample clock. The current value in register 712 is applied to its output through path 764 to the other input of summing junction 706. The sum output of summing junction 706 is applied over path 754 to the other input of mux 704. At the start of each half window period, as signalled on path 274, mux 704 selects its input connected to the $n^2$ value on path 750 to restart the summing of the noise energy for a new half window period. For all other samples in the half window period, mux 704 selects its input connected to path 754 to accumulate the noise energy. The accumulated noise energy is accumulated in register 712 for each sample in the half window period and the current accumulated sum is applied to the output of register 712 on path 764. The accumulated sum is restarted on each new half window period.

The noise-cancelled signal energy is accumulated in like fashion by squaring and accumulating the enhanced signal value received on path 260. The noise-cancelled energy is accumulated by operation of multiplication junction 702, summing junction 710, mux 708, and register 714, over paths 752, 756, 760, and 762 in a similar manner to that described above for accumulation of noise energy. The noise-cancelled energy accumulated through each half window period of sampled values is applied to the output of register 714 to path 762.

Computational element 716 receives the accumulated noise energy over path 764 and the accumulated noise-cancelled energy over path 762 and compares the values to pre-determined threshold values. The ratio of the accumulated noise-cancelled value and the accumulated noise value is the signal to noise ratio. If the ratio drops below a pre-determined threshold, then a signal to noise ratio fault condition is detected and a signal so indicating is applied to the output of computational element 716.

Fault timing element 718 receives the fault condition signal on path 766 generated by computational element 716 and receives the half window signal on path 274. When a fault condition is sensed on input path 766, fault timing element 718 applies a pulse signal to SNR FAULT on path 350. The SNR fault signal on path 350 is sensed by other sub-elements within weight adaptation element 210 to force a reset of various notch parameter computations. Following application of a signal to SNR FAULT, fault timing element 718 enforces a grace period during which no further signals are applied to the SNR FAULT signal on path 350. The grace period is intended to allow the notch filter parameters a period of time to re-converge on the fundamental frequency of the vibrating flow tubes. The fault timing element 718 also enforces a grace period during power-on initialization to permit the notch filters to converge on the fundamental frequency. The grace period during power-on initialization is preferably approximately 100 half window periods. The grace period following the detection of an SNR FAULT is preferably approximately 66 half window periods.

Figure 6:
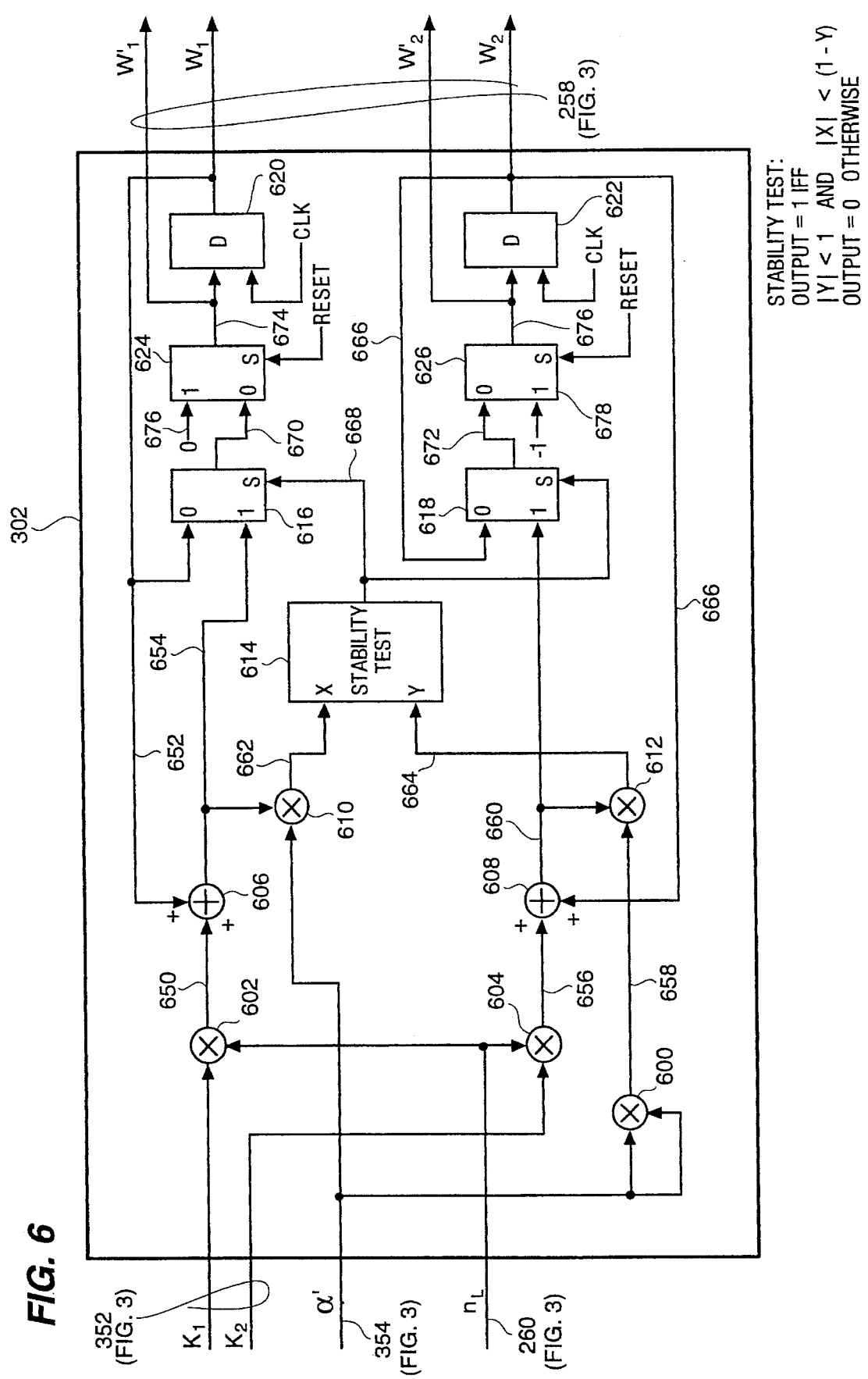

Notch filter weight computation element 302, depicted in additional detail in FIG. 6, receives the noise component of the unfiltered sample values ($n_L$) generated by the left channel notch filter 204 and applied to path 260. Element 302 also receives the gain vector values (K) generated by gain vector computation element 304 and applied to path 352. In addition, element 302 receives the updated debiasing parameter ($\alpha'$) generated by debiasing parameter computation element 306 and applied to path 354. Notch filter weight computation element 302 then computes the updated values of the notch filter weights (W) and applies them to path 258 for use by notch filters 204 and frequency calculation element 212.

The notch filter weight computation element 302 determines the weights W for the adaptive notch filters 204 by matrix arithmetic as follows:

| | |
|---|---|
| $W'(t) = W(t) + n(t)K(t)$ | the updated weights vector if stable, otherwise, |
| $W'(t) = W(t)$ | weights not updated if unstable |

Multiplication junctions 602 and 604 multiply the gain vector K ($K_1$, $K_2$) on path 352 by the noise component (n) of the signal sample received on path 260 to produce the product nK on paths 650 and 656. The product on path 650 is applied to summing junction 606. The other input to summing junction 606 is the previously computed $W_1$ weight on path 652. The output of summing junction 606 is $W_1 + nK_1$ and is applied to the normally selected input of mux 616 over path 654. The output of mux 616 is applied over path 670 to the normally selected input of mux 624. This input value is normally passed through mux 624 onto output path 674 to the input of delay circuit 620, and to bus 258 as the next updated value of $W_1'$ (where $W_X'$ indicates the value of $W_X$ to be used for the next received sample value) for use in computation of the Goertzel weights in element 308. The once delayed coefficient ($W_1$) from delay circuit 620 is applied to bus 258 as $W_1$ for use by the notch filters 204. The normally deselected input of mux 624 on path 676 is selected by a system RESET signal to apply the zero value (0) as the initial value of the $W_1$ weight.

The other partial product on path 656 is applied to summing junction 608. The other input to summing junction 608 is the previously computed $W_2$ weight on path 666. The output of summing junction 608 is $W_2 + nK_2$ and is applied to the normally selected input of mux 618 over path 660. The output of mux 618 is applied over path 672 to the normally selected input of mux 626. This input value is normally passed through mux 626 onto output path 676 to the input of delay circuit 622, and to bus 258 as the next updated value of $W_2'$ for use in computation of the Goertzel weights in element 308. The once delayed coefficient ($W_2$) from delay circuit 622 is applied to bus 258 as $W_2$ for use by the notch filters 204. The normally deselected input of mux 626 on path 678 is selected by a system RESET signal to apply the negative one value (−1) as the initial value of the $W_2$ weight.

Multiplication junction 600 receives the updated debiasing parameter $\alpha'$ (where $\alpha'$ indicates the value of $\alpha$ to be used for the next received sample value) on path 354 as both inputs and produces the square value $\alpha'^2$ on its output path 658. Multiplication junction 610 receives debiasing parameter $\alpha'$ on path 354 as one input and the updated weight $W_1$ on path 654 as the other input and produces the product $\alpha'W_1$ on its output 662. Multiplication junction 612 receives the squared debiasing parameter $\alpha'^2$ on path 658 as one input and the updated weight $W_2$ on path 660 as the other input and produces the product $\alpha'^2W_2$ on its output 664. Stability test element 614 receives a first parameter $X=\alpha'W_1$ on path 662 and a second parameter $Y=\alpha'^2W_2$ on path 664. The stability test element 614 evaluates the X and Y parameters and generates a one output signal if the conditions of the test are satisfied. The stability test outputs a one signal if and only if:

$$|Y|<1 \text{ and } |X|<(1-Y)$$

This test constrains the poles of the notch filter to be within the unit circle to assure the stability of the notch filters 204 and thereby the validity of the resultant mass flow measurements. The output of stability test element 614 is applied to the select inputs of muxes 616 and 618 over path 668. The normally deselected input of muxes 616 and 618 receive the previously computed value of $W_1$ and $W_2$, respectively. If the updated notch filter weights fail the stability test performed by element 614, a zero output signal is generated by test element 614 on its output path 668. In response to the zero output signal on path 668, muxes 616 and 618 apply their respective normally deselected inputs on paths 652 and 666, respectively, to their output paths 670 and 672, respectively, so that the previous computed value of the corresponding coefficient is re-used for the next samples value to be processed. In other words, the weight vector will not be changed from the last stable computed values so long as the stability test element 614 indicates instability of the computations. This test eliminates the numerical problems associated with an unstable notch filter weight computation and also helps prevent grossly erroneous flow rate computations during a period of brief instability Of the notch filters as they converge on a change in the fundamental frequency of the vibrating flow tubes.

Figure 5:
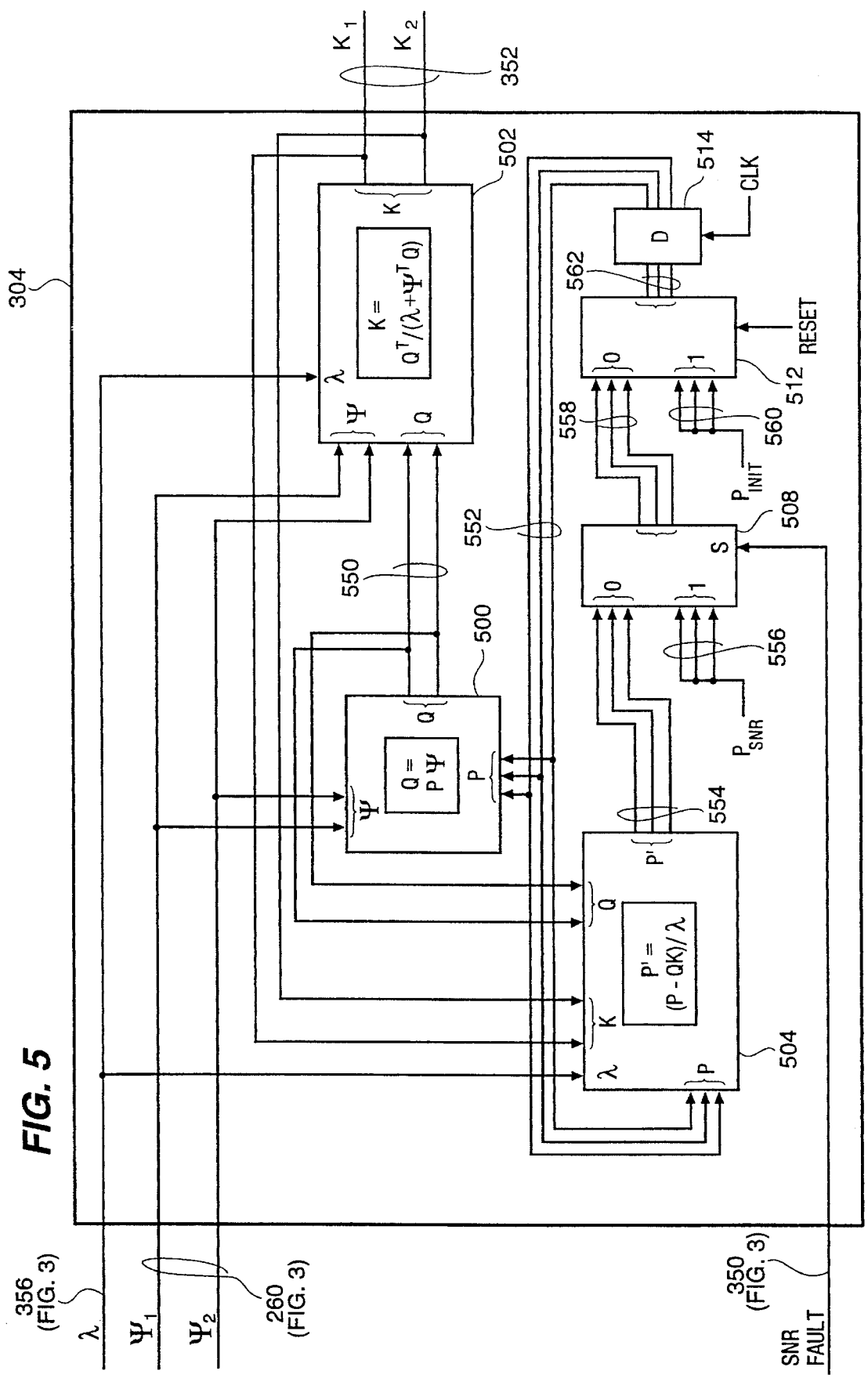

Gain vector computation element 304, shown in additional detail in FIG. 5, receives the gradient ($\Psi$) generated by left channel notch filter 204 and applied to path 260. Element 304 also receives the SNR FAULT signal generated by SNR fault detection element 300 and applied to path 350. In addition, element 304 receives forgetting factor ($\pi$) generated by debiasing parameter computation element 306 and applied to path 356. Gain vector computation element 304 then computes the updated values of the gain vector (K) and applies them to path 352 for use by notch filter weight computation element 302.

Gain vector computation element 304, shown in additional detail in FIG. 5, receives the gradient vector ($\Psi$) on path 260, the forgetting factor ($\pi$) on path 356 and the SNR FAULT signal on path 350, computes the gain vector ($K_1$, $K_2$) and applies the computed gain vector to path 352 for further processing. The computational elements depicted in FIG. 5 generally perform matrix manipulations on their various inputs to produce an output computed scalar value or vector. The gain vector computation element 304 determines the gain vector K using matrix arithmetic as follows:

| | |
|---|---|
| $K(t) = Q^T(t)/(\lambda(t) + \psi(t)^T Q(t))$ | the updated gain vector |
| $Q(t) = P(t)\psi(t)$ | intermediate computation vector |
| $P'(t) = (P(t) - Q(t)K(t))/\lambda(t)$ | the next covariance matrix |

Computational element 500 receives the gradient vector $\Psi$ over path 260 and receives the current covariance matrix (P) over path 552 from delay circuit 514. As can be seen in FIG. 5, paths which carry the signals representing the covariance matrix (P) are shown with three signals. This indicates the symmetric nature of the 2×2 covariance matrix. The two off-diagonal elements of the 2×2 covariance matrix (P) are always equal. Therefore only three values need be represented in the implementation of the present invention (whether in the pseudo circuit of FIG. 5 or in the DSP software preferred embodiment). Computational element 500 then calculates the intermediate product $Q=P\Psi$ and applies the Q vector to path 550. Computational element 502 receives the intermediate Q vector on path 550, receives the gradient vector $\Psi$ on path 260, receives the forgetting factor $\pi$ on path 356, calculates the gain vector K ($K_1,K_2$), and applies the gain vector to path 352 for further processing.

Element 504 receives the current value of the current covariance matrix P on path 552, receives the current gain vector K on path 352, receives the current Q vector on path 550, calculates a new covariance matrix $P'=(P-QK)/\pi$, and applies the new covariance matrix P' to path 554 for use as P in processing the next sample received. Muxes 508 and 512 are used to reset the computations performed by element 504 when a system reset occurs or when an SNR FAULT condition is detected. Mux 508 normally applies the new covariance matrix on its input path 554 to its output path 558. When an SNR FAULT signal is applied to path 350, mux 508 selects its other input path 556 to apply an initial matrix value (PSNR) to its output path 558. Mux 512 normally applies the value on its input path 558 to its output path 562 as input to delay register 514. When a system reset is applied, mux 512 selects its other input path 560 to apply an initial matrix value ($P_{INIT}$) to its output path 562. In other words, if either a system reset or an SNR FAULT condition is sensed, covariance matrix computation is reset. Otherwise, the computation of the next covariance matrix (P' to be used with the next sample received) is a function of the previous covariance matrix (P) applied to path 554 through muxes 508 and 512 onto path 562. Delay circuit 514 delays application of its input on path 562 until the next sample value is received for processing as signalled by a CLK pulse, then applies its stored value onto its output path 552 as input to the covariance computational element 504.

Figure 8:
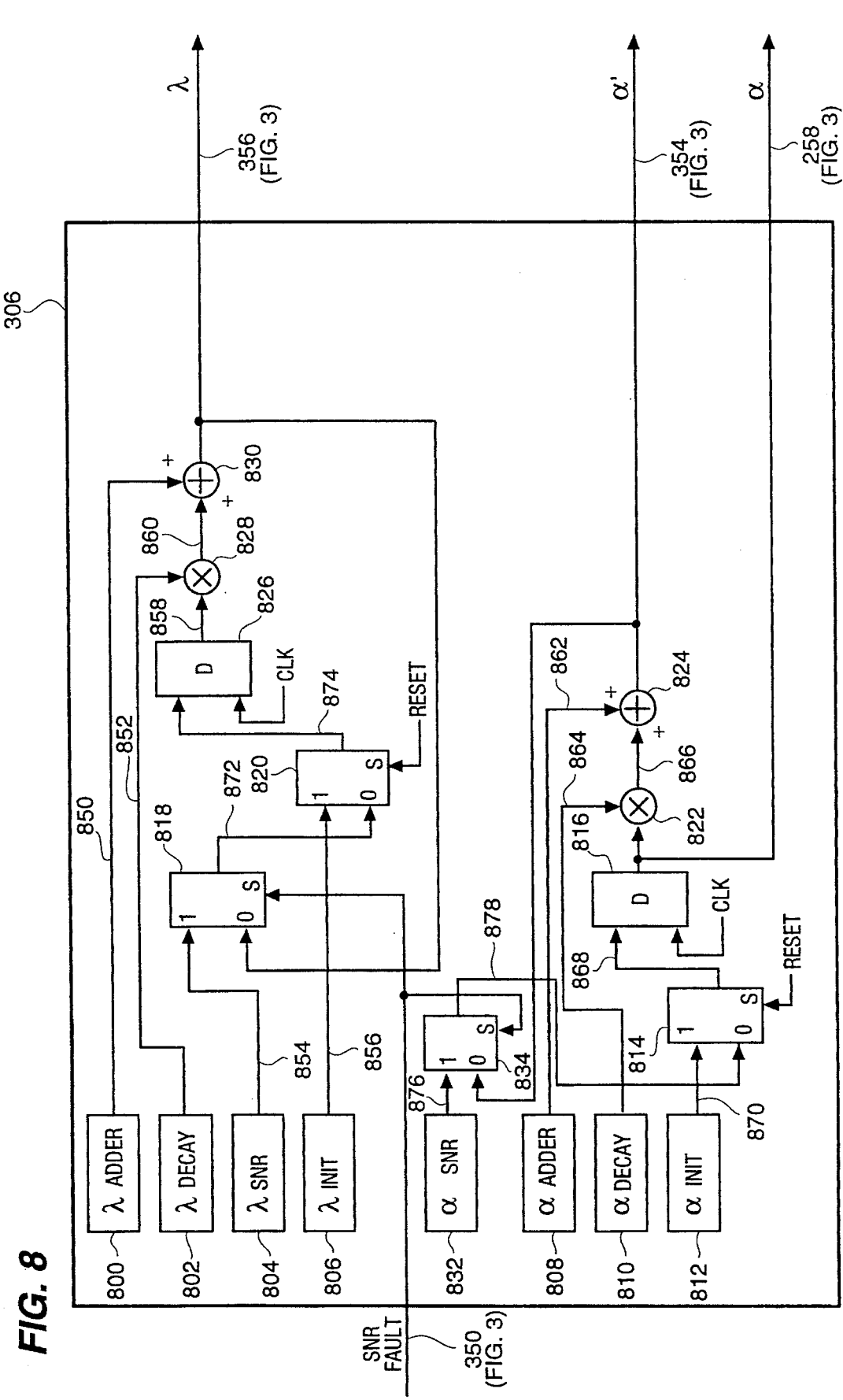

Debiasing parameter computation element 306, shown in additional detail in FIG. 8, receives the SNR FAULT signal generated by SNR fault detection element 300 and applied to path 350. Debiasing parameter computation element 306 then computes the updated values of the debiasing parameter ($\alpha$) and applies it to path 258 for use by notch filters 204. Debiasing parameter computation element 306 also computes an updated debiasing parameter for the next sample ($\alpha'$) and applies it to path 354 for use by notch filter weight computation element 302. In addition, debiasing computation element 306 computes an updated forgetting factor ($\pi$) and applies it to path 356 for use by gain vector computation element 304.

The debiasing parameter computation element 306 determines the debiasing parameters and the forgetting factor as follows:

| | |
|---|---|
| $\alpha'(t) = \alpha(t)\alpha_{DECAY} + \alpha_{ADDER}$ | the updated debiasing parameter computation |
| $\lambda(t) = \lambda'(t-1)\lambda_{DECAY} + \lambda_{ADDER}$ | the updated forgetting factor computation |

Registers 800, 802, 804, and 806 each contain values used in the computation of the forgetting factor $\pi$. 2:1 mux 818 receives one input from path 356 on which is applied the previous value of the forgetting factor $\pi$. Mux 818 is normally selected to pass this value through to output path 872 and onto one input of 2:1 mux 820. Mux 820 is normally selected to pass this value through to output path 874 and onto the input of register 826. Register 826 contains this previous value of the forgetting factor $\pi$ until its clock line is pulsed by the CLK signal. The value in register 826 is applied to its output on path 858 to one input of multiplication junction 828. The other input of multiplication junction 828 is path 852 which receives the $\pi_{DECAY}$ value stored in register 802. The product of multiplication junction 828, $\pi.\pi_{DECAY}$ is applied to its output path 860 and onto one input of summing junction 830. The other input of summing junction 830 is path 850 which receives the $\pi_{ADDER}$ value stored in register 800. The sum result of summing junction 830 is applied to path 356 as the updated forgetting factor $\pi=\pi.\pi_{DECAY}+\pi_{ADDER}$.

When SNR FAULT signal is applied to path 350, mux 818 selects its input from path 854 which receives the $\pi_{SNR}$ stored in register 804. This value is then applied to the output of mux 818 to path 872 and substitutes for the previous forgetting factor normally used in the normal computation of the next value. This pre-defined value resets the computation of the forgetting factor π on path 356 whenever an SNR FAULT condition is recognized as discussed above. This pre-determined forgetting factor restarts the computations of the adaptive notch filter for purposes of forcing convergence on the fundamental frequency of the vibrating flow tubes.

When a system wide RESET is applied to mux 820, the mux selects its input from path 856 which receives the $\lambda_{INIT}$ stored in register 806. This value is then applied to the output of mux 820 to path 874 and substitutes for the previous forgetting factor used in normal computation of the next value. This pre-determined forgetting factor starts the computations of the adaptive notch filter for purposes of forcing convergence on the fundamental frequency of the vibrating flow tubes.

Registers 808, 810, 812, and 832 each contain values used in the computation of the debiasing parameter α. 2:1 mux 834 receives one input from path 354 on which is applied the previous value of the debiasing parameter α. Mux 834 is normally selected to pass this value through to output path 878 and onto the input of mux 814. Mux 814 is, in turn, normally selected to pass this value through to output path 868 and apply it to the input of register 816. Register 816 contains this previous value of the debiasing parameter α until its clock line is pulsed by the CLK signal. The value in register 816 is applied to its output on path 258 to one input of multiplication junction 822 and to adaptive notch filters 204 of FIG. 3. The other input of multiplication junction 822 is path 864 which receives the $\alpha_{DECAY}$ value stored in register 810. The product of multiplication junction 822, $\alpha \cdot \alpha_{DECAY}$ is applied to its output path 866 and onto one input of summing junction 824. The other input of summing junction 824 is path 862 which receives the $\alpha_{ADDER}$ value stored in register 808. The sum result of summing junction 824 is applied to path 354 as the updated debiasing parameter $\alpha' = \alpha \cdot \alpha_{DECAY} + \alpha_{ADDER}$.

When SNR FAULT signal is applied to path 350, mux 834 selects its input from path 876 which receives the $\alpha_{SNR}$ stored in register 832. This value is then applied to the output of mux 834 to path 878 and substitutes for the previous debiasing parameter normally used in the normal computation of the next value. This pre-defined value resets the computation of the debiasing parameter α on path 354 whenever an SNR FAULT condition is recognized as discussed above. This pre-determined debiasing parameter restarts the computations of the adaptive notch filter for purposes of forcing convergence on the fundamental frequency of the vibrating flow tubes.

When a system wide RESET is applied to mux 814, the mux selects its input from path 870 which receives the $\alpha_{INIT}$ stored in register 812. This value is then applied to the output of mux 814 to path 868 and substitutes for the previous debiasing parameter used in normal computation of the next value. This pre-determined debiasing parameter starts the computations of the adaptive notch filter for purposes of forcing convergence on the fundamental frequency of the vibrating flow tubes.

A FIRST EXEMPLARY EMBODIMENT- FREQUENCY CALCULATIONS

Frequency calculation element 212 of FIG. 3 is shown decomposed into two sub-elements, namely Goertzel filter weights computation element 308 and half window coefficient pipeline 310.

Figure 9:
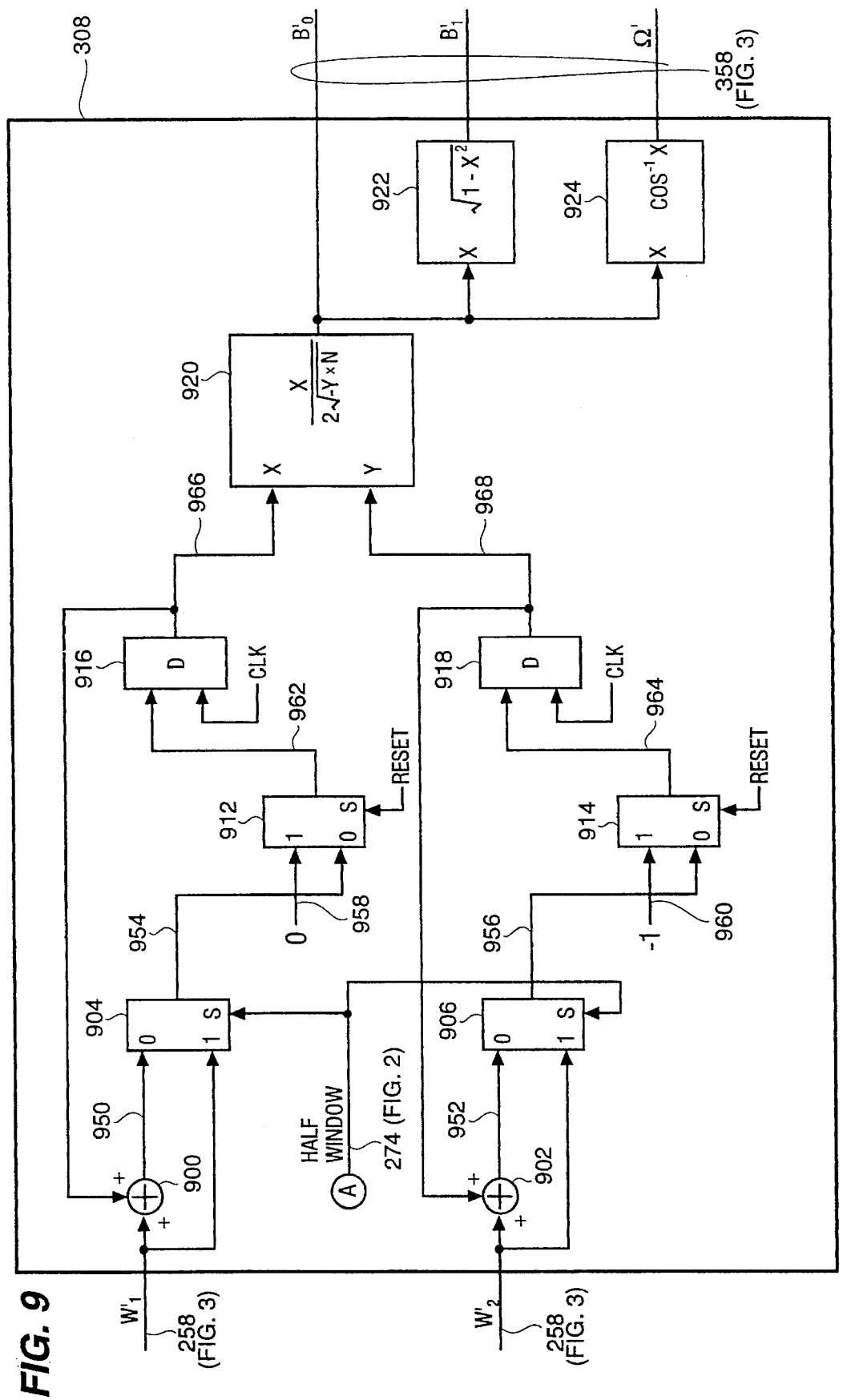

Goertzel filter weights computation element 308, shown in additional detail in FIG. 9, accepts the notch filter weights determined by operation of weight adaptation element 210 and applied to path 258. Goertzel filter weights computation element 308 then determines the Goertzel filter weights (B') as a complex number and also determines the frequency (Ω') of the sinusoidal flow tube sensor output signal represented by the discrete sampled signal values and as contained in the weights of the notch filter. Both values so determined are computed at the end of each half window period as indicated by the half window signal applied to path 274 by CLOCK 214 of FIG. 2. The Goertzel weights and frequency so determined are applied to path 358 for use by half window coefficient pipeline 310.

Summing junction 900 receives next notch filter weight $W_1'$ as one input over path 258 and receives its other input from path 966 as the output of register 916. The sum produced is applied to path 950 as one input to 2:1 mux 904. The other input of mux 904 on path is the next weight ($W_1'$) on bus 258. Mux 904 is normally selected to pass through the sum on path 950 from its input and apply the value to its output on path 954. 2:1 mux 912 is normally selected to pass through the value on it input path 954 to its output on path 962. The value on path 962 is applied to register 916 as an input value which is loaded on each pulse of the sample clock CLK. The current value stored in register 916 is the accumulating sum of weights ($W_1'$) as just described. At the start of a new haft window period, a signal is applied to half window on path 274 by CLOCK 214 of FIG. 2. At the start of a half window period, mux 904 is changed for one period to select its other input from path 258 to restart a new accumulation of the weights received. During power-on initialization, a system wide RESET signal is applied to mux 912 causing it to select its input from path 958 which receives the initial weight value of zero (0). This starts a new accumulation of the weights received on path 258.

Summing junction 902 receives notch filter weight $W_2'$ as one input over path 258 and receives its other input from path 968 as the output of register 918. The sum produced is applied to path 952 as one input to 2:1 mux 906. The other input of mux 906 is the next weight ($W_2'$) on bus 258. Mux 906 is normally selected to pass through the sum on path 952 from its input and apply the value to its output on path 956. 2:1 mux 914 is normally selected to pass through the value on it input path 956 to its output on path 964. The value on path 964 is applied to register 918 as an input value which is loaded on each pulse of the sample clock CLK. The current value stored in register 918 is the accumulating sum of weights ($W_2'$) as just described. At the start of a new half window period, a signal is applied to half window on path 274 by CLOCK 214 of FIG. 2. At the start of a half window period, mux 906 is changed for one period to select its other input from path 258 to restart a new accumulation of the weights received. During power-on initialization, a system wide RESET signal is applied to mux 914 causing it to select its input from path 960 which receives the initial weight value negative one (−1). This starts a new accumulation of the weights received on path 258.

The sum of the weights ($W_1'$) received on path 258 is applied to the X input of computation element 920 over path 966. The sum of the weights ($W_2'$) received on path 258 is applied to the Y input of computation element 920 over path 968. Computation element 920 computes the real part of the Goertzel filter weights ($B'_0$) as:

$$B'_0 = X/(2 \text{ sqrt}(-YN))$$

where X and Y are the inputs to element 920 as above and N is the number of samples in a half window period. More specifically, the real part of the filter weight is equal to:

$$B'_0 = \text{avg}(W_1')/(2 \text{ sqrt}(-\text{avg}(W_2')))$$

where avg(x) is the average value of x over the previous half window period of samples. The real part of the Goertzel filter weights ($B'_0$) computed by computational element 920 is applied to path 358 for use by half window coefficient pipeline 310 discussed below. The real part of the Goertzel filter weights is also applied to the X input of computational element 922 which computes the imaginary part of the Goertzel filter weights ($B'_1$) as:

$$B'_1 = \text{sqrt}(1-X^2)$$

where X is the real part of the filter weight as computed above. The imaginary part of the Goertzel filter weights ($B'_1$) computed by computational element 922 is applied to path 358 for use by half window coefficient pipeline 310 discussed below. In addition, the real part of the Goertzel filter weights is applied to the X input of computational element 924 which computes the fundamental frequency ($\Omega'$) of the vibrating flow tubes as:

$$\Omega' = \cos^{-1} X$$

where X is the real part of the filter weight as computed above. The fundamental frequency ($\Omega'$) computed by computational element 924 is applied to path 358 for use by half window coefficient pipeline 310 discussed below.

It may be noted that the computations performed by computational elements 920, 922, and 924 are undefined when their respective inputs are outside certain appropriate ranges. The output values of these computations are utilized only on the boundaries of Hanning windows at which time the inputs are assured to be appropriate to the respective computations. For this reason, the undefined computations suggested by the diagram of FIG. 9 are of little practical relevance. The computations may be invalid at half window boundaries under certain error conditions of the notch filters. However, such filter errors are detected and corrected within a few half window periods as discussed above. As a practical matter, the effect of these errors in the Goertzel filter weight computations may be ignored. In a production use of the present invention, such a condition may be detected and flagged to indicate that flow measurement values are temporarily unusable. As discussed above, the pseudo circuits of FIG. 9 are intended only as an aid in understanding the methods and related computations of the present invention.

Figure 10:
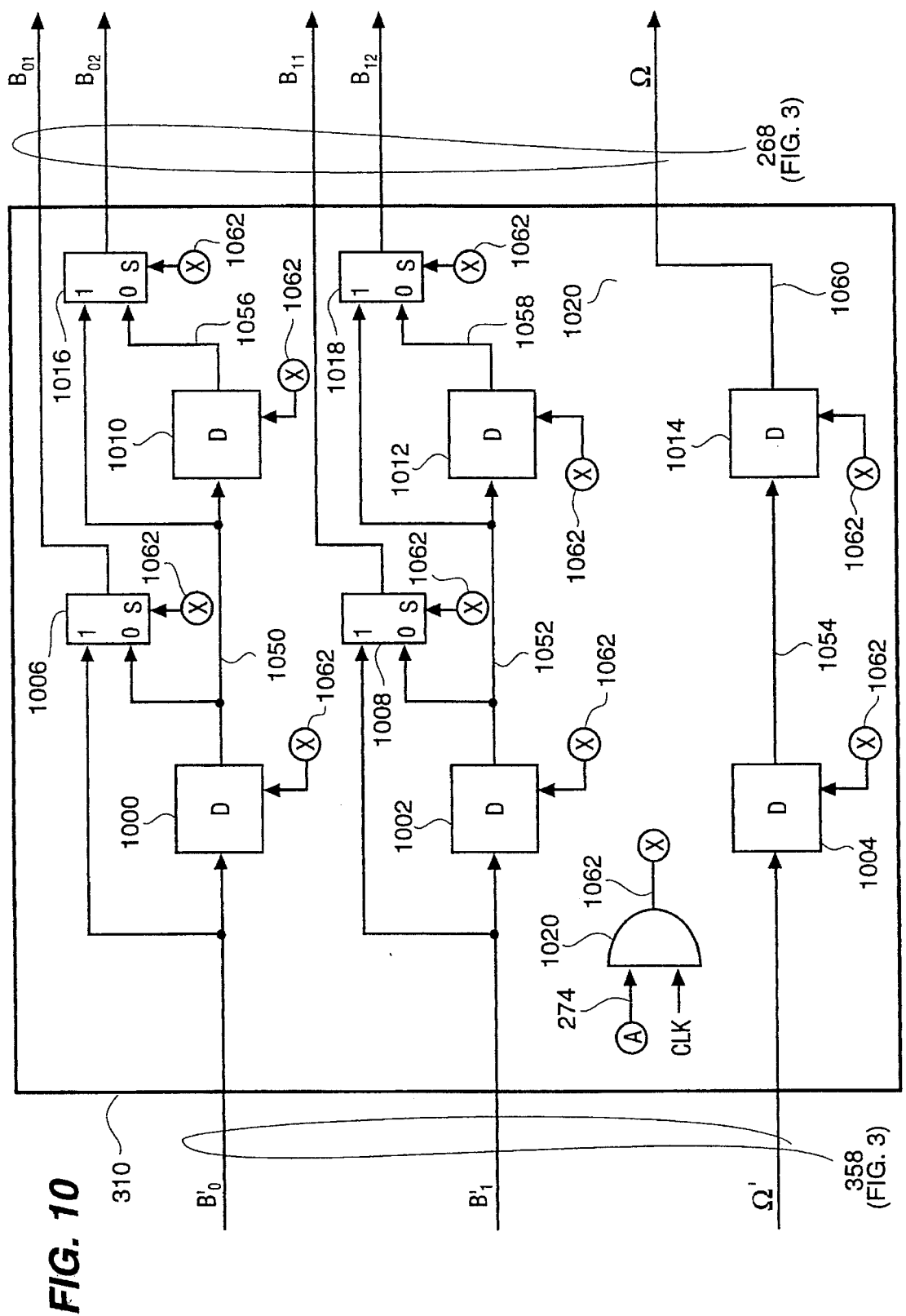

Half window coefficient pipeline 310, shown in additional detail in FIG. 10, receives the Goertzel filter weights (B'= $B'_0$, $B'_1$) and the frequency ($\Omega'$) both computed as above by Goertzel filter weights computation element 308. The values computed by operation of element 308 correspond to the half window period samples which were used to compute the weights and frequency. Half window coefficient pipeline 310 then adjusts timing of the computed values (B'and $\Omega'$) to associate them with one of the two parallel phase computations for the overlapping half windows. The Goertzel filters are used to compute a windowed DTFT every half window period of samples. However, computing a windowed DTFT requires that the summation of sampled valued be done for an entire window. As discussed elsewhere in this document, two Goertzel filters are therefore computed in parallel. The first filter performs the required calculations for the first half of a window. When the first half of a window is completed, and a new filter computation must start, the state of the first half is transferred to the second filter which is then responsible for completing the computation by filtering for the second half of a window. In this manner, a complete window computation may be completed at each half window boundary. The half window coefficient pipeline 310 aligns the computation of full window filter weights with the associated half window pipelined portion of the computation so that the first half window and the second half window are accumulated using the same full window filter weights.

Delay circuits 1000, 1002, 1004, 1010, 1012, and 1014 operate by applying the value on their respective inputs to their respective outputs delayed by one pulse of their respective clock input lines. Each of delay circuits 1000, 1002, 1004, 1010, 1012, and 1014 as well as muxes 1006, 1008,, 1016, and 1018, receive their respective input clock pulses or select signals from the output of AND gate 1020 on path 1062 (labelled "X"). AND gate 1020 receives the sample clock CLK as one input, and the half window signal on path 274 as its other input. At the start of each half window period, the values in the respective registers are loaded with the input values connected to their respective input buses. This loading is synchronous with the CLK pulse at the start of a half window. The Goertzel filter weight $B'_0$ is applied over path 358 to the input of delay circuit 1000 and to one input (normally not selected) of mux 1006. The once delayed Goertzel filter weight $B'_0$ is applied over path 1050 to the other input (normally selected) of mux 1006, to the input of delay circuit 1010 and to one input (normally not selected) of mux 1016. The once delayed Goertzel filter weight $B'_0$ is applied through mux 1006 onto path 268 as Goertzel filter weight $B_{01}$ for further processing by phase computation elements 206 corresponding to a first of two parallel half window phase computations discussed in further detail with respect to FIG. 11 below. The twice delayed Goertzel filter weight $B'_0$ is applied over path 1056 to the other input (normally selected) of mux 1016. The twice delayed Goertzel filter weight $B'_0$ is applied through mux 1016 onto path 268 as Goertzel filter weight $b_{02}$ for further processing by phase computation elements 206 corresponding to a second of two parallel half window phase computations discussed in further detail with respect to FIG. 11 below. When the half window signal is applied to path 274 (also labelled "A" in FIG. 10), mux 1006 is selected to apply the signal on its input path 358 onto path 268 for further processing as Goertzel filter weight $B_{01}$, an undelayed copy of the input value $B'_0$ from input path 358. Similarly, when the half window signal is applied to path 274 (also labelled "A" in FIG. 10), mux 1016 is selected to apply the signal on its input path 1050 onto path 268 for further processing as Goertzel filter weight $B_{02}$, a once delayed copy of the input value $B'_0$ from input path 358.

Goertzel filter weight $B'_1$ is applied over path 358 to the input of delay circuit 1002 and to one input (normally not selected) of mux 1008. The once delayed Goertzel filter weight $B'_1$ is applied over path 1052 to the other input (normally selected) of mux 1008, to the input of delay circuit 1012 and to one input (normally not selected) of mux 1018. The once delayed Goertzel filter weight $B'_1$ is applied through mux 1008 onto path 268 as Goertzel filter weight $B_{11}$ for further processing by phase computation elements 206 corresponding to a first of two parallel half window phase computations discussed in further detail with respect to FIG. 11 below. The twice delayed Goertzel filter weight $B'_1$ is applied over path 1058 to the other input (normally selected) of mux 1018. The twice delayed Goertzel filter weight $B'_1$ is applied through mux 1018 onto path 268 as Goertzel filter weight $B_{12}$ for further processing by phase computation elements 206 corresponding to a second of two parallel half window phase computations discussed in further detail with respect to FIG. 11 below. When the half window signal is applied to path 274 (also labelled "A" in FIG. 10), mux 1008 is selected to apply the signal on its input path 358 onto path 268 for further processing as Goertzel filter weight $B_{11}$, an undelayed copy of the input value $B'_1$ from input path 358. Similarly, when the half window signal is applied to path 274 (also labelled "A" in FIG. 10), mux 1018 is selected to apply the signal on its input path 1052 onto path 268 for further processing as Goertzel filter weight $B_{12}$, a once delayed copy of the input value $B'_1$ from input path 358.

Fundamental frequency $\Omega'$ is applied over path 358 to the input of delay circuit 1004. The once delayed frequency $\Omega'$ is applied over path 1054 to the input of delay circuit 1014. The twice delayed frequency $\Omega'$ is applied by delay circuit 1014 to path 268 as frequency $\Omega$ for further processing by $\Delta t$ computation element 208.

A FIRST EXEMPLARY EMBODIMENT- PHASE CALCULATIONS

Figure 11:
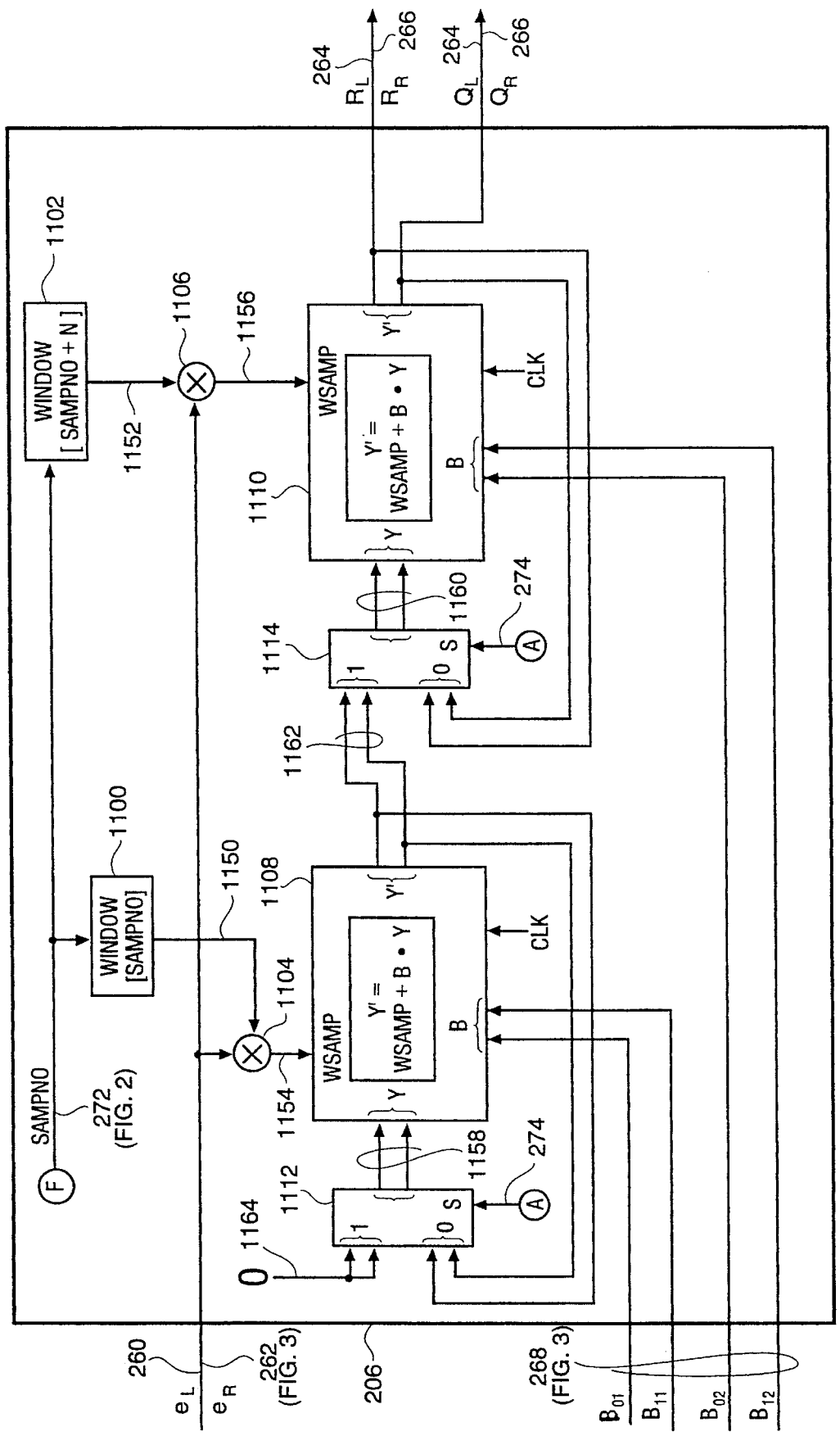

Phase calculation elements 206, shown in additional detail in FIG. 11, process the filtered discrete sample values to generate a complex number indicative of the phase of the sampled, filtered sensor output signal. The complex number is applied to path 266 (and to path 264 by phase computational element 206 for the left channel) to be used in subsequent $\Delta t$ computations. Specifically, a Goertzel filter Fourier transform is applied to the each Hanning window of filtered, discrete sampled sensor output signal values of both the right and left channels. The coefficients of the Goertzel filter are determined by the frequency computation element 212 and supplied to phase computation elements 206 over path 268. The complex number output of phase computation element 206 is applied to path 266 (and to path 264 by phase computational element 206 for the left channel) and is used by the $\Delta t$ computation.

To more effectively utilize the available sample data, two computations are performed in parallel, a first on each window of sample data, and a second on each window of sample data starting with a sample one half window length later than the first parallel computation. At each half window period boundary, the partial Fourier sum for the first half of a window is transferred from the first parallel computation element to initialize the second partial computation. Simultaneously, the completed computation from the second parallel computation element, representing the complex phase value for the preceding full window period of samples, is transferred to the subsequent $\Delta t$ computations.

Elements 1100 and 1102 receive the current sample number within the current half window (SAMPNO) on path 272 and apply on their output paths (1150 and 1152 respectively) the corresponding pre-computed weight value. The weight value is retrieved from a vector (WINDOW) indexed by the SAMPNO index value. Element 1102 adds the value N (half the length of the Hanning window) to the SAMPNO value received on path 272 in indexing in the WINDOW vector to offset the weight values by a number of samples corresponding to half the Hanning window size. The weight values on paths 1150 and 1152 are applied to an input of multiplication junctions 1104 and 1106, respectively. The other input of multiplication junctions 1104 and of 1106 is the next enhanced sample value (e) on path 260 (or path 262 for the right channel). Multiplication junctions 1104 and 1106 apply their products (Hanning window weighted enhanced sample values) to output paths 1154 and 1156, respectively, as inputs to computational element 1108 and 1110, respectively.

Computational elements 1108 and 1110 each apply a Goertzel filter to the weighted samples to form a complex number representing the phase of the sampled signal values. The weighted samples are processed on each pulsed sample clock signal applied to the CLK path for the duration of one half window length of samples. Computational element 1108 receives the weighted sample value (wsamp) on path 1154, receives the Goertzel filter coefficients for the first half window ($B_{01},B_{11}$) on path 268, receives the previous filter state on path 1158, and calculates the new filter state as the complex sum Y'=wsamp+BY. The new state is applied to output path 1162 on the next clock pulse applied to the CLK path. Computational element 1110 receives the weighted sample value (wsamp) on path 1156, receives the Goertzel filter coefficients for the second half window ($B_{02}$, $B_{12}$) on path 268, receives the previous filter state on path 1160, and calculates the new filter state as the complex sum Y'=wsamp+BY. The new filter state is applied to output path 264 as $R_L$, $Q_L$ (for the left channel, and on path 266 as $R_R$,$Q_R$ for the right channel). At each pulse of the CLK signal, indicating a new sample to be processed, computational elements 1108 and 1110 perform their respective computations. The newly computed output value (Y') of element 1108 and 1110 is applied to its output path, 1162 and 264, respectively (266 for the right channel) on the clock pulse (CLK) for the next sample period. The clocked output values are applied over path 1162 and 264 to the normally selected zero input of mux 1112 and 1114, respectively. Mux 1112 and 1114 apply their respective normally selected input value to their respective outputs 1158 and 1160 and thereby to the Y input of element 1108 and 1110 for use in the next Goertzel filter computation.

On receipt of a pulsed half window signal on path 274, both computational elements 1108 and 1110 are restarted for a Goertzel filtration over the period of the next half window period. Normally mux 1112 is selected to apply the complex value on it input path 1162 to its output path 1158 as the current state in computational element 1108 for the present half window period. At the start of the half window period (the end of the previous half window period), the half window signal applied to path 274 selects mux 1112 to apply a zero value on its input path 1164 to its output path 1158. This resets the filter in the first computational element 1108 to begin a new half window period. Normally mux 1114 is selected to apply the complex value on it input path 264 (266 for the right channel) to its output path 1160 as the state of computational element 1110 for the present half window period. At the start of the half window period, the half window signal applied to path 274 selects mux 1114 to apply filter state from the previous half window period, computed as the current output of element 1108, on its input path 1162 to its output path 1160. This causes computational element 1110 to begin a new half window period with a partial Goertzel result computed for the preceding half window by operation of element 1108. In other words, computational element 1108 processes the first half of each full window of samples while element 1110 processes the second half and combines it with the first half to produce a complex number indicative of phase at each half window period for the previous full window length of samples. At each half window boundary, a completed phase computation is generated as the output of element 1110 on bus 264 (266 for the right channel) which represents the phase of the previous full window period of samples. As discussed above, at each half window boundary, half window coefficient pipeline 310 shifts the Goertzel filter coefficients for the first half window parallel computation element 1108 ($B_{01}$, $B_{11}$) to the coefficients used in the second half window parallel computation element 1110 ($B_{02}$, $B_{12}$). This assures that the same Goertzel filter weights are applied to the first half window parallel partial computation as to the corresponding second half window parallel partial computation.

A FIRST EXEMPLARY EMBODIMENT- Δt CALCULATIONS

Figure 12:
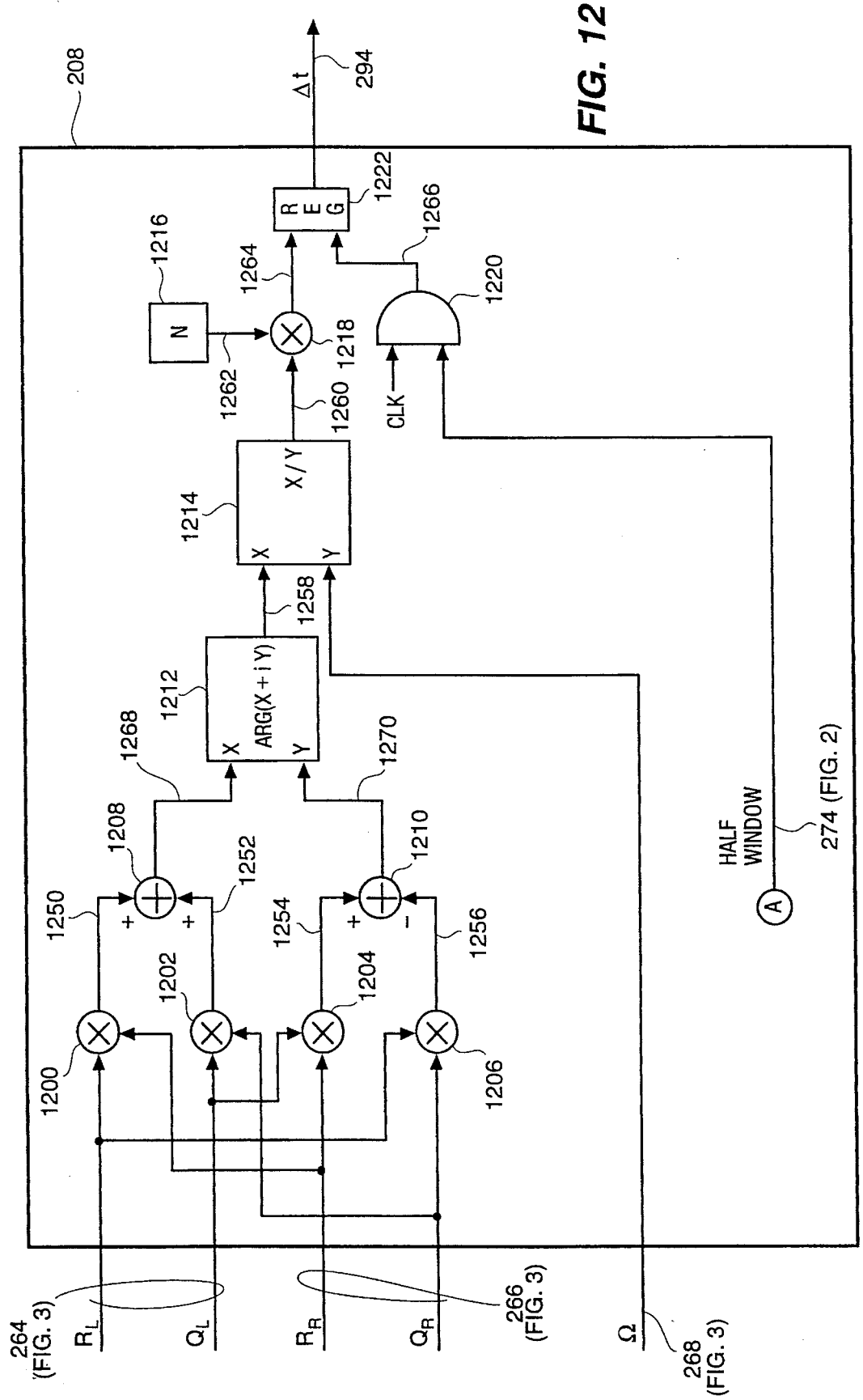

Δt calculation element 208, shown in additional detail in FIG. 12, receives phase information for both the left and right channels as determined by operation of phase calculation elements 206 and applied to path 264 for the left channel and path 266 for the right channel. Frequency information determined by operation of frequency calculation element 212 and is received by Δt calculation element 208 over path 268. Δt calculation element 208 determines the time difference between the two sampled sinusoidal signals resultant from the phase difference between the left and right flow tube sensor output signals. The Δt value is approximately proportional to the mass flow rate of the material flowing through the flow tubes of the Coriolis flowmeter. Other factors, well known in the art, are used to correct the calculated mass flow rate to adjust for temperature variations and other factors.

The Fourier transform of the left channel is multiplied by the conjugate of the Fourier transform of the right channel. The angle of the complex result is then computed. This phase difference is divided by the tube frequency of the vibrating flow tubes to give a Δt value.

The real and imaginary parts of the left channel phase value ($R_L$, $Q_L$ respectively) are received from left channel phase calculation element 206 over path 264. The real and imaginary parts of the right channel phase value ($R_R$, $Q_R$ respectively) are received from right channel phase calculation element 206 over path 266. Multiplier junction 1200 receives $R_L$ over path 264 and $R_R$ over path 266 as inputs to produce the product $R_L R_R$ and applies the product to path 1250. Multiplier junction 1202 receives $Q_L$ over path 264 and $Q_R$ over path 266 as inputs to produce the product $Q_L Q_R$ and applies the product to path 1252. Multiplier junction 1204 receives $Q_L$ over path 264 and $R_R$ over path 266 as inputs to produce the product $Q_L R_R$ and applies the product to path 1254. Multiplier junction 1206 receives $R_L$ over path 264 and $Q_R$ over path 266 as inputs to produce the product $R_L Q_R$ and applies the product to path 1256.

Summing junction 1208 receives the product $R_L R_R$ over path 1250 and the product $Q_L Q_R$ over path 1252 to generate the sum $R_L R_R + Q_L Q_R$ and applies the sum over path 1268 to the X input of computational element 1212. Summing junction 1210 receives the product $Q_L R_R$ over path 1254 and the product $R_L Q_R$ over path 1256 to generate the sum $Q_L R_R - R_L Q_R$ and applies the sum over path 1270 to the Y input of computational element 1212.

Computational element 1212 accepts its X input from path 1268 and its Y input from path 1270 and determines the phase difference angle between the sinusoid signal on the left channel flow tube sensor and the sinusoidal signal on the right channel flow tube sensor from the argument (phase) of the complex number represented by its X and Y inputs as (X+iY) (i.e. ARG(X+iY)). The phase angle difference so computed by operation of computational element 1212 is applied over path 1258 to the X input to computational element 1214. The frequency ($\Omega$) computed by operation of frequency calculation element 212 of FIG. 3 is applied over path 268 to the Y input of computational element 1214. Computational element 1214 then computes the ratio X/Y (phase difference/frequency) and applies the computed ratio value to its output on path 1260. Multiplication junction 1218 receives the computed ratio value on one input over path 1260 and receives the value N stored in register 1216 over path 1262 representing the fixed sampling period (inverse of the sampling frequency). The product of the two inputs to multiplication junction 1218 is Δt and is applied over path 1264 to the input of register 1222. Register 1222 loads the current value on its input when clocked by a pulse on path 1266. And gate 1220 receives the sample frequency clock CLK on one input and the half window signal indicating the start of a new haft window sampling period on its other input. The output of AND gate 1220 is the haft window signal pulse synchronized with the sample frequency clock pulses CLK generated by CLOCK 214 of FIG. 2. The Δt value stored in register 1222 is indicative of the mass flow rate of material through the flowmeter and is applied to path 294 for use by mass flow computation element 290. As is well known in the art, the Δt value is only approximately proportional to the mass flow rate in the flow tubes. Mass flow computation element 290 corrects the Δt value to generate the mass flow rate and apply it to utilization 292 of FIG. 2 over path 155. Element 290 performs appropriate corrections and scaling to compensate for the effects of temperature and other environmental factors.

The embodiment described above utilizes a number of constant values to reset the computations associated with the notch filter. The debiasing parameter ($\alpha$), the forgetting factor ($\pi$), and the covariance matrix (P) are all reset under error conditions to restart the computational processing for adapting the notch filter parameters to changes in the fundamental frequency. The debiasing parameter ($\alpha$) and the forgetting factor ($\pi$) are adjusted and initialized as described above. One of ordinary skill in the art will recognize that these values may be adapted to any particular flow tube application and environmental parameters. Useful values for these constants may be computed as a function of the expected nominal fundamental frequency (freq) of the vibrating flow tubes as follows:

$$\alpha_{INIT}=0.90^{freq/100}$$

$$\alpha_{SNR}0.95^{freq/100} \; \alpha_{LIMIT}=0.98^{freq/100}, \alpha_{DECAY}=0.999^{freq/100},$$

$$\pi_{INIT}=0.95^{freq/100}$$

$$\pi_{SNR}=0.97^{freq/100} \; \pi_{LIMIT}=0.995^{freq/100}, \pi_{DECAY}=0.99^{freq/100},$$

$$\alpha_{ADDER}=\alpha_{LIMIT}(1-\alpha_{DECAY})$$

$$\pi_{ADDER}=\pi_{LIMIT}(1-\alpha_{DECAY})$$

The covariance matrix (P) is initialized under various conditions discussed above as follows:

$$P_{INIT}=10^{-2}I$$

$$P_{SNR}=10-4I$$

where "I" is the identity matrix.

A SECOND EXEMPLARY EMBODIMENT (BEST KNOWN MODE)

The best presently known mode for implementing the present invention is depicted in FIGS. 13–16 as a second embodiment of the methods of the present invention. As above in the first embodiment, adaptive notch filters are used to enhance the signal represented by the decimated sampled values of the left and right channels and applied to paths 254 and 256, respectively. In this second embodiment four adaptive notch filters are utilized, two in series on each of the left and right channel signals. The two filters on each of the left and right channels are "cascaded" in that the first filter utilizes a low-Q (wide notch) filter to supply limited signal enhancement but the ability to rapidly converge on changes in the fundamental frequency of the vibrating flow tubes. The signal output from the first cascaded notch filter is then applied to a second cascaded notch filter. The second notch filter utilizes a high-Q (narrow notch) filter to provide superior noise and harmonic rejection over that of previous solutions or over that of the first embodiment described above. Despite the narrow notch (high-Q) of the second notch filter, it can still rapidly adapt to changes in the fundamental frequency of the vibrating flow tubes due to the limited enhancement (filtration) performed by the first notch filter. The reduced noise and harmonic levels in the signal applied to the second notch filter allow it to also rapidly converge on changes in the fundamental frequency of the vibrating flow tubes.

An additional notch filter having a notch shape even wider than that of the first cascaded notch filter is used to provide an estimate of the fundamental frequency of the vibrating flow tubes. This estimate is used by weight adaptation computations to set the frequency parameter of the first cascaded notch filters for both the left and right channels. The output from the second cascaded notch filters is used by weight adaptation computations to adjust the frequency parameter of the second cascaded notch filters.

The first embodiment discussed above attempts to balance the width of the notch to provide a narrow notch (high-Q) for better signal enhancement while allowing for rapid convergence on changes in the fundamental frequency of the vibrating flow tubes through use of a wide notch (low-Q). In attempting to balance this aspect of the notch filters, the debiasing parameter ($\alpha$) is modified at each sample period to adjust the notch width for the next sampled signal value. This second embodiment uses a plurality of notch filters within fixed notch shapes (fixed Q values) to provide an optimal solution to both requirements for rapid tracking of frequency changes and for superior noise rejection. This second embodiment provides better accuracy and repeatability than the first embodiment for three reasons. First, the second cascaded notch filter remains steady with a fixed narrow notch shape (high-Q) for superior noise and harmonic rejection. This improved noise rejection alone provides improved accuracy as compared to other solutions. Second, the improved tracking of the cascaded filters to changes in the fundamental frequency of the vibrating flow tubes improves the repeatability of the enhancements of the sampled signal values. And third, the cascaded notch filters provide a more accurate estimate of the flow tube frequency for subsequent $\Delta t$ computations in element 208.

These improvements are derived at the cost of computational complexity. The individual computational elements of this second embodiment are somewhat simpler than for the first embodiment (scalar arithmetic versus matrix). However, this second embodiment increases the total computational complexity by applying five notch filters and two weight adaptation computations at each sample. Although somewhat more complex computationally, this second embodiment is well within the computational power of commercially available digital signal processors.

A SECOND EXEMPLARY EMBODIMENT-OVERVIEW

Figure 13:
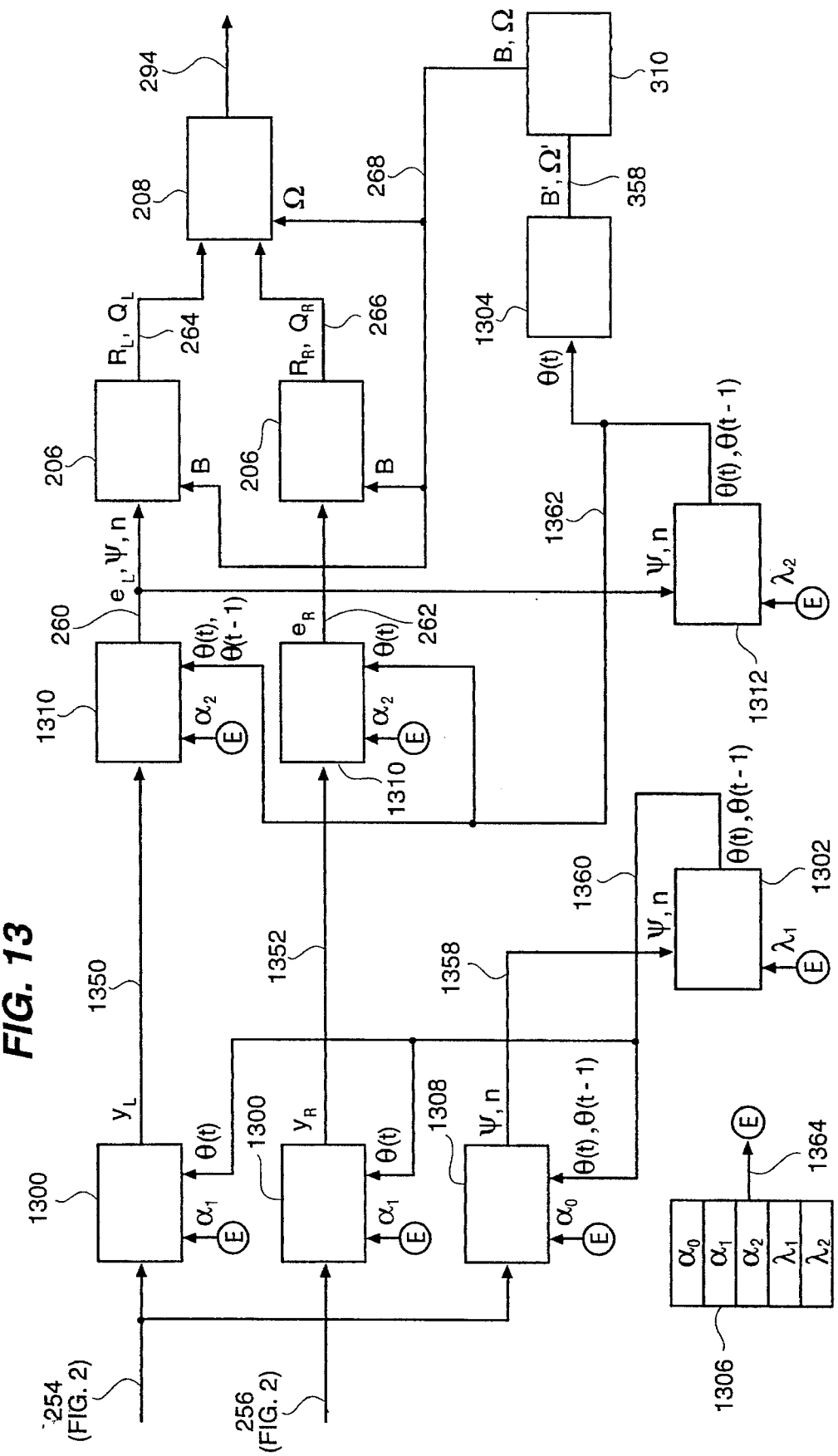
FIG. 13 shows additional detail of a second embodiment of the present invention shown in FIG. 2 wherein two cascaded adaptive notch filters are used in conjunction with each sensor signal.

FIG. 13 decomposes elements of FIG. 2 to show additional detail regarding the flow of information between computational elements of FIG. 2. Computational elements 1300 are the first cascaded adaptive notch filters. Left channel first cascaded adaptive notch filter 1300 receives decimated input sensor output signal samples from path 254 (of FIG. 2). Weight coefficient ($\theta(t)$) of the notch filter transfer function is received from weight adaptation element 1302 over path 1360. Debiasing parameter ($\alpha_1$), which determines the shape of the notch, is received from register file 1306 over path 1364 (also labelled "E"). Right channel first cascaded adaptive notch filter 1300 receives decimated input sensor output signal samples from path 256 (of FIG. 2) but otherwise operates identically to left channel first cascaded adaptive notch filter 1300. Both the left and right channel first cascaded adaptive notch filters receive the same adaptation parameter $\theta(t)$) from weight adaptation element 1302 over path 1360 and receive the same debiasing parameter ($\alpha_1$) over path 1364 from register file 1306.

An additional adaptive notch filter 1308 receives the decimated signal sample values from the left channel over path 254. This notch filter receives a debiasing parameter ($\alpha_0$) from register file 1306 over path 1364. This debiasing parameter ($\alpha_0$) defines a broad notch (low-Q) to permit this notch filter to rapidly track changes in the fundamental frequency of the vibrating flow tubes. The enhanced output signal of this notch filter is not utilized (the filter provide very little effective enhancement due to its broad notch shape). Instead, the error factor (n) and gradient ($\Psi$) are generated as output and applied to weight adaptation element 1302 over path 1358 for computation of the weight parameters $\theta(t-1)$ and $\theta(t)$). The newly computed weight parameters ($\theta(t-1)$ and $\theta(t)$) are applied by weight adaptation element 1302 to notch filters 1300 and 1308 over path 1360 in preparation for receipt of the next decimated sampled signal.

The enhanced signal value of each decimated sample input processed by notch filters 1300 for the left and right channels are applied to a corresponding second cascaded notch filters 1310 over paths 1350 and 1352 as $y_L$ and $y_R$ for the left and right channels, respectively. Second cascaded notch filters 1310 receive identical weight parameters $\theta(t-1)$ and $\theta(t)$) from weight adaptation element 1312 over path 1362. Debiasing parameter ($\alpha_2$), which determines the shape of the notch, is received from register file 1306 over path 1364 (also labelled "E"). The error factor (n) and gradient ($\Psi$) are generated as an output of left channel second cascaded notch filter 1310 is applied to weight adaptation element 1312 over path 260 for computation of the weight parameters $\theta(t-1)$ and $\theta(t)$). The newly computed weight parameters ($\theta$) $(t-1)$ and $\theta(t)$) are applied by weight adaptation element 1312 to notch filters 1310 over path 1362 in preparation for receipt of the next decimated sampled signal value as enhanced by the first cascaded notch filters 1300.

Both the left and right channel second cascaded adaptive notch filters 1310 generate an enhanced signal represented by discrete sample values applied to their respective output paths 260 and 262 respectively. The enhanced signal, denoted $e_L$ and $e_R$ for the left and right channels respectively, represents the associated input signal samples filtered of all noise signals but for a narrow notch of frequencies near the fundamental frequency of the vibrating flow tubes.

All notch filters discussed above with respect to FIG. 13 (1300, 1308, and 1310) compute the same functions to generate the same output values, namely: an enhanced signal value (y or e), an error factor (n), and a gradient ($\Psi$). However, the noise (error factor) and gradient values from the right channel second cascaded adaptive notch filter 1310 and from both of the first cascaded adaptive notch filters are not used in the methods and apparatus of the present invention. Similarly, the enhanced signal value output of the frequency tracking adaptable notch filter 1308 is not used in the methods of the present invention. The functions computed by all adaptive notch filters 1300, 1308, and 1310 are discussed in detail below. The error factor is essentially the noise component of the sampled values. It is known to those of ordinary skill in the art that when applying a recursive least-squares algorithm, as here, that an a posterlofi prediction error improves the convergence rate of the filter (see Arye Nehoral "A minimal Parameter Adaptive Notch Filter With Constrained Poles and Zero", IEEE Transactions on Acoustics, Speech, and Signal Processing, Vol. ASSP-33, No. 4, August 1985 at page 987).

The enhanced signal values from the left and right channel second cascaded adaptive notch filters 1310 ($e_L$ and $e_R$) are received over paths 260 and 262, respectively, by phase computation elements 206. Phase computation elements 206 and $\Delta t$ computation element 208 are identical to the elements discussed above with respect to the first embodiment and FIGS. 3–12.

Frequency calculation element 1304 receives the filter weight $\theta(t)$) from weight adaptation element 1312 over path 1362 and computes the weights (B') for the Goertzel filter computations of phase computation elements 206 and computes the frequency ($\Omega$') of the vibrating flow tubes. These output values are applied to half window multiplexor half window coefficient pipeline 310 over path 358. Half window coefficient pipeline 310 is discussed above with respect to the first embodiment and FIGS. 3–12.

A SECOND EXEMPLARY EMBODIMENT-NOTCH FILTERS

Figure 14:
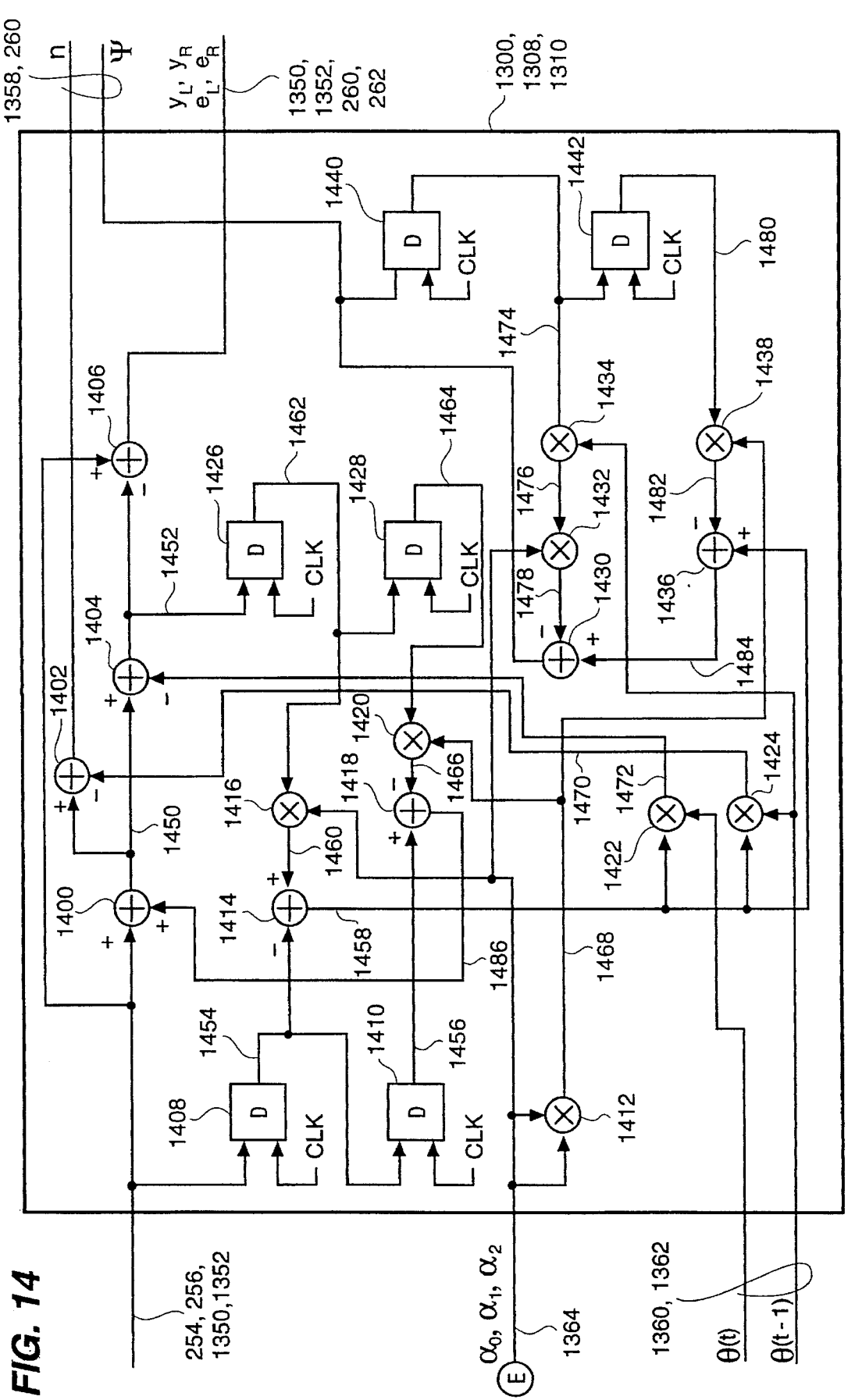
FIGS. 14–16 show additional detail of the computational elements of the second embodiment of the present invention shown in FIG. 13.

FIG. 14 depicts additional detail of the adaptive notch filters 1300, 1308, and 1310 of this second embodiment. As discussed above, certain output values and associated input values are not used for certain of the otherwise identical adaptable notch filters of this second embodiment of the present invention. The description of FIG. 14 discusses operation of the depicted notch filter as though all inputs and outputs are utilized (as in the left channel second cascaded adaptable notch filter 1310). For simplicity, the notch filter discussed in detail below will be referred to by reference number 1310 (left channel) to represent all five adaptable notch filters of this second embodiment (1300, 1308, and 1310). Left channel filter 1310 receives its input on path 1350 and applies its outputs to path 260. Other notch filters receive their respective inputs from paths 254 (1300 left channel and 1308), 256 ( 1300 right channel), and 1352 ( 1310 right channel). Other notch filters apply their respective output signals to paths 1350 (1300 left channel), 1352 (1300 right channel), 1358 (1308), and 262 (1310 right channel). One of ordinary skill will recognize the similarity between the operation of all five notch filter computational elements.

The adaptive notch filter 1310 (left channel) of FIG. 14 determines the noise present in the discrete sample input values u(t) received on its input path 1350 (where (t) as used in the equations below indicates the value corresponding to sample period "t"). Debiasing parameter (denoted as $\alpha$ in the equations below) is received on path 1364 (as $\alpha_2$). The coefficient of the notch filter for the current sample period $\theta(t)$) and for the previous sample period $\theta(t-1)$) are received over path 1362. Subtracting the noise signal values $\bar{e}$ from the input sample values u yields the enhanced filtered value e for output on path 260. The adaptive notch filter 1310 determines the enhanced signal value e(t) by a second order filter polynomial as follows:

| | |
|---|---|
| u(t) | sample values |
| e(t) = u(t) − $\bar{e}$(t) | enhanced sample values |
| $\bar{e}$(t) = u(t) + u(t−2) − $\alpha^2\bar{e}$(t−2) − $\phi$(t)$\theta$(t) | noise component of sample values |
| $\phi$(t) = −u(t−1) + $\alpha\bar{e}$(t−1) | |

In addition, adaptive notch filter 1310 determines the gradient ($\Psi$)(t)) as follows:

$$\Psi(t)=\phi(t)-\alpha^2\Psi(t-2)-\alpha\Psi(t-1)\theta(t-1)$$

Finally, adaptive notch filter 1310 also determine the error estimation (n(t)) as follows:

$$n(t)=u(t)+u(t-2)-\alpha^2\bar{e}(t-2)-\phi(t)\theta(t-1)$$

Adaptive notch filter 1310 applies the input value (u(t) or y(t)—the sample value to be applied to the notch filter) received over path 1350 to delay circuit 1408. The once delayed input sample value u(t−1) generated as the output of delay circuit 1408 is applied over path 1454 to delay circuit 1410 and its twice delayed input sample value u(t−2) is applied to path 1456. Delay circuits 1408 and 1410 delay the value applied to their respective inputs by one pulse of the sample clock signal applied to the CLK path as discussed above. Delay circuits 1426, 1428 1440, and 1442 operate in like manner to delay their respective input values by one sample clock period as indicated by the CLK signal path. Debiasing parameter $\alpha$ received on path 1364 is applied to both inputs of multiplication junction 1412 and its output product $\alpha^2$ is applied to path 1468.

The debiasing parameter a on path 1364 and the once delayed intermediate value $\bar{e}$(t−1) on path 1462 (discussed below) are applied as inputs to multiplication junction 1416 and its output product $\alpha\bar{e}$(t−1) is applied to path 1460. The debiasing parameter squared $\alpha^2$ on path 1468 and the twice delayed intermediate value $\bar{e}$(t−2) on path 1464 (discussed below) are applied as inputs to multiplication junction 1420 and its output product $\alpha^2\bar{e}$(t−2) is applied to path 1466.

The once delayed input sample value u(t−1) is subtracted from the intermediate value $\alpha\bar{e}$(t−1) on path 1460 by summing junction 1414 to produce intermediate value $\phi$(t)=−u(t−1)+$\alpha\bar{e}$(t−1) and apply that intermediate value to path 1458. The intermediate value $\alpha^2\bar{e}$(t−2) on path 1466 is subtracted from twice delayed input sample value u(t−2) on path 1456 by summing junction 1418 and the resultant intermediate value u(t−2)−$\alpha^2\bar{e}$(t−2) is applied to path 1486. Intermediate value $\phi$(t) on path 1458 and the filter coefficient $\theta$(t) on path 1362 are applied to multiplication junction 1422 to produce the intermediate value φ(t) θ(t) and apply that product to path 1472. Intermediate value φ(t) on path 1458 and the filter coefficient θ(t–1) on path 1362 are applied to multiplication junction 1424 to produce the intermediate value φ(t) θ(t–1) and apply that product to path 1470.

The notch filter 1310 determines the noise estimate ē(t) of the input sample value u(t) by first applying the input sample value u(t) on path 1350 and the intermediate value u(t–2)–α²ē(t–2) on path 1486 to the inputs of summing junction 1400 to produce the sum u(t)+u(t–2)–α²ē(t–2) and apply that sum to path 1450. The intermediate value φ(t)θ(t) on path 1472 is subtracted from the intermediate value u(t)+u(t–2)–α²ē(t–2) on path 1450 by summing junction 1404 to determine the noise estimate ē(t) of the input sample value u(t) and apply the noise estimate ē(t) to path 1452. The noise estimate ē(t) on path 1452 is subtracted from input sample value u(t) on path 1350 by summing junction 1406 and the resultant enhanced signal value e(t) is applied to the notch filter's output path 260. The noise estimate ē(t) on path 1452 is applied to delay circuit 1426 to produce a once delayed noise estimate ē(t–1) on path 1462. The once delayed noise estimate ē(t–1) on path 1462 is applied to delay circuit 1428 to produce twice delayed noise estimate ē(t–2) on path 1464. These delayed noise estimate values on paths 1462 and 1464 are utilized in intermediate computations as discussed above.

In addition to the enhanced signal e(t) generated by the notch filter 1310, an a priori noise estimation n(t) is determined for use in the weight adaptation computations discussed below. The intermediate value φ(t)θ(t–1) on path 1470 is subtracted from the intermediate value u(t)+u(t–2)–α²ē(t–2) on path 1450 by summing junction 1402 to determine the estimation error n(t) of the input sample value u(t) and apply the estimation error to path 260 for use by weight adaptation computational element 1312 as discussed below.

Lastly, the notch filter 1310 recursively computes a gradient Ψ(t) for use in the weight adaptation computations discussed below. The current gradient value Ψ(t) on path 260 is applied to delay circuit 1440 to produce a once delayed gradient value Ψ(t–1) on path 1474. The once delayed gradient value Ψ(t–1) on path 1474 is applied to delay circuit 1442 to produce twice delayed gradient value Ψ(t–2) on path 1480. The once delayed gradient value Ψ(t–1) on path 1474 and the weight coefficient θ(t–1) on path 1362 are multiplied by multiplication junction 1434 which applies the intermediate product to path 1476. This intermediate product on path 1476 and the debiasing parameter α on path 1364 are applied to multiplication junction 1432 to produce the intermediate product αθ(t–1)Ψ(t–1) on path 1478. The twice delayed gradient Ψ(t–2) on path 1480 and the square of the debiasing parameter α² on path 1468 are applied to multiplication junction 1438. The product of multiplication junction 1438 is applied to path 1482 and is subtracted from the intermediate value φ(t) on path 1458 by summing junction 1436 to produce the intermediate value φ(t)–α²Ψ(t–2) on path 1484. The intermediate value on path 1478 is subtracted from the intermediate value on path 1484 by summing junction 1430 to produce the new gradient:

$$\Psi(t) = \phi(t) - \alpha^2 \Psi(t-2) - \alpha\theta(t-1)\Psi(t-1)$$

and apply it to path 260.

A SECOND EXEMPLARY EMBODIMENT— WEIGHT ADAPTATION

Figure 15:
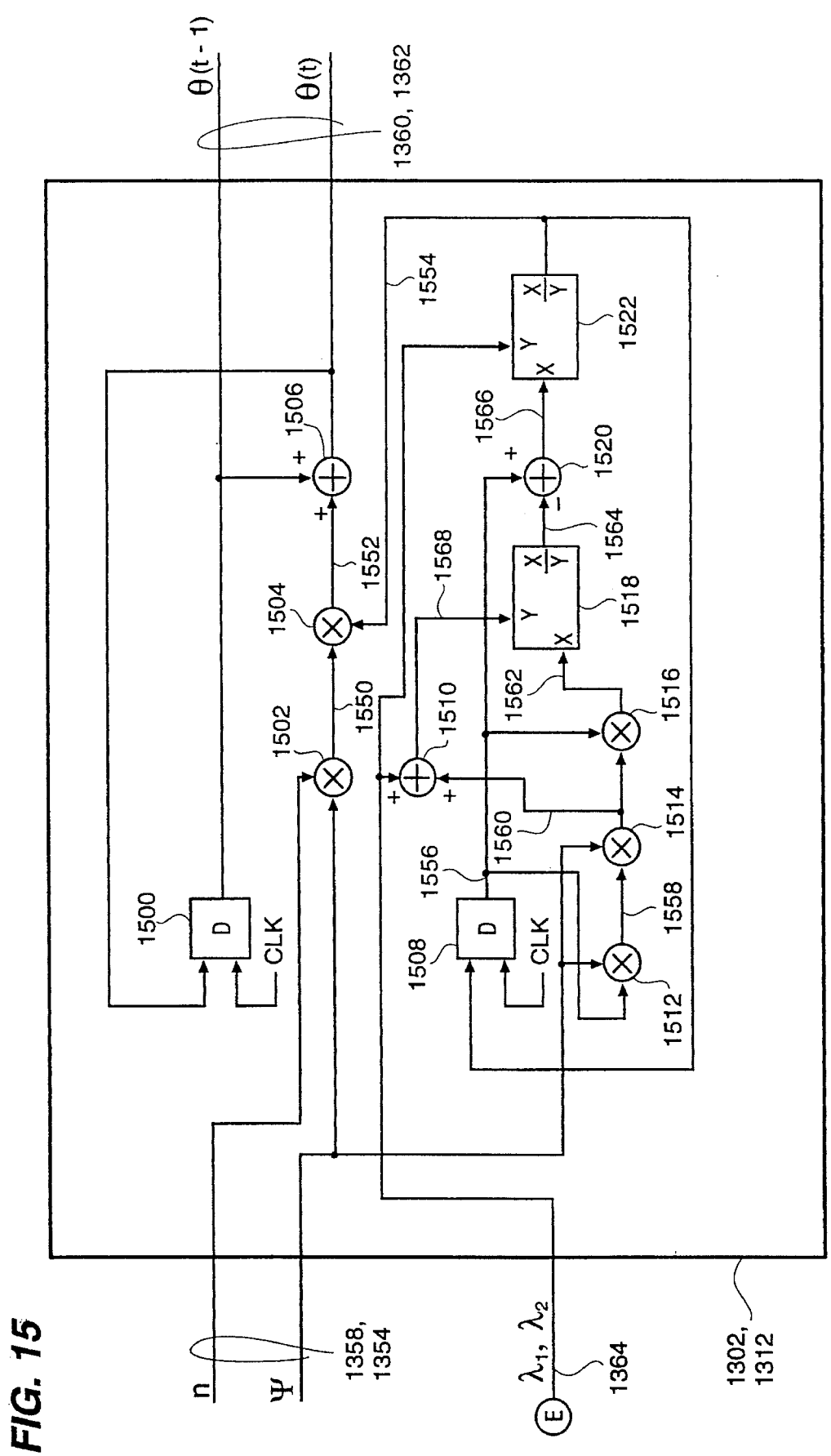

FIG. 15 provides additional detail regarding the structure and operation of weight adaptation computational elements 1302 and 1312 of FIG. 13. Weight adaptation computational elements 1302 and 1312 perform identical computations but receive unique input values from register file 1306 of FIG. 13 and from their associated adaptive notch filters 1308 and 1310, respectively. Weight adaptation computational element 1302 receives the error factor n and the gradient Ψ from notch filter 1308 over path 1358 and receives forgetting factor $\lambda_1$ from register file 1306 over path 1364. Weight adaptation computational element 1302 applies the current weight θ(t) to notch filters 1300 and 1308 over path 1360. The once delayed weight θ(t–1) is applied to notch filter 1308 over path 1360. Weight adaptation computational element 1312 receives the noise estimate n and the gradient Ψ from left channel notch filter 1310 over path 260 and receives forgetting factor $\lambda_2$ from register file 1306 over path 1364. Weight adaptation computational element 1312 applies the current weight θ(t) and the once delayed weight θ(t–1) to notch filters 1310 and applies the current weight θ(t) to frequency calculation element 1304 over path 1362. Since both weight adaptation computational element 1302 and 1312 operate identically, the description below refers only the operation of element 1302.

Weight adaptation computational element 1302 determines the next weight coefficient for its associated notch filters using scalar arithmetic as follows (where (t) as used in the equations below indicates the value corresponding to sample period "t"):

$$\theta(t) = \theta(t-1) + P(t)\psi(t)n(t) \quad \text{the updated weight coefficient}$$
$$P(t) = (P(t-1) - ((P(t-1)\psi(t)^2 P(t-1))/(\lambda + \psi(t)^2 P(t-1))))/\lambda$$
$$\text{the covariance variable}$$

Weight adaptation computational element 1302 determines an updated weight coefficient θ(t) on path 1360 (as discussed below) and applies it to the input of delay circuit 1500 to produce a once delayed weight coefficient θ(t–1) on path 1360.

Weight adaptation computational element 1302 determines the updated covariance variable P(t) with each new sampled value as a function of the previously computed covariance variable on path 1556, the supplied gradient Ψ on path 1358 and the forgetting factor $\lambda_1$ from register file 1306 over path 1364. The current covariance variable P(t) on path 1554 is applied to delay circuit 1508 to produce a once delayed covariance variable P(t–1) applied to path 1556. Multiplication junction 1512 receives the once delayed covariance variable P(t–1) on path 1556 and the gradient Ψ on path 1358 and applies to path 1558 the product P(t–1)Ψ(t). Multiplication junction 1514 receives this product on path 1558 and receives the gradient Ψ on path 1358 and applies to path 1560 the product P(t–1)Ψ(t)². Multiplication junction 1516 receives this product on path 1560 and receives the once delayed covariance variable P(t–1) and applies to path 1562 the product P(t–1)Ψ(t)²P(t–1) (the numerator in the covariance variable computation given above). Summing junction 1510 receives the product P(t–1)Ψ(t)² on path 1560 and the forgetting factor $\lambda_1$ on path 1364 and applies to path 1568 its sum: $\lambda_1$+P(t–1)Ψ(t)² (the denominator in the covariance computation given above). Computational element 1518 divides the numerator applied to its input path 1562 by the denominator applied to its input path 1568 to produce an output quotient on path 1564. Summing junction 1520 then subtracts this quotient on path 1564 from the once delayed covariance variable on path 1556 and applies the result to path 1566. Computational element 1522 divide the numerator on its input path 1566 by the denominator forgetting factor $\lambda_1$ on its input path 1364 to produce the updated covariance variable P(t) and apply it to output path 1554.

Multiplication junction 1502 receives the error factor n on path 1358 and the gradient Ψ on path 1358 and applies to path 1550 the product Ψn. Multiplication junction 1504 receives the product Ψ(t)n(t) on path 1550 and the update covariance variable P(t) on path 1554 and applies to path 1552 the product P(t)Ψ(t)n(t). Summing junction 1506 then receives this product on path 1552 and the once delayed weight coefficient θ(t−1) on path 1360 and applies to path 1360 the updated weight coefficient θ(t).

A SECOND EXEMPLARY EMBODIMENT- FREQUENCY CALCULATION

In addition to adaptive notch filters 1310, frequency calculation element 1304 receives the updated weight coefficient θ(t) from weight adaptation computational element 1312 over path 1362. Frequency calculation element 1304, shown in additional detail in FIG. 16, accumulates the weight coefficients θ(t) values received over path 1362 to compute the Goertzel filter weights B' (B'$_0$ and B'$_1$) and the frequency Ω' and apply them to path 358. Frequency calculation element 1304 of FIG. 16 operates in a manner similar to element 308 of FIG. 9 in the first embodiment discussed in detail above. Summing junction 1600 receives the previous accumulated sum on path 1652 and the updated weight θ(t) on path 1362 and applies the sum to an input of mux 1602 over path 1654. Mux 1602 is normally selected to apply the accumulated sum on its input path 1654 onto its output path 1650. The accumulated sum on path 1650 is applied to the input of register 1604 to store the accumulated sum when the sample clock signal CLK is pulsed for each new weight value applied to path 1362. When the half window signal (discussed above with respect to the first embodiment and FIGS. 3–12) is applied to mux 1602 over path 274, the accumulation is reset by applying the newly received weight value on input path 1362 to output path 1650 through mux 1602. This resets the accumulated sum in register 1604 and begins the new accumulation for another half window period of sampled values.

The sum of the weights received on path 1362 is applied to the X input of computation element 1606 over path 1652. Computation element 1606 computes the real part of the Goertzel filter weights (B'$_0$) as:

$$B'_0 = -X/2N$$

where X is the input to element 1606 as above and N is the number of samples in a half window period. The real part of the Goertzel filter weights (B'$_0$) computed by computational element 1606 is applied to path 358 for use by haft window coefficient pipeline 310 discussed above. The real part of the Goertzel filter weights is also applied to the X input of computational element 1608 which computes the imaginary part of the Goertzel filter weights (B'$_1$) as:

$$B'_1 = sqrt(1-X^2)$$

where X is the input to element 1608 as above. The imaginary part of the Goertzel filter weights (B'$_1$) computed by computational element 1608 is applied to path 358 for use by haft window coefficient pipeline 310 discussed above. In addition, the real part of the Goertzel filter weights is applied to the X input of computational element 1610 which computes the fundamental frequency (Ω') of the vibrating flow tubes as:

$$\Omega' = \cos^{-1} X$$

where X is the input to element 1610 as above. The fundamental frequency (Ω') computed by computational element 1610 is applied to path 358 for use by half window coefficient pipeline 310 discussed above.

Figure 16:
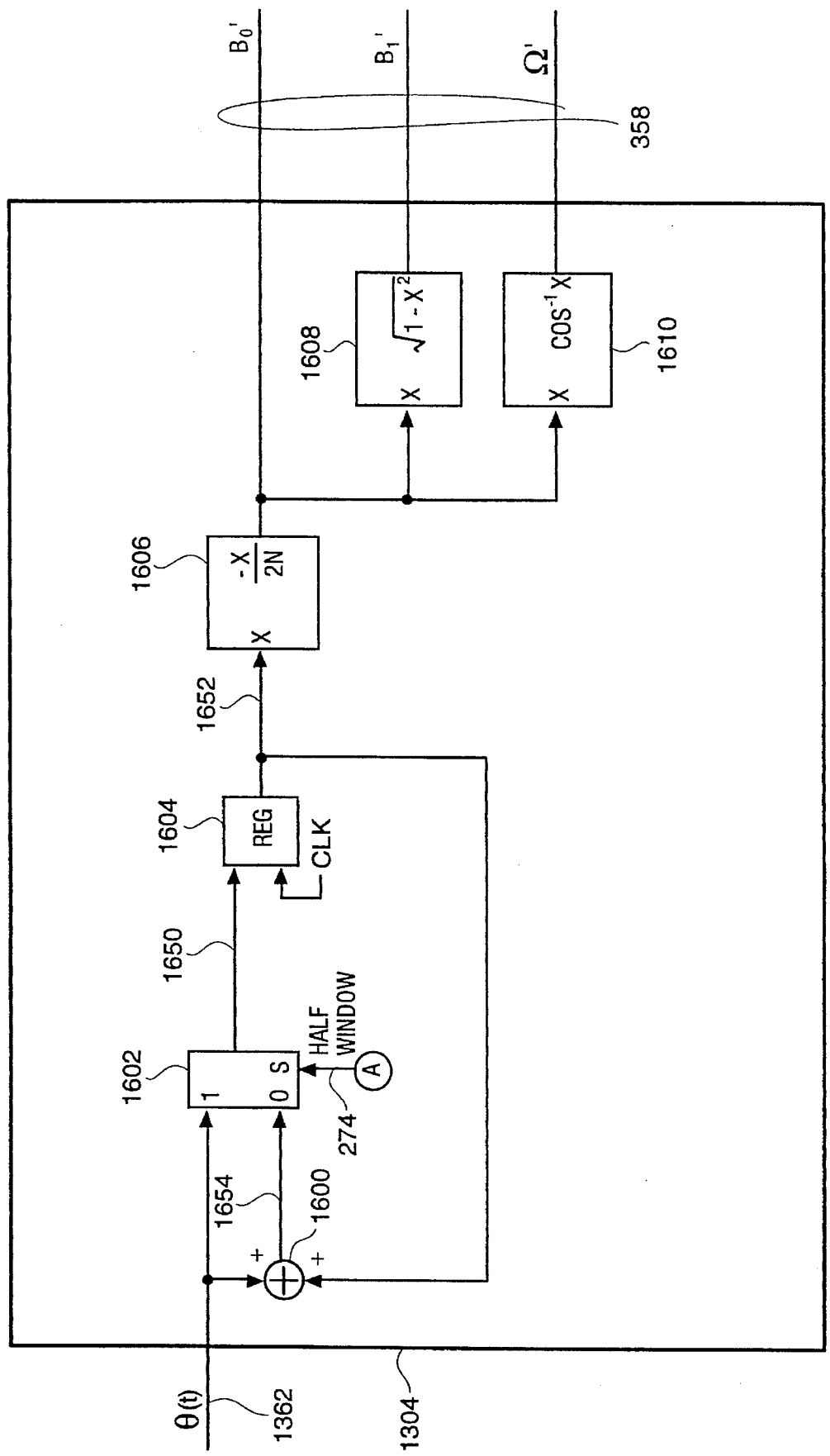

It may be noted that the computations performed by computational elements 1606, 1608, and 1610 are undefined when their respective inputs are outside certain appropriate ranges. The output values of these computations are utilized only on the boundaries of Hanning windows at which time the inputs are assured to be appropriate to the respective computations. For this reason, the undefined computations suggested by the diagram of FIG. 16 are of no practical relevance. As discussed above, the pseudo circuits of FIG. 16 are intended only as an aid in understanding the methods and related computations of the present invention.

It will be readily apparent to one of ordinary skill in the art that heuristic tests similar to those described above with respect to the first embodiment may be employed in the second embodiment. These heuristics help to prevent erroneous flow rate measurement generated by erroneous computations caused by loss of frequency convergence of the notch filter adaptation methods. Such heuristics generally update computations at each sample (or at half window boundaries) only if the new values are within reasonable ranges for the particular application of the flow meter. If the computations result in unexpected values, the updated values will not be used and the previous values will be re-used.

It is expressly understood that the claimed invention is not to be limited to the description of the preferred embodiment but encompasses other modifications and alterations within the scope and spirit of the inventive concept. For example, the invention has been described in conjunction with the flowmeter of FIG. 1. It is to be understood the invention is not limited in its application to flowmeters of the type shown in FIG. 1. It may be used with any type of flowmeter that operates on the Coriolis principle, including those having single tubes, double tubes, straight tubes, tubes of irregular configuration, etc. Also, the flowmeter with which the invention is utilized need not have the specific flange and hole configuration shown on FIG. 1 and, instead, may be mounted by any suitable means to the conduit to which the flowmeter is connected. Or, for example, the adaptive notch filters depicted in the present invention may receive sampled input signal values with other forms of decimation or even without decimation as appropriate for the particular sampling rates and the particular application. In addition, the weight adaptation computations may be based on signal values other than the left channel sampled signal values. One of ordinary skill in the art will recognize a wide variety of modifications to the embodiments described herein which are within the scope and spirit of the claimed invention.

What is claimed is:

1. An apparatus for measuring mass flow rate of a material in a Coriolis mass flow meter having a flow tube and having first and second sensors associated with said flow tube for generating output signals indicative of the oscillatory movement of said flow tube, said apparatus comprising:

analog to digital converter means for periodically sampling said sensor output signals and for converting sampled sensor output signals to digital form to generate a sequence of discrete sampled values representative of said output signals, including any undesirable components, of each of said first and second sensors;

digital notch filtration means, responsive to the generation of said sequence of discrete sampled values, for generating a sequence of discrete enhanced values, each discrete enhanced value corresponding to a sample of said sequence of discrete sampled values with said undesirable components removed;

phase value determination means, responsive to the generation of said sequence of discrete enhanced values, for generating the phase values of the oscillatory movement of said flow tube indicated by said sequence of discrete enhanced values;

phase difference means, responsive to the generation of said phase values, for determining a phase difference between the output signals of said first and second sensors; and mass flow measurement means, responsive to the determination of phase difference, for determining a mass flow rate value of the material flowing through the flow tube.

2. The apparatus of claim 1 further comprising:

notch adaptation means, cooperative with said digital notch filtration means, for altering filter parameters of said digital notch filtration means to affect the notch capability to reject undesirable components of the output signals of said first and second sensors.

3. The apparatus of claim 2 wherein said filter parameters comprise variable polynomial coefficients applied to said discrete sampled values to enhance said discrete sampled values, wherein said variable polynomial coefficients determine the center frequency of the notch of said digital notch filtration means.

4. The apparatus of claim 3 wherein said notch adaptation means further comprises weight adaptation means for adjusting said variable polynomial coefficients applied to said discrete sampled values in enhancing said discrete sampled values to alter the center frequency of said digital notch filtration means.

5. The apparatus of claim 4 further comprising:

means for detecting that the ratio of a discrete enhanced value to a corresponding noise signal has fallen below a predetermined threshold value and for generating a fault signal responsive to said detection; and means responsive to generation of said fault signal for adjusting said variable polynomial coefficients.

6. The apparatus of claim 4 further comprising:

stability test means for detecting instability in the adjustment of said variable polynomial coefficients and for generating an instability signal to indicate detection of the instability; and means responsive to generation of said instability signal to adjust said variables polynomial coefficients to reduce said instability.

7. The apparatus of claim 2 wherein said filter parameters comprise a variable debiasing parameter applied to said discrete sampled values in enhancing said discrete sampled values, wherein said variable debiasing parameter determines the frequency spectrum width of the notch of said digital notch filtration means.

8. The apparatus of claim 7 wherein said notch adaptation means further comprises weight adaptation means for adjusting said variable debiasing parameter applied to said discrete sampled values in enhancing said discrete sampled values.

9. The apparatus of claim 8 further comprising:

means for detecting that the ratio of a discrete enhanced value to a corresponding noise signal has fallen below a predetermined threshold value and for generating a fault signal responsive to the detection; and means responsive to said fault signal for adjusting said variable debiasing parameter.

10. The apparatus of claim 1 wherein said phase difference means further comprises:

windowing means for defining a window comprising a plurality of sequential ones of said discrete enhanced values; and Goertzel filtration means for decimating the discrete enhanced values in said window to determine a phase value for said window.

11. The apparatus of claim 10 further comprising Hanning windowing means for weighting each of said plurality of discrete enhanced values in said window wherein the weights are determined as:

$$h(k) = (½)(1 - \cos(2\pi k/(2N-1)))$$

where:

N is half the number of discrete enhanced values in the window, and k is the index of the value to which the weight h(k) is applied.

12. The apparatus of claim I wherein said phase difference means further comprises:

windowing means for defining a plurality of windows, each of said plurality of windows comprising a plurality of sequential ones of said discrete enhanced values; and Goertzel filtration means for decimating said plurality of discrete enhanced values in each of said plurality of windows to determine a phase value for said each of said plurality of windows, wherein each of said windows comprises an equal number of said discrete enhanced values and wherein each of said windows is offset from an earlier window by an equal number of said discrete enhanced values.

13. The apparatus of claim 12 further comprising Hanning windowing means for weighting each of said plurality of discrete enhanced values in each of said windows wherein the weights are determined as:

$$h(k) = (½)(1 - \cos(2\pi k/(2N-1)))$$

where:

N is half the number of discrete enhanced values in the window, and k is the index of the value to which the weight h(k) is applied.

14. The apparatus of claim 1 wherein said digital notch filtration means further comprises:

first digital notch filtration means, responsive to the generation of said sequence of discrete sampled values, for generating an intermediate sequence of discrete values, each intermediate discrete value corresponding to a sample of said sequence of discrete sampled values with signals representative of said undesirable components partially removed; and second digital notch filtration means, responsive to the generation of said intermediate sequence of discrete values, for generating said sequence of discrete enhanced values, each discrete enhanced value corresponding to an intermediate discrete value of said intermediate sequence of discrete values with signals representative of said undesirable components removed.

15. The apparatus of claim 14 further comprising:

first notch adaptation means, cooperative with said first digital notch filtration means, for altering filter parameters of said first digital notch filtration means which are determinative of the characterization of signals as representative of noise; and second notch adaptation means, cooperative with said second digital notch filtration means, for altering filter parameters of said second digital notch filtration means which are determinative of the characterization of signals as representative of noise.

16. The apparatus of claim 15 wherein said filter parameters comprise variable polynomial coefficients applied to said discrete sampled values to enhance said discrete sampled values.

17. The apparatus of claim 16 wherein said first notch adaptation means further comprises weight adaptation means for adjusting said variable polynomial coefficients applied to said discrete sampled values to generate said intermediate sequence of discrete values, and wherein said second notch adaptation means further comprises weight adaptation means for adjusting variable polynomial coefficients applied to said intermediate sequence of discrete values to generate said sequence of discrete enhanced values.

18. In a Coriolis mass flow meter having a flow tube and having first and second sensors associated with the flow tube for generating output signals indicative of the oscillatory movement of the flow tube, a method for measuring the mass flow rate of a material flowing through said flow tube of said flow meter comprising the steps of:

periodically converting analog output signals generated by the first and second sensors into digital form to generate a sequence of discrete sampled values representative of said output signals, including any undesirable components, of each of said first and second sensors;

applying said sequence of discrete sampled values to digital notch filtration means to generate a sequence of discrete enhanced values, each discrete enhanced value corresponding to a sample of said sequence of discrete sampled values with signals representative of noise removed;

applying said sequence of discrete enhanced values to phase value determination means to determine phase values of the oscillatory movement of the flow tube indicated by said sequence of said discrete enhanced values;

applying said phase values to phase difference computation means to determine a phase difference between the output signals of said first and second sensors; and determining the mass flow rate of the material flowing through said flow meter responsive to the determination of phase difference.

19. The method of claim 18 further comprising:

altering filter parameters of said digital notch filtration means to adjust the digital notch filtration means to compensate for changes in the frequency of oscillations of the flow tube.

20. The method of claim 19 wherein said filter parameters comprise variable polynomial coefficients applied to said discrete sampled values to enhance said discrete sampled values, wherein said variable polynomial coefficients determine the center frequency of the notch of said digital notch filtration means.

21. The method of claim 20 wherein the altering step further comprises adjusting said variable polynomial coefficients applied to said discrete sampled values in enhancing said discrete sampled values to alter the center frequency of said digital notch filtration means.

22. The method of claim 21 further comprising:

determining a ratio of a discrete enhanced value to a corresponding noise signal;

determining whether said ratio has fallen below a predetermined threshold value;

generating a fault signal responsive to the determination that said ratio has fallen below said predetermined threshold value; and adjusting said variable polynomial coefficients responsive to generation of said fault signal.

23. The method of claim 21 further comprising:

determining whether said variable polynomial coefficients are outside an acceptable range of stable values;

generating an instability signal responsive to a determination that said variable polynomial coefficients are unstable; and adjusting said variable polynomial coefficients responsive to generation of said instability signal to reduce said instability.

24. The method of claim 19 wherein said filter parameters comprise a variable debiasing parameter applied to said discrete sampled values in enhancing said discrete sampled values, wherein said variable debiasing parameter determines the frequency spectrum width of the notch of said digital notch filtration means.

25. The method of claim 24 wherein said step of altering said parameters further comprises adjusting said variable debiasing parameter applied to said discrete sampled values for enhancing said discrete sampled values.

26. The method of claim 25 further comprising:

determining a ratio of a discrete enhanced value to a corresponding noise signal;

determining whether said ratio has fallen below a predetermined threshold value;

generating a fault signal responsive to the determination that said ratio has fallen below said predetermined threshold value; and adjusting said variable debiasing parameter responsive to generation of said fault signal.

27. The method of claim 18 wherein the application of said phase values to said phase difference computation means further comprises:

defining a window comprising a plurality of sequential ones of said discrete enhanced values; and decimating the discrete enhanced values in said window through a Goertzel filtration to determine a phase value for said window.

28. The method of claim 27 further comprising:

determining a Hanning window weight for weighting each of said plurality of discrete enhanced values in said window wherein the weights are determined as:

$$h(k) = (\tfrac{1}{2})(1 - \cos(2\pi k/(2N-1)))$$

where:

N is half the number of discrete enhanced values in the window, and k is the index of the value to which the weight h(k) is applied.

29. The method of claim 18 wherein the application of said phase values to said phase difference computation means further comprises:

defining a plurality of windows, each of said plurality of windows comprising a plurality of sequential ones of said discrete enhanced values; and decimating the discrete enhanced values in each of said plurality of windows through a Goertzel filter to determine a phase value for said each of said plurality of windows, wherein each of said windows comprises an equal number of said discrete enhanced values and wherein each of said windows is offset from an earlier window by an equal number of said discrete enhanced values.

30. The method of claim 29 further comprising:

determining a Hanning window weight for weighting each of said plurality of discrete enhanced values in each of said plurality of windows wherein the weights are determined as:

$$h(k)=(½)(1-\cos(2\pi k/(2N-1)))$$

where:

N is half the number of discrete enhanced values in the window, and k is the index of the value to which the weight h(k) is applied.

31. The method of claim 18 wherein the step of applying said discrete sampled values to said digital notch filtration means further comprises:

operating a first digital notch filtration means to generate an intermediate sequence of discrete values, each intermediate discrete value corresponding to a sample of said sequence of discrete sampled values with signals representative of noise partially removed; and operating a second digital notch filtration means responsive to the generation of said intermediate sequence of discrete values to generate a sequence of discrete enhanced values, each discrete enhanced value corresponding to an intermediate discrete value of said intermediate sequence of discrete values with signals representative of noise removed.

32. The method of claim 31 further comprising:

operating first notch adaption means to alter filter parameters of the first digital notch filtration means to adjust the first digital notch filtration means to compensate for changes in the frequency of oscillations of the flow tube; and operating second notch adaption means to alter filter parameters of the second digital notch filtration means to adjust the second digital notch filtration means to compensate for changes in the frequency of oscillations of the flow tube.

33. The method of claim 32 wherein said filter parameters comprise variable polynomial coefficients applied to said discrete sampled values to enhance said discrete sampled values.

34. The method of claim 33 wherein said step of altering said first notch adaptation means further comprises operating weight adaptation means for adjusting variable polynomial coefficients applied to said discrete sampled values to generate said intermediate sequence of discrete values and wherein said step of operating said second notch adaptation means further comprises operating weight adaptation means for adjusting variable polynomial coefficients applied to said intermediate sequence of discrete values to generate said sequence of discrete enhanced values.

35. An apparatus for measuring the mass flow rate of a material in a Coriolis mass flow meter having a flow tube and having first and second sensors associated with the flow tube for generating output signals indicative of the oscillatory movement of said flow tube, said apparatus comprising:

analog to digital converter means for periodically sampling sensor output signals at a fixed rate and for converting sampled sensor output signals to digital form to generate a sequence of discrete sampled values representative of said output signals of each of said first and second sensors;

digital filtration means, responsive to the generation of said sequence of discrete sampled values, for generating a sequence of discrete enhanced values;

phase difference means, responsive to the generation of said sequence of discrete enhanced values, for determining a phase difference between said output signals of said first and second sensors; and mass flow measurement means, responsive to the determination of said phase difference, for determining a mass flow rate value of the material flowing through said flow tube.

* * * * *